(12) United States Patent
Kwon et al.

(10) Patent No.: US 12,231,704 B2
(45) Date of Patent: Feb. 18, 2025

(54) METHOD AND APPARATUS FOR PROCESSING MULTICAST SIGNAL

(71) Applicant: LG ELECTRONICS INC., Seoul (KR)

(72) Inventors: Woosuk Kwon, Seoul (KR); Joonhee Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/030,179

(22) PCT Filed: Nov. 3, 2021

(86) PCT No.: PCT/KR2021/015747
§ 371 (c)(1),
(2) Date: Apr. 4, 2023

(87) PCT Pub. No.: WO2022/098070
PCT Pub. Date: May 12, 2022

(65) Prior Publication Data
US 2023/0379516 A1  Nov. 23, 2023

(30) Foreign Application Priority Data
Nov. 3, 2020  (KR) ........................ 10-2020-0145393

(51) Int. Cl.
*H04N 21/238* (2011.01)
*H04L 12/18* (2006.01)

(52) U.S. Cl.
CPC ....... *H04N 21/23805* (2013.01); *H04L 12/18* (2013.01)

(58) Field of Classification Search
CPC .............. H04L 12/18; H04N 21/23805; H04N 21/6405; H04N 21/8456
See application file for complete search history.

(56) References Cited

U.S. PATENT DOCUMENTS

| | | | | |
|---|---|---|---|---|
| 7,617,326 B2* | 11/2009 | Gervais | .............. | H04N 21/2381 709/217 |
| 8,121,064 B2* | 2/2012 | Lee | ........................ | H04H 20/26 455/445 |
| 8,434,120 B2* | 4/2013 | Gutknecht | ............. | H04H 40/90 725/95 |
| 8,762,564 B1* | 6/2014 | Philpott | ........... | H04N 21/64322 709/219 |
| 2005/0071318 A1* | 3/2005 | Court | .................... | G06F 16/904 |

(Continued)

*Primary Examiner* — Michael B. Pierorazio
(74) *Attorney, Agent, or Firm* — Bryan Cave Leighton Paisner LLP

(57) ABSTRACT

A method for processing a multicast signal according to embodiments may comprise the steps of: generating multicast media data; generating signaling information regarding the multicast media data; transmitting the multicast media data in a multicast method, on the basis of at least one of a first network and a second network; and transmitting the signaling information regarding the multicast media data. An apparatus for processing a multicast signal according to embodiments comprises: a memory; and a processor connected to the memory. The processor may: receive multicast media data on the basis of at least one of a first network and a second network; and decode the multicast media data.

14 Claims, 79 Drawing Sheets

(56) References Cited

U.S. PATENT DOCUMENTS

| | | | |
|---|---|---|---|
| 2005/0091697 A1* | 4/2005 | Tanaka | H04N 21/4184 348/553 |
| 2006/0126551 A1* | 6/2006 | Delaunay | H04N 21/43615 370/316 |
| 2006/0235993 A1* | 10/2006 | Gervais | H04N 7/17354 709/238 |
| 2006/0269225 A1* | 11/2006 | Tada | H04N 5/76 386/330 |
| 2006/0287979 A1* | 12/2006 | Beavin | G06F 16/24526 |
| 2006/0293945 A1* | 12/2006 | Feraud | G06F 16/284 705/7.11 |
| 2008/0046878 A1* | 2/2008 | Anderson | G06F 8/658 717/168 |
| 2008/0186995 A1* | 8/2008 | Kwon | H04N 21/2143 375/E7.025 |
| 2009/0007189 A1* | 1/2009 | Gutknecht | H04N 21/6581 725/64 |
| 2009/0025027 A1* | 1/2009 | Craner | H04N 21/2385 725/116 |
| 2009/0031384 A1* | 1/2009 | Brooks | H04N 21/2402 725/127 |
| 2009/0100459 A1* | 4/2009 | Riedl | H04N 21/2405 725/35 |
| 2009/0150943 A1* | 6/2009 | Vasudevan | H04N 21/6405 725/86 |
| 2009/0313283 A1* | 12/2009 | Conradi | G06F 16/252 707/999.102 |
| 2010/0086020 A1* | 4/2010 | Schlack | H04L 67/61 375/240.01 |
| 2010/0211985 A1* | 8/2010 | Mountain | H04N 21/23608 348/E7.003 |
| 2010/0260254 A1* | 10/2010 | Kimmich | H04N 19/164 375/240 |
| 2011/0061088 A1* | 3/2011 | Rieger | H04N 21/2225 725/120 |
| 2011/0188439 A1* | 8/2011 | Mao | H04N 21/6405 370/312 |
| 2011/0197239 A1* | 8/2011 | Schlack | H04N 21/6408 725/95 |
| 2011/0222494 A1* | 9/2011 | Lee | H04H 20/26 370/329 |
| 2011/0255555 A1* | 10/2011 | Alexander | H04N 21/239 370/468 |
| 2012/0185907 A1* | 7/2012 | Park | H04N 21/242 725/110 |
| 2012/0331513 A1* | 12/2012 | Yamagishi | H04N 21/2362 725/95 |
| 2013/0091521 A1* | 4/2013 | Phillips | H04N 21/23424 725/35 |
| 2013/0232231 A1* | 9/2013 | Laurent | H04L 12/6418 709/219 |
| 2014/0230003 A1* | 8/2014 | Ma | H04N 21/4147 725/115 |
| 2014/0282766 A1* | 9/2014 | Good | H04N 21/2225 725/93 |
| 2014/0282777 A1* | 9/2014 | Gonder | H04L 65/612 725/116 |
| 2014/0282784 A1* | 9/2014 | Pfeffer | H04N 21/8586 725/112 |
| 2014/0351859 A1* | 11/2014 | Leley | H04N 21/2323 725/50 |
| 2015/0358662 A1* | 12/2015 | Drouin | H04N 21/2225 725/97 |
| 2016/0157209 A1* | 6/2016 | Baldwin | H04W 72/542 370/216 |
| 2016/0241615 A1* | 8/2016 | Chen | H04L 65/80 |
| 2017/0104816 A1* | 4/2017 | Yan | H04N 21/222 |
| 2018/0139476 A1* | 5/2018 | Deshpande | H04N 21/435 |
| 2018/0367261 A1* | 12/2018 | Gonzalves Serrano | H04L 1/1812 |
| 2022/0377422 A1* | 11/2022 | James | H04N 21/41407 |

* cited by examiner

FIG. 7

| URL element | Use | Data type | Description |
|---|---|---|---|
| Host | 1 | String | The FQDN (or the IP address) and optionally the port number of the Multicast rendezvous service. |
| ManifestPath | 1 | String | The resource path for retrieving the presentation manifest from the specified host. |
| field | 0..n | | |
| AToken | 0..1 | String | The value is an authentication token that authorises access to the Multicast rendezvous service, if required by the system operator. This may have been included in the original presentation manifest URL, it may have been added by a third-party CDN broker as part of an earlier HTTP redirect URL, or it may be generated locally by the Application. |
| MGstatus | 0..1 | Integer | The value is the current status of the Multicast gateway.<br>0 = inactive<br>1 = active |
| MGid | 0..1 | String | The value is the port number of the Multicast gateway, optionally preceded by its IP address. The format shall be [IP address]:port. |
| MGhost | 0..1 | String | The value is the Multicast gateway host name. |
| Ori | 0..1 | String | The value is the host name (FQDN) of the original targeted host. the Application may substitute the original targeted host name (FQDN) with the local Multicast rendezvous service host name or address. Moreover, in case of relying on a third-party CDN broker, the latter indicates here the original targeted host name (FQDN) before redirecting the request to the Multicast rendezvous service. |

FIG. 8

| URL element | Use | Data type | Description |
|---|---|---|---|
| Host | 1 | String | The IP address or FQDN of the Multicast gateway and optionally the port number (for example "router.example:8088" or "192.0.2.1:8088"). |
| Session ID | 0..1 | String | A unique presentation session identifier communicated (and possibly generated) by the Multicast rendezvous service comprising one or more URL path elements. |
| ManifestPath | 1 | String | The resource path for retrieving the presentation manifest from the specified host. |
| conf | 0..1 | String | The multicast session parameters shall take the form of a multicast gateway configuration instance document comprising one multicast session. The document shall be compressed using Gzip and base64url-encoded prior to inclusion as a URL query string parameter. |

FIG. 50

| Element or attribute name | Use | Data type | Description |
|---|---|---|---|
| ServiceList | | | |
| @serviceIdentifier | 1..n | URI string | Service identifier for the logical service with which this session is associated. |
| PresentationManifestRequestURL | 1..n | URI string | URL of a multicast rendezvous service for the linear service. |
| @NetworkType | 0..1 | Unsigned Integer | Network type of deployed the multicast rendezvous service |
| @HostAddress | 1 | URI string | The FQDN (or the IP address) and optionally the port number of the Multicast rendezvous service. |
| @RendezvousServerType | 0..1 | Unsigned Integer | The Multicast rendezvous service type (regular, co-located) |
| MulticastTransportSession | 0..n | | Container for multicast transport session parameters. |

FIG. 51

| Element or attribute name | Use | Data type | Description |
|---|---|---|---|
| MulticastSession | | | |
| @serviceIdentifier | 1 | URI string | Service identifier for the logical service with which this session is associated. |
| @contentPlaybackAvailabilityOffset | 0..1 | Duration string | Availability time offset adjustment applied to the original presentation manifest when passed to instance of the Content playback funtion. |
| @networkIdentifier | 0..n | URI string | Identifier of network which current multicast session is transmitted |
| PresentationManifestLocator | 1..n | URI string | URL of a presentation manifest for the linear service. |
| @manifestId | 1 | Name Token string | Uniquely identifies this presentation manifest within the scope of a multicast session. |
| @contentType | 1 | MPEG-7 mimeType | The MIME content type of this presentation manifest. |
| Multicast TransportSession | 0..n | | Container for multicast transpor session parameters. |

FIG. 52

| URL element | | Use | Data type | Description |
|---|---|---|---|---|
| Host | | 1 | String | The FQDN (or the IP address) and optionally the port number of the Multicast rendezvous service. |
| ManifestPath | | 1 | String | The resource path for retrieving the presentation manifest from the specified host. |
| field | | 0..n | | |
| | AToken | 0..1 | String | The value is an authentication token that authorises access to the Multicast rendezvous service, if required by the system operator. This may have been included in the original presentation manifest URL, it may have been added by a third-party CDN broker as part of an earlier HTTP redirect URL, or it may be generated locally by the Application. |
| | MGstatus | 0..1 | Integer | The value is the current status of the Multicast gateway.<br>0 = inactive<br>1 = active |
| | MGid | 0..1 | String | The value is the port number of the Multicast gateway, optionally preceded by its IP address. The format shall be [IP address]:port. |
| | MGhost | 0..1 | String | The value is the Multicast gateway host name. |
| | Ori | 0..1 | String | The format shall be [IP address]:port.<br>The value is the host name (FQDN) of the original targeted host.<br>the Application may substitute the original targeted host name (FQDN) with the local Multicast rendezvous service host name or address. Moreover, in case of relying on a third-party CDN broker, the latter indicates here the original targeted host name (FQDN) before redirecting the request to the Multicast rendezvous service. |

FIG. 53

| URL element | Use | Data type | Description |
|---|---|---|---|
| Host | 1 | String | The IP address or FQDN of the Multicast gateway and optionally the port number (for example "router.example:8088" or "192.0.2.1:8088"). |
| Session ID | 0..1 | String | A unique presentation session identifier communicated (and possibly generated) by the Multicast rendezvous service comprising one or more URL path elements. |
| ManifestPath | 1 | String | The resource path for retrieving the presentation manifest from the specified host. |
| RequestedPriority | 0..1 | String | Requested priority value from content playback |
| conf | 0..1 | String | The multicast session parameters shall take the form of a multicast gateway configuration instance document comprising one multicast session. The document shall be compressed using Gzip and base64url-encoded prior to inclusion as a URL query string parameter. |

METHOD AND APPARATUS FOR PROCESSING MULTICAST SIGNAL

This application is a National Phase application under 35 U.S.C. 371 of International Application No. PCT/KR2021/015747, filed on Nov. 3, 2021, which claims the benefit of Korean Application No. 10-2020-0145393, filed on Nov. 3, 2020, the contents of which are incorporated by reference herein in their entirety.

TECHNICAL FIELD

The present disclosure relates to an apparatus and method of processing a multicast signal.

BACKGROUND

With the development of digital technology and communication technology, the supply and demand for audio/video-based multimedia content are rapidly expanding in various fields, such as the Internet and personal media as well as broadcasting and movies. In addition, as TV screens used in households become larger due to the development of display technology, discussion about an ultra-high definition (UHD) broadcast service is increasing.

In relation to a broadcast service, a multicast transport method of transmitting the same content to a plurality of users is effective because advantages of both unicast and broadcast may be utilized. However, an existing multicast transport method has been possible only within a single network, and there have been disadvantages in that a multicast service between heterogeneous networks is impossible. Accordingly, when a multicast receiver accesses and releases heterogeneous access networks, a new multicast service should be started after an existing multicast service is ended. In addition, when a plurality of transport protocols is used, it is impossible to identify the protocols using port numbers if a protocol constituting a payload in an Internet protocol (IP)/user datagram protocol (UDP) or in IP/transmission control protocol (TCP) is not registered in an Internet assigned numbers authority (IANA). In the case of IP multicast, since a destination address and a port number use values assigned to multicast, all receivers receive a corresponding packet. In this case, if an unknown protocol is used, multicast for the corresponding packet may not be processed.

SUMMARY

An object of the present disclosure is to increase transmission efficiency in a method and apparatus for transmitting a multicast signal.

Another object of the present disclosure is to efficiently provide a multicast service between multiple networks.

The objects of the present disclosure are not limited to what has been particularly described hereinabove and the scope of embodiments may be extended through other objects that may be derived by persons skilled in the art from the following detailed description.

A multicast signal processing method according to embodiments may include generating multicast media data; generating signaling information for the multicast media data; transmitting the multicast media data using a multicast scheme based on at least one of a first network or a second network; and transmitting signaling information for the multicast media data. A multicast signal processing apparatus according to embodiments may include a memory; and a processor connected to the memory. The processor may receive multicast media data based on at least one of a first network or a second network and decode the multicast media data.

According to embodiments of the present disclosure, a multicast service between multiple networks may be provided.

According to embodiments, the same level of media service may be provided even in multiple networks to which a DVB multicast adaptive bitrate (ABR) architecture is applicable by proposing a media architecture for multicast media streaming based on a plurality of networks.

According to embodiments, during multicast streaming, multicast content may be received through various access methods without depending on a network to which a reception device is connected.

According to embodiments, the same level of multicast ABR service may be provided even when various devices are connected to separate networks.

BRIEF DESCRIPTION OF THE DRAWINGS

The drawings are included to provide a further understanding of embodiments and illustrate embodiments together with description related to embodiments. For a better understanding of various embodiments described below, reference should be made to the following description of embodiments which should be read in conjunction with the following figures wherein like numerals represent like parts.

FIG. 7 illustrates elements included in a URL according to embodiments.

FIG. 8 illustrates elements included in a URL according to embodiments.

FIG. 50 illustrates a service list according to embodiments.

FIG. 51 illustrates a multicast session according to embodiments.

FIG. 52 illustrates elements included in a request URL of an HTTP message according to embodiments.

FIG. 53 illustrates information included in a redirect URL of a location response header according to embodiments.

DETAILED DESCRIPTION

Figure 1:
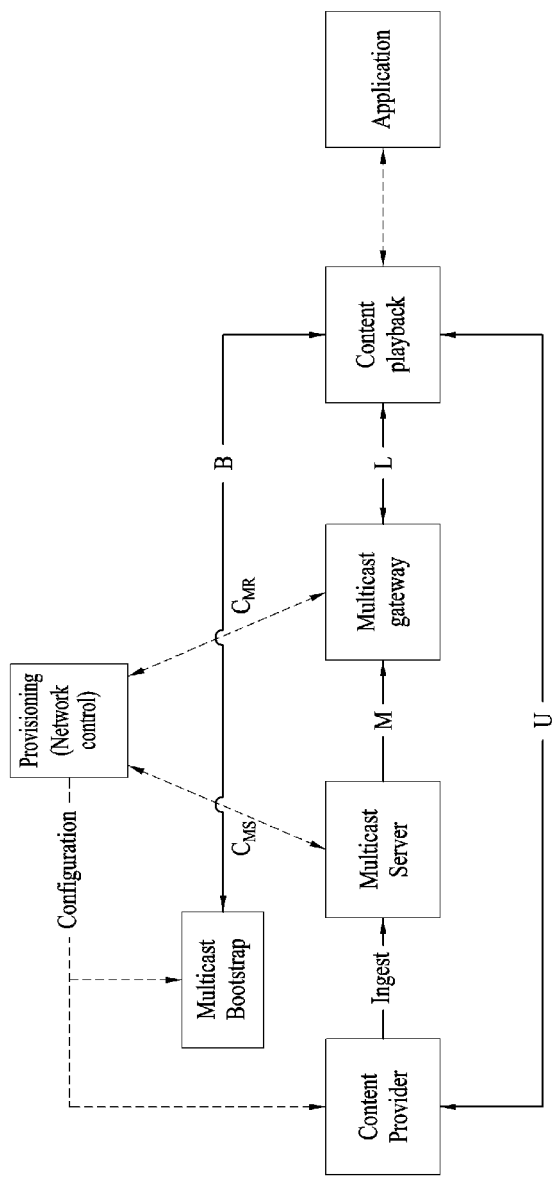
FIG. 1 illustrates a multicast adaptive bitrate (ABR) architecture according to embodiments.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

A multicast signal processing method/apparatus according to embodiments is related to a media transmission method in a multicast adaptive bitrate (ABR) network.

Media according to embodiments may be referred to as a media signal or media data and may be interpreted as a term corresponding to a service or service data or including the service.

Embodiments propose an architecture for media streaming in an Internet protocol (IP)-based media transmission system.

Embodiments propose a media streaming architecture for applying multicast when the IP-based media transmission system is composed of a plurality of networks.

Embodiments propose an ABR multicast method when the IP-based media transmission system is composed of a plurality of networks.

Embodiments propose a service list reception flow and an operation of a device (a multicast signal processing apparatus according to embodiments) when the IP-based media transmission system is composed of a plurality of networks.

Embodiments propose signaling information necessary for a device on a plurality of networks.

Embodiments propose a multicast ABR architecture according to configurations of a content provider and a service provider corresponding to the multicast signal processing apparatus according to embodiments.

Embodiments propose a media architecture for multicast media streaming based on a plurality of networks so that a multicast ABR architecture in DVB may be applied and the same level of media service may be provided even in multiple networks. In particular, during multicast streaming, multicast content may be received using various access methods without depending on a network to which a reception device is connected.

Therefore, when various devices are connected to respective separate networks, the same level of multicast ABR service may be provided.

As various devices access networks due to the diversity of the networks, it is necessary to provide media streaming to various devices and multiple users. In this environment, if all streaming sessions are transmitted only in unicast, load on a network increases, thereby resulting in poor quality of not only a media streaming service but also other services using the network. Therefore, efficient multicast streaming transmission is required. Currently, a multicast ABR architecture in DVB is mainly defined for the case in which a network providing multicast is a single network. In order to provide the same service through various networks including a 5G network (wireless network), a device needs to smoothly operate on each network, and an interface therefor and architecture update may be required. In addition, if too many network changes are made in order for an existing service provider to support ABR multicast, a multicast ABR service may not actually be provided due to issues of implementation difficulty and cost.

Multicast technology provides services for universal media streaming in various network environments, and the services may be transmitted in most IP-based networks. In order to provide the multicast ABR service using the same function for multiple heterogeneous networks, a function and an architecture adapted to each network are required. When the multicast ABR service is provided through multiple networks, it is necessary to transmit a service list and define a management method for the service list in order to provide continuity of the service from the viewpoint of a user.

This specification describes an architecture in which a multicast ABR architecture in DVB may be serviced through various networks, and interfaces therefor. In addition, the present specification describes a method of providing a service list through multiple networks, and interfaces and flows for processing the service list in a device.

FIG. 1 illustrates a multicast ABR architecture according to embodiments.

In a multicast signal processing method/apparatus according to embodiments, media content may be transmitted in multicast based on the architecture as illustrated in FIG. 1. Media content according to embodiments may be referred to as multicast media, multicast media data, service data, and the like. Each component illustrated in FIG. 1 corresponds to hardware, software, a processor, and/or a combination thereof.

Interfaces of FIG. 1 may be defined as follows.

L: A unicast HTTP(S) interface between a content playback function and a multicast gateway.

B: A bootstrap unicast HTTP(S) interface between the content playback function and a multicast bootstrap function. B may be used to request an initial presentation manifest.

M: An interface through which a multicast server transmits multicast IP content and the multicast gateway receives the multicast IP content.

U: An interface for the content playback function to receive media content in unicast directly from a content provider.

Ingest: An interface for providing media content to the multicast server.

CMS: A control interface for configuring the multicast server.

CMR: A control interface for configuring the multicast gateway.

Configuration: An interface for exchanging configuration information between the content provider, a provisioning function, and the multicast bootstrap function.

Each module illustrated in FIG. 1 may be defined as follows. Each module may correspond to hardware, software, a processor, and/or a combination thereof.

Content provider: The content provider generates media content or stores the generated media content, and forwards the media content to a user through a network. Multicast and unicast transmission methods may be used to forward the media content to the user. To transmit the media content in multicast, the content provider provides media content data and control information to the multicast server through the interface Ingest. The media content data may be packaged in a format such as dynamic adaptive streaming over HTTP (DASH) or HTTP live streaming (HLS), and a presentation manifest may be configured according to the packaged format.

Multicast server: The multicast server receives media content from the content provider and transmits the media content to the multicast gateway through the interface M using an IP multicast transmission scheme. In this case, some control information may also be transmitted. As multicast protocols, real-time object delivery over unidirectional transport (ROUTE), file delivery over unidirectional transport (FLUTE), quick UDP Internet connection (QUIC), real-time delivery protocol (RTP), etc. may be considered.

Multicast Gateway: The multicast gateway receives a packaged content segment transmitted in multicast and provides the packaged content segment again to the content playback function through the interface L using an HTTP(S) scheme, etc. To this end, the multicast gateway caches the content segment. The content segment may represent segmented media data. The multicast gateway may store (cache) the segmented media data.

Provisioning (network control): The provisioning function provides configuration information about a network and a multicast streaming session to the multicast server and the multicast gateway.

Multicast bootstrap: The multicast bootstrap function may process, as a target, address information (a URL or an address) that the content playback function should initially access through the interface B. The multicast bootstrap function processes an initial request for a presentation manifest received through the reference point B from the content playback function. In case of multicast, the multicast bootstrap function provides redirection information for receiving the manifest through the interface L, and in case of unicast, the multicast bootstrap function provides the redirection information for receiving the manifest through the interface U. In a multicast ABR architecture in DVB, the multicast bootstrap function may serve as a multicast rendezvous service function.

Content playback: The content playback function manages request, reception, decryption, and presentation of content. The content playback function may consider unicast transmission through the interface L.

Application: The application controls the content playback function based on user input. For example, the application may be a built-in control application (electronic program guide (EPG) application) of a TV or a set-top box (STB) or may be a third-party application provided by the content provider. An interface used by the application to control the content playback function may be implemented by a separate application programming interface (API) according to each device.

The multicast signal processing method/apparatus according to embodiments may include the multicast server and the multicast gateway or further include the content provider, the provisioning function, and the multicast bootstrap function in terms of performing an operation of transmitting media.

The multicast signal processing method/apparatus according to embodiments may include the content playback function and the application in terms of performing an operation of receiving media.

Figure 2:
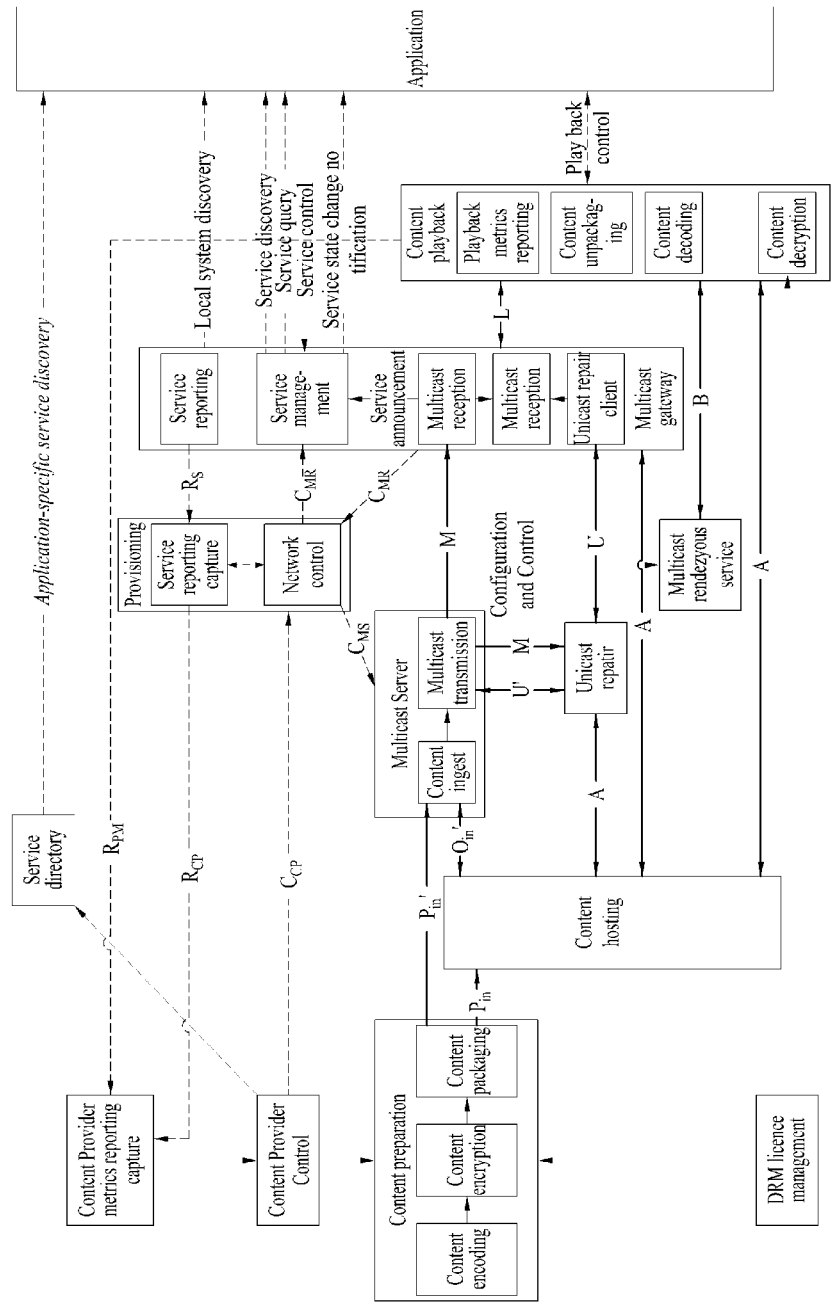
FIG. 2 illustrates a procedure of acquiring a presentation manifest based on a multicast rendezvous service function according to embodiments.

FIG. 2 illustrates a procedure of acquiring a presentation manifest based on a multicast rendezvous service function according to embodiments.

The multicast signal processing method/apparatus according to embodiments of FIG. 1 may implement the multicast rendezvous service function as illustrated in FIG. 2. Each component illustrated in FIG. 2 corresponds to hardware, software, a processor, and/or a combination thereof.

A content playback function makes a request for content to a multicast gateway during multicast reception and receives content from a content hosting function during unicast reception. For this purpose, the content playback function may first access the multicast rendezvous service function through a reference point B in order to obtain a presentation manifest for initially receiving media content. The multicast rendezvous service function may provide a URL capable of appropriately obtaining the presentation manifest according to multicast and unicast to the content playback function.

Figure 3:
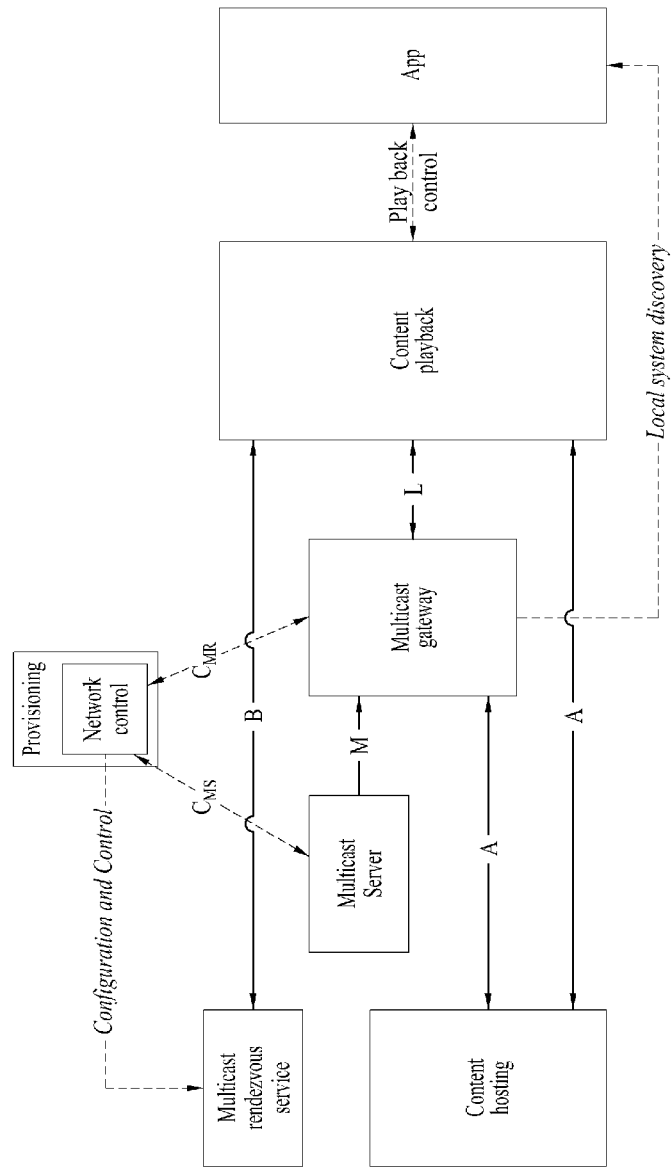
FIG. 3 illustrates an architecture for a multicast rendezvous service function according to embodiments.

FIG. 3 illustrates an architecture for a multicast rendezvous service function according to embodiments.

In the architectures of FIGS. 1 and 2, the multicast method/apparatus according to embodiments may implement the rendezvous service function as illustrated in FIG. 3. Each component in FIG. 3 corresponds to hardware, software, a processor, and/or a combination thereof.

Deployment of multicast rendezvous service function according to embodiments:

The multicast rendezvous service function may be configured with regular deployment or co-located deployment depending on whether HTTP(S) and unidirectional transmission are supported.

A content playback function of the multicast signal processing apparatus according to embodiments may acquire manifest URL information and perform configuration for media reception through the following operations.

Regular deployment—Case in which the multicast rendezvous service function is configured in a network and managed by a system operator.

Co-located deployment—Case in which the multicast rendezvous service function is implemented in the same device as a multicast gateway.

Regular Deployment

Referring to FIG. 3, a configuration is illustrated in which the multicast rendezvous service function is located in a network and managed and controlled by the system operator.

The content playback function may obtain the manifest URL information for receiving content from the multicast rendezvous service function through a reference point B upon initially accessing content desired to be received. To this end, the following configurations may be made.

A configuration for a set of basic parameters (e.g., an endpoint address of a multicast gateway configuration transport session) may be applied to a multicast gateway. By this configuration, an in-band multicast gateway configuration method may be used.

A configuration for a set of multicast sessions currently provisioned through a reference point CMR or reference points CMS and M may be applied to the multicast gateway. For this configuration, not only the in-band multicast gateway configuration method but also an out-of-band pushed configuration, an out-of-band pulled configuration method, and a just-in-time configuration method may be applied.

Figure 4:
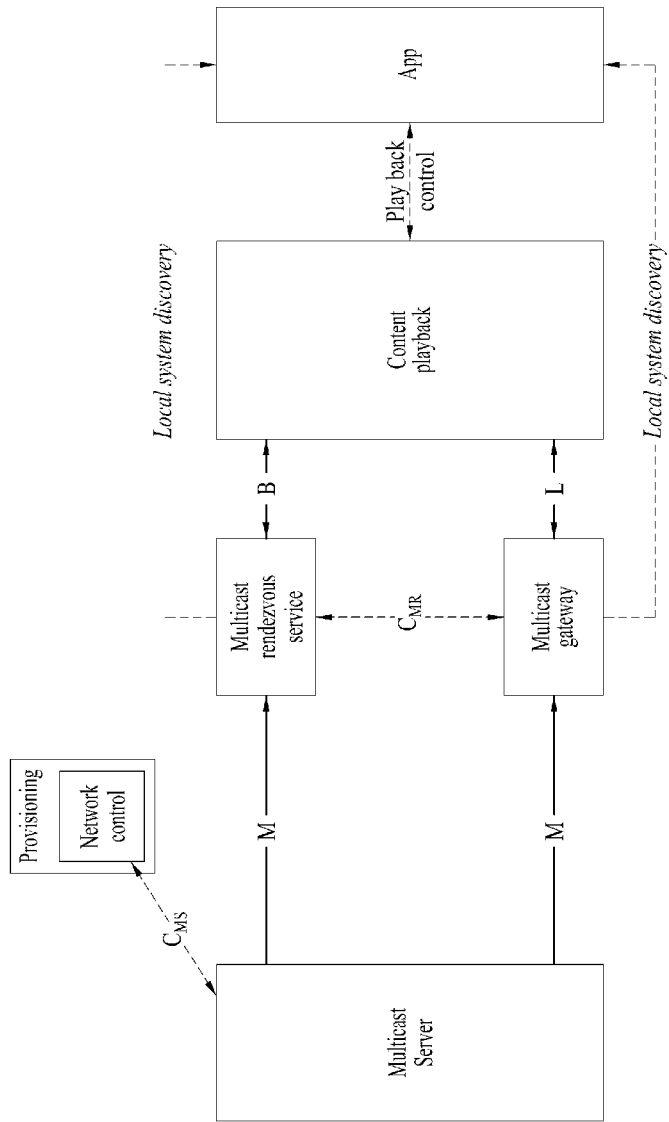
FIG. 4 illustrates an architecture for a multicast rendezvous service function according to embodiments.

FIG. 4 illustrates an architecture for a multicast rendezvous service function according to embodiments.

Co-located deployment is illustrated in FIG. 4, in addition to FIG. 3.

Co-Located Deployment:

As illustrated in FIG. 4, the multicast rendezvous service function may be configured in the same device (multicast processing apparatus according to embodiments) as the multicast gateway. This configuration may be used mainly when a multicast ABR network is configured for unidirectional deployment. Each component illustrated in FIG. 4 corresponds to hardware, software, a processor, and/or a combination thereof.

A content playback function may obtain manifest URL information for receiving content from the multicast rendezvous service function through a reference point B upon initially accessing content desired to be received. To this end, the following configurations may be made.

A configuration for a set of basic parameters (e.g., an endpoint address of a multicast gateway configuration transport session) may be applied to the multicast rendezvous service function.

A configuration for a set of multicast sessions currently provisioned through a reference point M may be applied to the multicast gateway.

In this case, an in-band multicast gateway configuration method may be used for each configuration.

Figure 5:
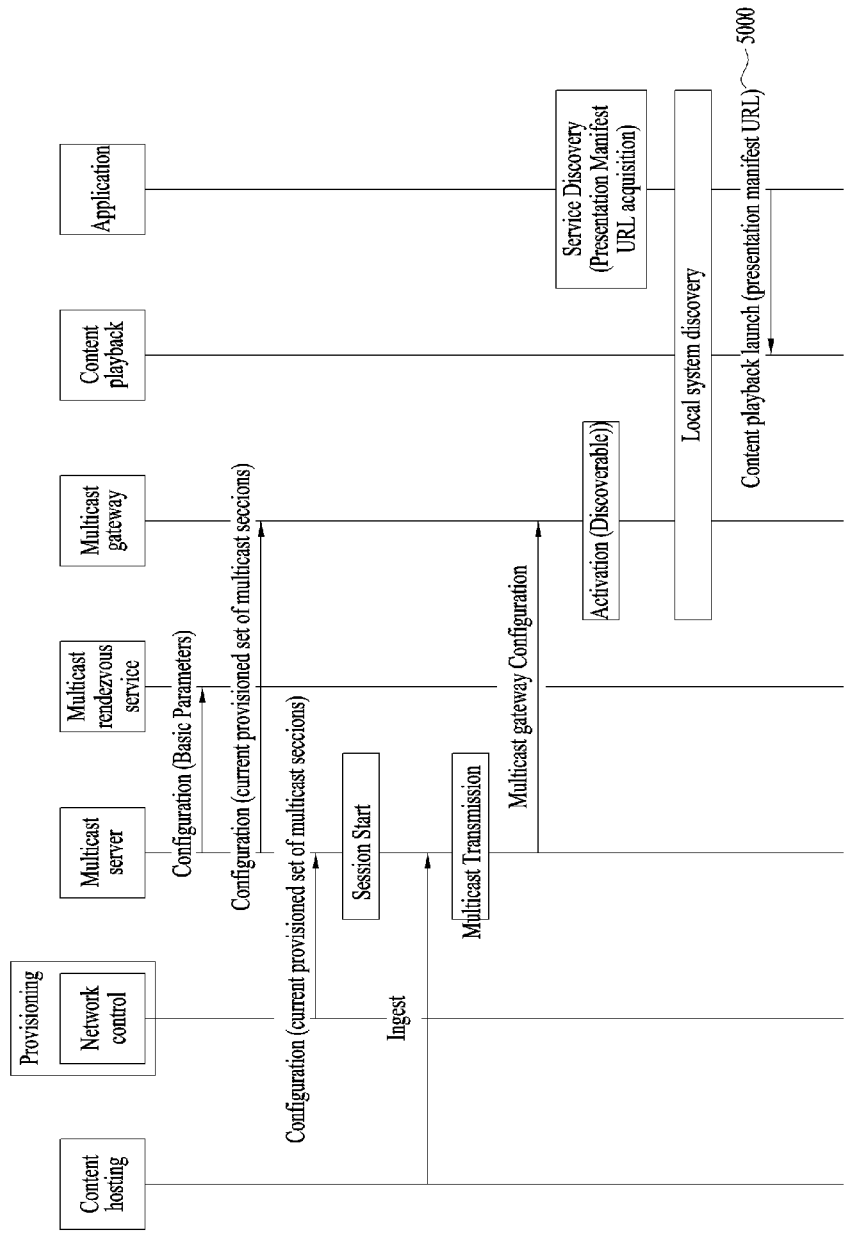
FIGS. 5 and 6 illustrate a flowchart of multicast-based media reception according to embodiments.
Figure 6:
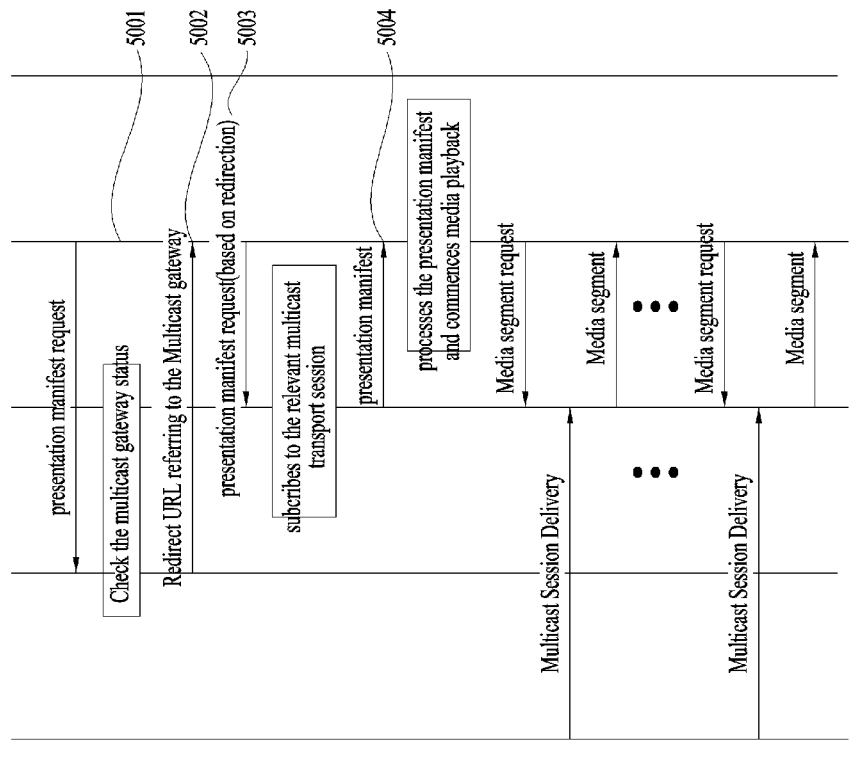

FIGS. 5 and 6 illustrate a flowchart of multicast-based media reception according to embodiments.

The multicast signal processing method/apparatus (FIGS. 1 to 4) according to embodiments may receive multicast media based on the following flowchart.

Multicast Operation According to Embodiments:

When a user or the multicast signal processing apparatus selects multicast content desired to be received, a corresponding application may acquire a URL for requesting an initial presentation manifest through a service directory (5000). In this case, the URL points to a multicast rendezvous service function.

The application controls a content playback function to start an operation for receiving content, and in this case, the application may transfer the URL for the multicast rendezvous service function.

The content playback function makes a request for the presentation manifest to the multicast rendezvous service function through a reference point B using the URL acquired from the application (5001).

The multicast rendezvous service function checks the status of a multicast gateway. If a service for the requested presentation manifest is defined in a multicast configuration, the multicast rendezvous service function transmits a redirection URL for the multicast gateway to the content playback function (5002). In this case, a multicast session configuration may be included in a transmitted redirection message.

Upon receiving the redirection message, the content playback function makes a request for the presentation manifest to the multicast gateway based on a corresponding redirection (5003).

If the presentation manifest is previously cached in the multicast gateway, the multicast gateway transmits the presentation manifest to the content playback function (5004).

If the presentation manifest is not cached in the multicast gateway, the multicast gateway may fetch the presentation manifest from a content hosting function through a reference point A and transmits the presentation manifest back to the content playback function.

The content playback function may receive a media segment for corresponding content through the multicast gateway based on the received presentation manifest.

In this operation, a syntax of a request URL of an HTTP message that the content playback function transmits to the multicast rendezvous service function is as follows:

http[s]://<Host>/<ManifestPath>[?<field>=<value>
 [&<field>=<value>]*]

FIG. 7 illustrates elements included in a URL according to embodiments.

Elements included in the above URL are as illustrated in FIG. 7.

Host: An FQDN (or an IP address) and optionally a port number of the multicast rendezvous service function.

Manifest path (ManifestPath): A resource path for retrieving a presentation manifest from a specified host.

Authentication token (AToken): An authentication token that authorizes access to the multicast rendezvous service function if required by a system operator. This value may be included in an original presentation manifest URL, may be added by a third-party CDN broker as part of an earlier HTTP redirection URL, or may be generated locally by the application.

Multicast status (MGstatus): A current status of the multicast gateway: 0=inactive, 1=active Multicast ID (MGid): A port number of the multicast gateway, optionally preceded by an IP address: A format is [IP address]:port.

Multicast host (MGhost): A host name of the multicast gateway.

Original (Ori): A hostname (FQDN) of an original targeted host.

The application may replace the original targeted hostname (FQDN) with a local multicast rendezvous service hostname or address. Moreover, in case of relying on the third-party CDN broker, the latter may indicate here the original targeted host name (FQDN) before redirecting a request to the multicast rendezvous service function.

Upon receiving such a request URL, the multicast rendezvous service function may send a 307 temporary redirect response. Here, a syntax of a redirect URL of a location response header is as follows:

http[s]://<Host>[/session ID]/<ManifestPath>
 [?conf=<multicast session

FIG. 8 illustrates elements included in a URL according to embodiments.

Elements included in the above URL are illustrated in FIG. 8.

Host: An IP address or fully qualified domain name (FQDN) and optionally a port number of a multicast gateway (e.g., "router.example:8088" or "192.0.2.1:8088").

Session ID: A unique presentation session identifier delivered and generated by a multicast rendezvous service function, including one or more URL path elements.

ManifestPath: A resource path for retrieving a presentation manifest from a specified host.

conf: Multicast session parameters take the form of a multicast gateway configuration instance document including one multicast session.

The document is compressed using Gzip and base64url encoding prior to inclusion as a URL query string parameter.

In this case, if the presentation manifest is related to a multicast session in a multicast session configuration (a service is capable of being transmitted in multicast), the multicast rendezvous service function may redirect a request to the multicast gateway as follows:

HTTP/1.1 307 Temporary Redirect
Server: <Multicast gateway>
Location: http[s]://<Multicast gateway>/<ManifestPath>

A URL corresponding to a location field of an HTTP header may include a session identifier and a query parameter for piggybacking a multicast gateway configuration instance document including a multicast session corresponding to a requested presentation manifest.

A multicast ABR according to embodiments may be connected to a 5G network (communication network).

Figure 9:
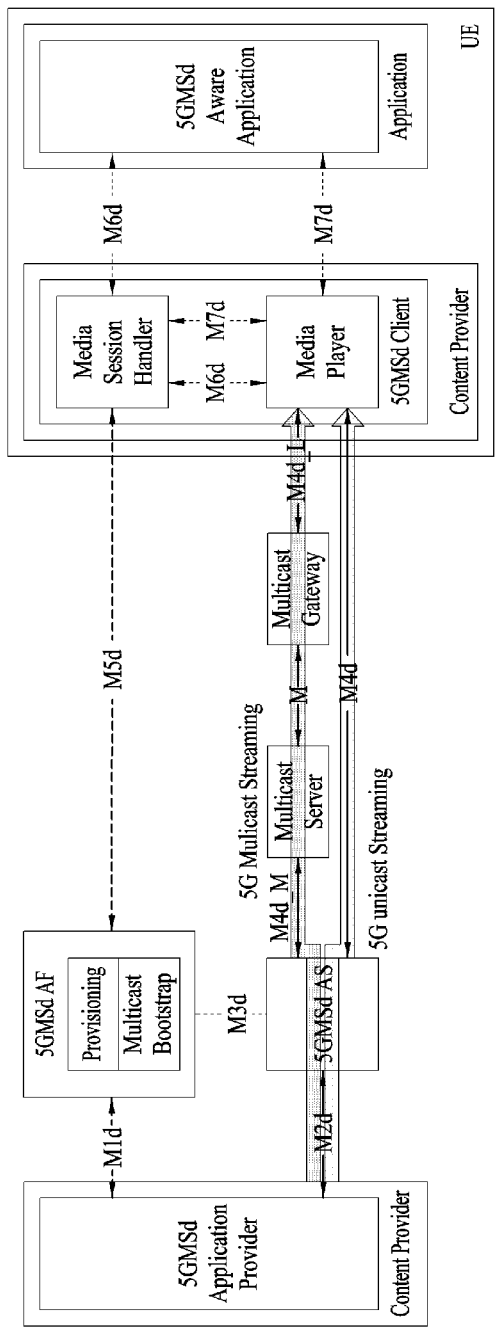
FIG. 9 illustrates a method of applying multicast to 5G media streaming according to embodiments.

FIG. 9 illustrates a method of applying multicast to 5G media streaming according to embodiments.

The multicast signal processing method/apparatus according to embodiments may support multicast in a 5G media streaming architecture (multicast ABR architecture). FIG. 9 illustrates an embodiment of the 5G media streaming architecture to which the multicast ABR architecture is applied. That is, the 5G architecture and a DVB architecture may be combined with each other.

A 5G application provider (5G media streaming downlink (5GMSd) application provider) may be the same as the content provider of the multicast ABR illustrated in FIGS. 1 to 6 or may be a part of the content provider. An application (5GMSd aware application) for receiving corresponding 5G media streaming may be the same as the application of the multicast ABR of FIGS. 1 to 6 or may be a part of the application. A client (5GMSd client) may be the same as the content playback function of the multicast ABR illustrated in FIGS. 1 to 5 or a part of the content playback function. A control unit (5GMSd AF) may include the provisioning function including a network control subfunction of the multicast ABR, illustrated in FIGS. 1 to 6, and the multicast bootstrap function including the multicast rendezvous service function.

Access information (presentation manifest URL) required when the 5GMSd client performs initial multicast transmission may be requested and received through an interface M5d that may correspond to the interface B of the multicast ABR illustrated in FIGS. 1 to 6.

Unicast streaming is transmitted from a 5GMSd application server (AS) to a media player through an interface M4d. In this case, HTTP(S) may be used.

A multicast server and a multicast gateway may be configured for multicast transmission between the 5GMSd AS and the media player. Since data is transmitted between the multicast gateway and the media player through a 5G RAN, only unicast may be supported therebetween.

For multicast transmission, interfaces M4d_M and M4d_L may be defined as follows.

M4d_M—Multicast streaming is transmitted from the 5GMSd AS to the multicast server through the interface M4d_M, and the interface M defined in the multicast ABR may be used between the multicast server and the multicast gateway. As another embodiment, the multicast server function may be included in the 5GMS AS. In this case, the interface M4d_M may be omitted. As a multicast protocol, a protocol defined in the interface M may be used.

M4d_L—The interface M4d_L may be used between the multicast gateway and the media player. Here, M4d_M and M4d_L may use a protocol based on HTTP(S). From the viewpoint of a DVB multicast ABR, M4d_M may correspond to the interface Ingest and M4d_L may correspond to the interface L.

Figure 10:
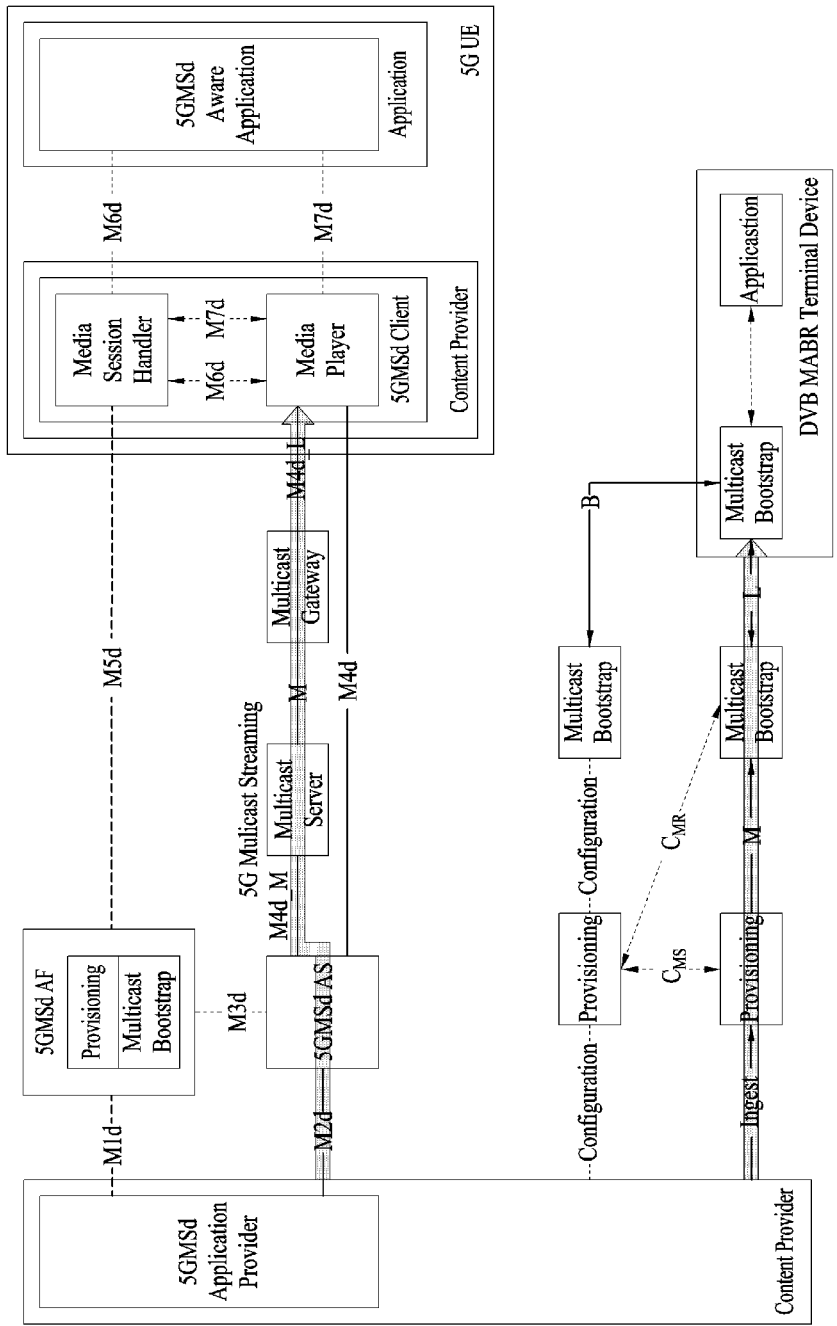
FIG. 10 illustrates a multicast streaming architecture for both a multicast network and a communication streaming network according to embodiments.

FIG. 10 illustrates a multicast streaming architecture for both a multicast network and a communication streaming network according to embodiments.

The multicast signal processing method/apparatus according to embodiments may transmit/receive and process media content when multicast streaming is simultaneously serviced through a DVB multicast ABR network and a 5G media streaming network. Each component illustrated in FIG. 10 corresponds to hardware, software, a processor, and/or a combination thereof.

A plurality of networks through which a multicast streaming service is provided may exist. When a 5G network is one of such networks, a use case in which a multicast service is simultaneously provided from the same content provider through the 5G mobile network and other IP networks according to embodiments may be considered. FIG. 10 illustrates an embodiment in which the multicast streaming service is simultaneously provided to the 5G network and the DVB multicast ABR network.

A provisioning function for a multicast session configuration may be defined separately according to characteristics of each network. The multicast interface M, which delivers media from a multicast server to a multicast gateway, may be configured identically.

In this case, the interfaces M2d and M4d_M, defined in the 5G network, may be the same interface as the interface Ingest. Due to this, a content provider may maintain the same protocol transmitted through each network.

Figure 11:
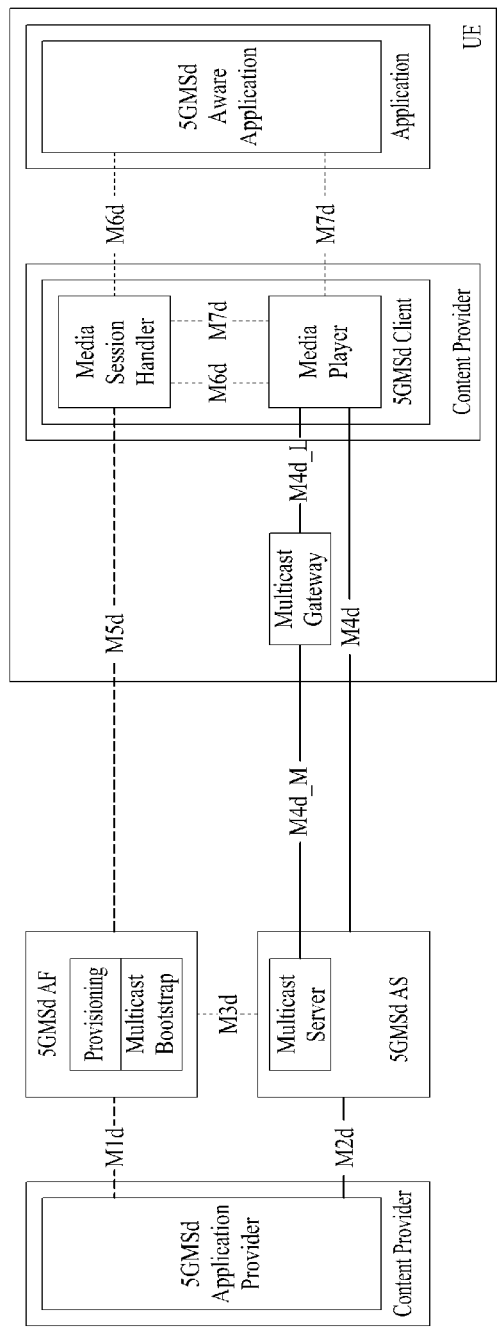
FIG. 11 illustrates an architecture for wireless media transmission based on multicast and broadcast in a communication network according to embodiments.

FIG. 11 illustrates an architecture for wireless media transmission based on multicast and broadcast in a communication network according to embodiments.

If wireless transmission based on multicast and broadcast is supported in a 5G RAN, a multicast gateway may be configured inside a 5G UE. Each component illustrated in FIG. 11 corresponds to hardware, software, a processor, and/or a combination thereof.

A 5GMSd application provider may be the same as the content provider of the multicast ABR or may be a part of the content provider. A 5GMSd aware application for receiving 5G media streaming may be the same as the application of the multicast ABR or may be a part of the application. A 5GMSd client may be the same as the content playback function of the multicast ABR or a part of the content playback function. A 5GMSd AF may include the provisioning function including the network control subfunction of the multicast ABR and include the multicast bootstrap function including the multicast rendezvous service function.

Access information (presentation manifest URL) required when the 5GMSd client performs initial multicast transmission may be requested and received through an interface M5d that may correspond to the interface B of the multicast ABR.

Unicast streaming is transmitted from a 5GMSd AS to a media player through an interface M4d. In this case, HTTP (S) may be used.

A multicast server and a multicast gateway may be configured for multicast transmission between the 5GMSd AS and the media player. In this case, an interface M4d_L between the multicast gateway and the media player may be implemented by an interface within a UE.

An interface M4d_M between the multicast server and the multicast gateway may be defined as the same interface as the interface M defined in the multicast ABR. Therefore, a multicast protocol may use the protocol defined in the interface M.

The method/apparatus/processor (multicast signal processing method/apparatus) according to embodiments may perform the above-described network control operations and provide a media architecture for 5G network-based multicast media streaming based on related signaling information. The operations according to embodiments provide, during multicast streaming, an effect of receiving multicast content through various access methods without depending on a network to which a reception device is connected. Further, the proposed multicast transmission architecture may cause the same content to be transmitted to a plurality of devices so that network resources may be efficiently used.

Embodiments include a multicast ABR architecture based on multiple IP networks.

According to embodiments, the multiple IP networks may include various networks such as communication and broadcast networks.

In order to apply the multicast ABR architecture and interfaces according to embodiments to each network for an actual service, an additional architecture configuration and an interface application method therefor are described. Each component included in the architecture according to embodiments may correspond to hardware, software, a processor, and/or a combination thereof.

FIGS. 9 to 11 correspond to the multicast signal processing method/apparatus according to embodiments illustrated in FIGS. 1 to 6.

Figure 12:
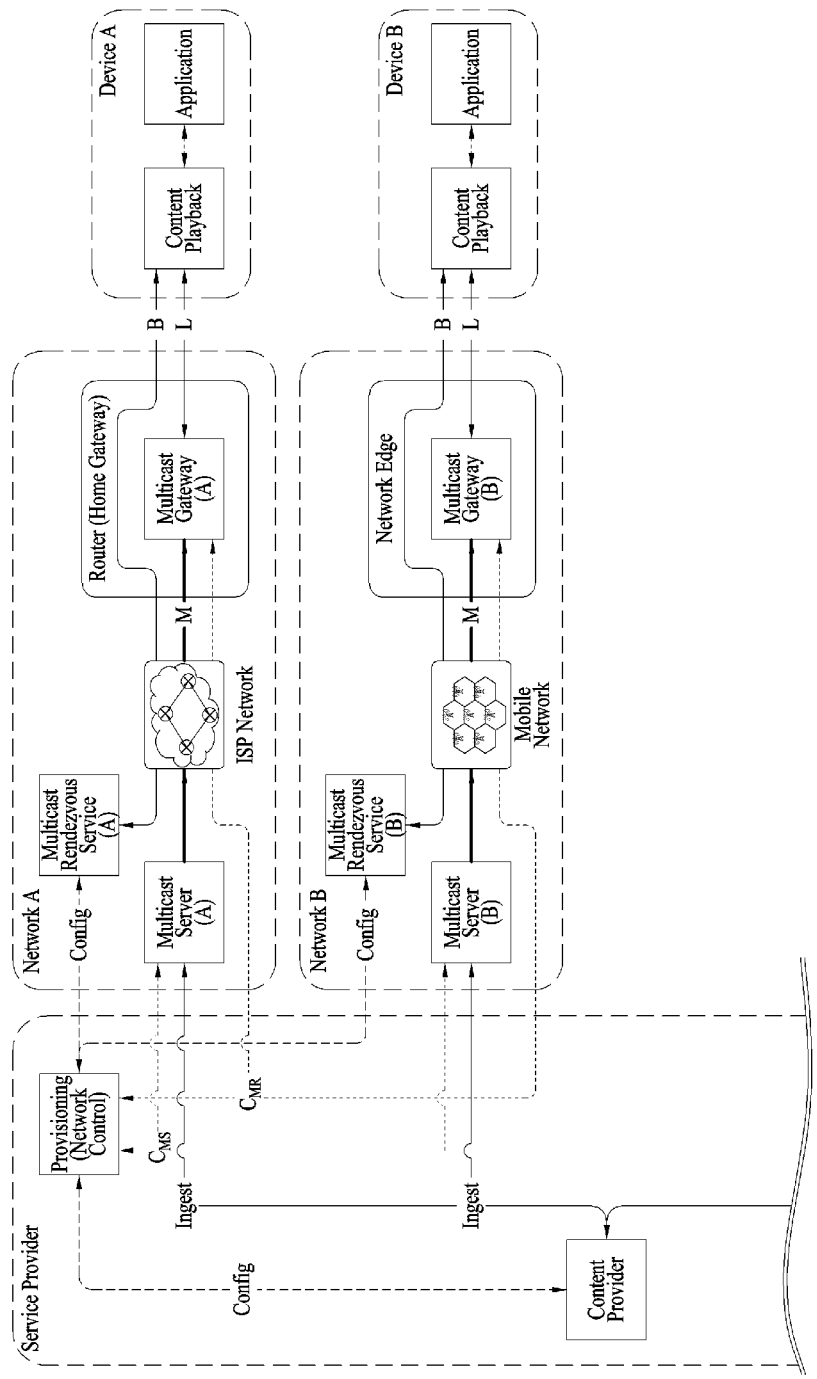
FIGS. 12 and 13 illustrate an exemplary configuration of a multicast server in each network according to embodiments.
Figure 13:
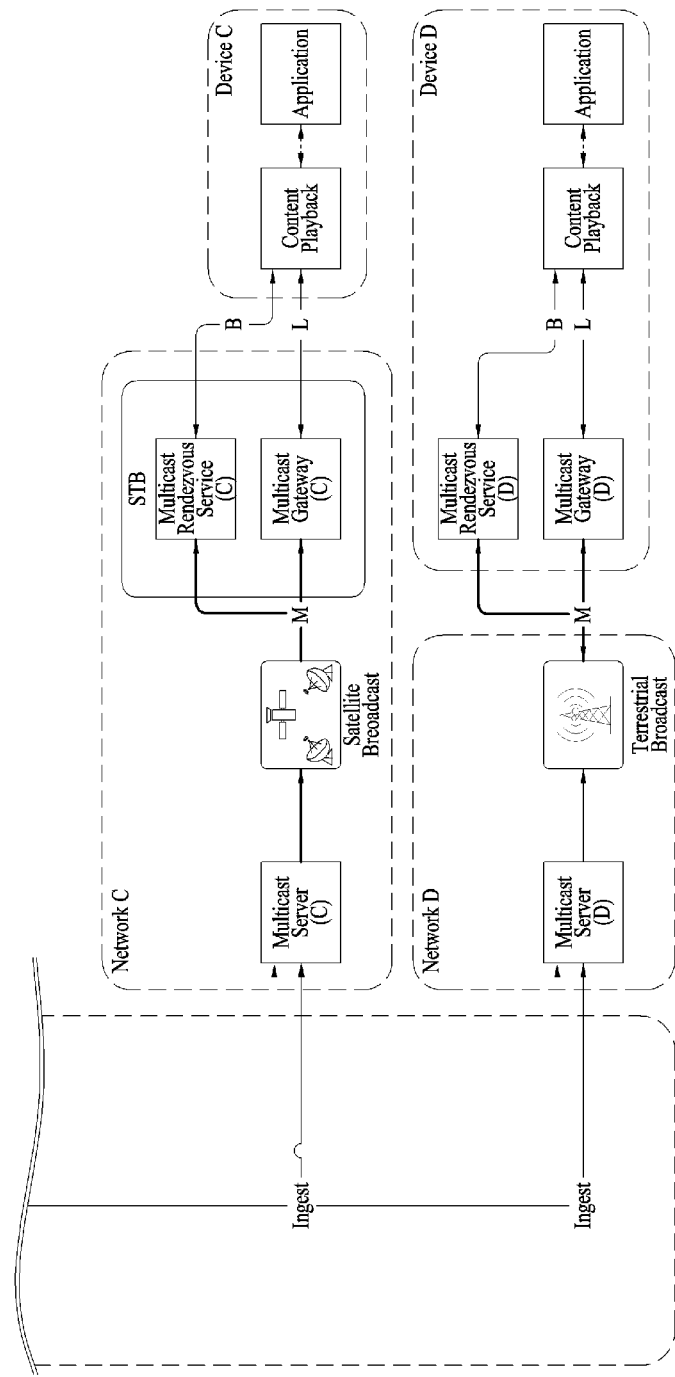

FIGS. 12 and 13 illustrate an exemplary configuration of a multicast server in each network according to embodiments.

FIGS. 12 and 13 illustrate an embodiment of an architecture in which a multicast server is configured for each network to provide a multicast ABR service. This architecture mainly corresponds to the case in which the multicast service server is deployed by a network operator. A transmission/reception device according to embodiments may provide the multicast ABR service based on the architecture of the multicast server illustrated in the above figures. Each component illustrated in FIGS. 12 and 13 corresponds to hardware, software, a processor, and/or a combination thereof.

When ABR multicast is serviced through multiple heterogeneous networks, a multicast gateway that receives the multicast ABR service may be separately deployed.

Multicast gateway A—When the multicast gateway is configured for the multicast ABR service in an Internet service provider (ISP) network, the multicast gateway may be configured within a router or a home gateway provided by an ISP operator.

Multicast gateway B—When the multicast gateway is configured for the multicast ABR service in a mobile network such as a 5G system, the multicast gateway may be configured within an edge of the mobile network.

Multicast gateway C—When the multicast gateway is configured for the multicast ABR service in a satellite broadcast network, the multicast gateway may be configured within an STB capable of receiving satellite broadcasting.

Multicast gateway D—When the multicast gateway is configured for the multicast ABR service in a terrestrial broadcast network, the multicast gateway may be configured within a broadcast receiver.

Even when such a multicast ABR service is provided through a plurality of heterogeneous networks, an ABR multicast function may be configured independently for each network.

Figure 14:
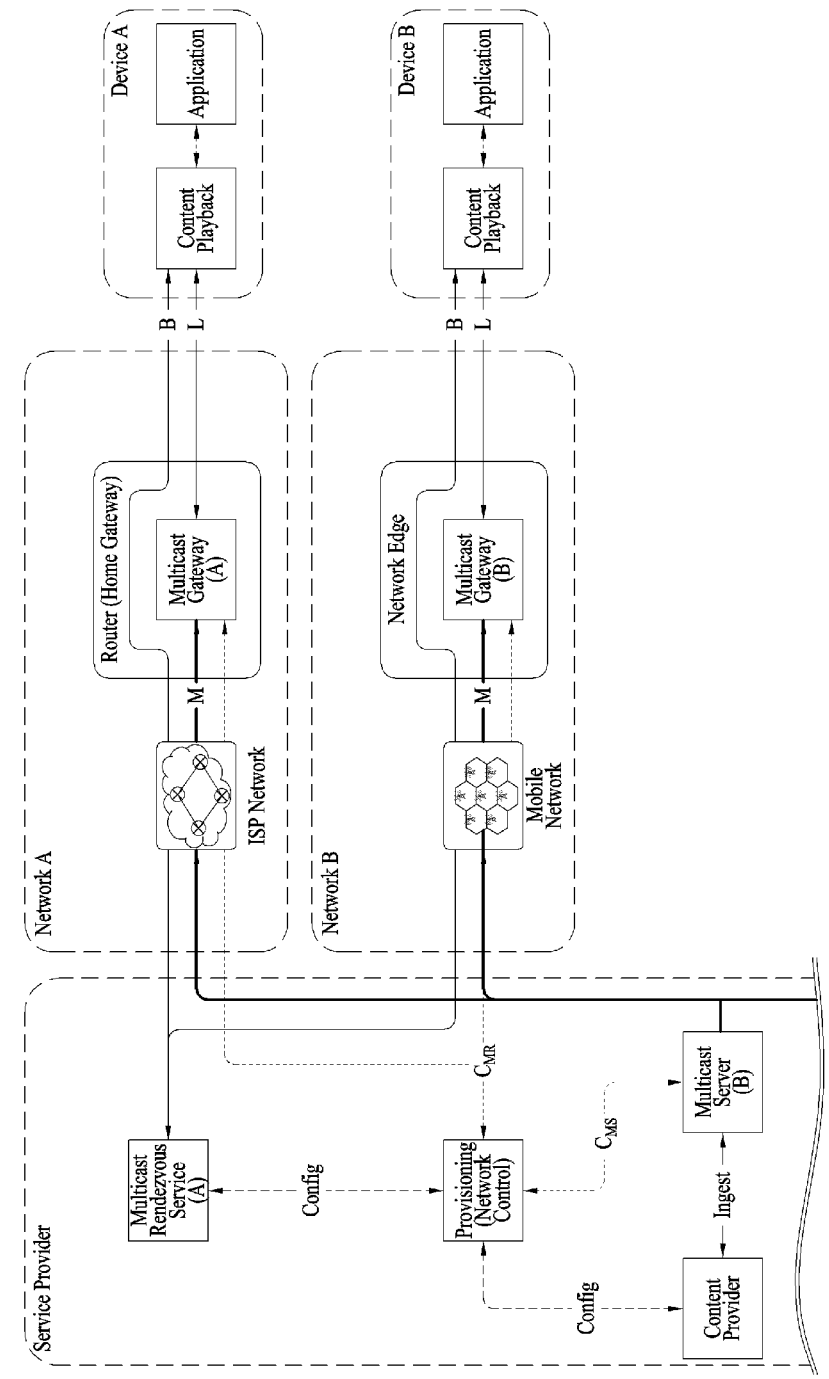
FIGS. 14 and 15 illustrate an exemplary configuration of a multicast server for all networks according to embodiments.
Figure 15:
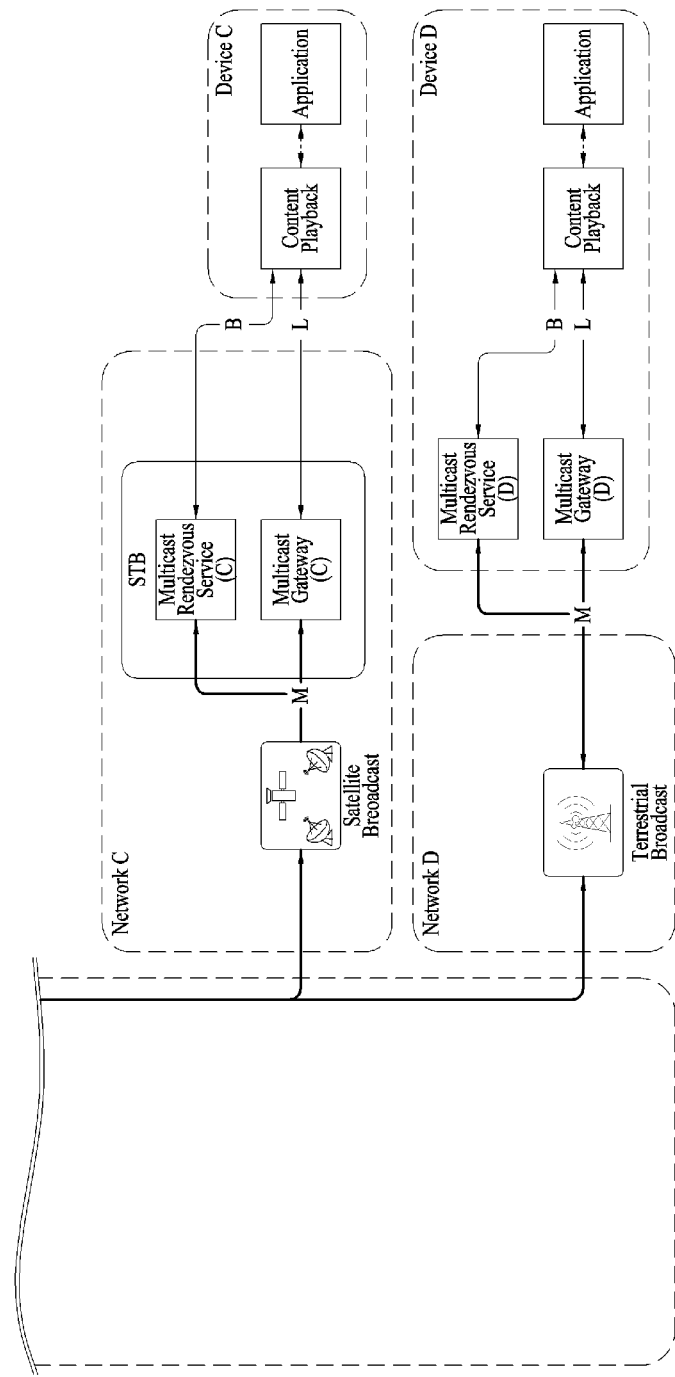

FIGS. 14 and 15 illustrate an exemplary configuration of a multicast server for all networks according to embodiments.

An embodiment of an architecture in which a single multicast server provides a multicast ABR service through a plurality of heterogeneous networks is illustrated. This architecture mainly corresponds to the case in which the multicast service server is deployed by a content provider. The transmission/reception device according to embodiments may provide the multicast ABR service based on the architecture of the multicast server illustrated in the above figures.

Each component illustrated in FIGS. 14 and 15 corresponds to hardware, software, a processor, and/or a combination thereof.

When ABR multicast is serviced through multiple heterogeneous networks, a multicast gateway that receives the multicast ABR service may be separately deployed.

Multicast gateway A—When the multicast gateway is configured for the multicast ABR service in an ISP network, the multicast gateway may be configured within a router or a home gateway provided by an ISP operator.

Multicast gateway B—When the multicast gateway is configured for the multicast ABR service in a mobile network such as a 5G system, the multicast gateway may be configured within an edge of the mobile network.

Multicast gateway C—When the multicast gateway is configured for the multicast ABR service in a satellite broadcast network, the multicast gateway may be configured within an STB capable of receiving satellite broadcasting.

Multicast gateway D—When the multicast gateway is configured for the multicast ABR service in a terrestrial broadcast network, the multicast gateway may be configured within a broadcast receiver.

Even when such a multicast ABR service is provided through a plurality of heterogeneous networks, an ABR multicast function may be configured independently for each network.

Figure 16:
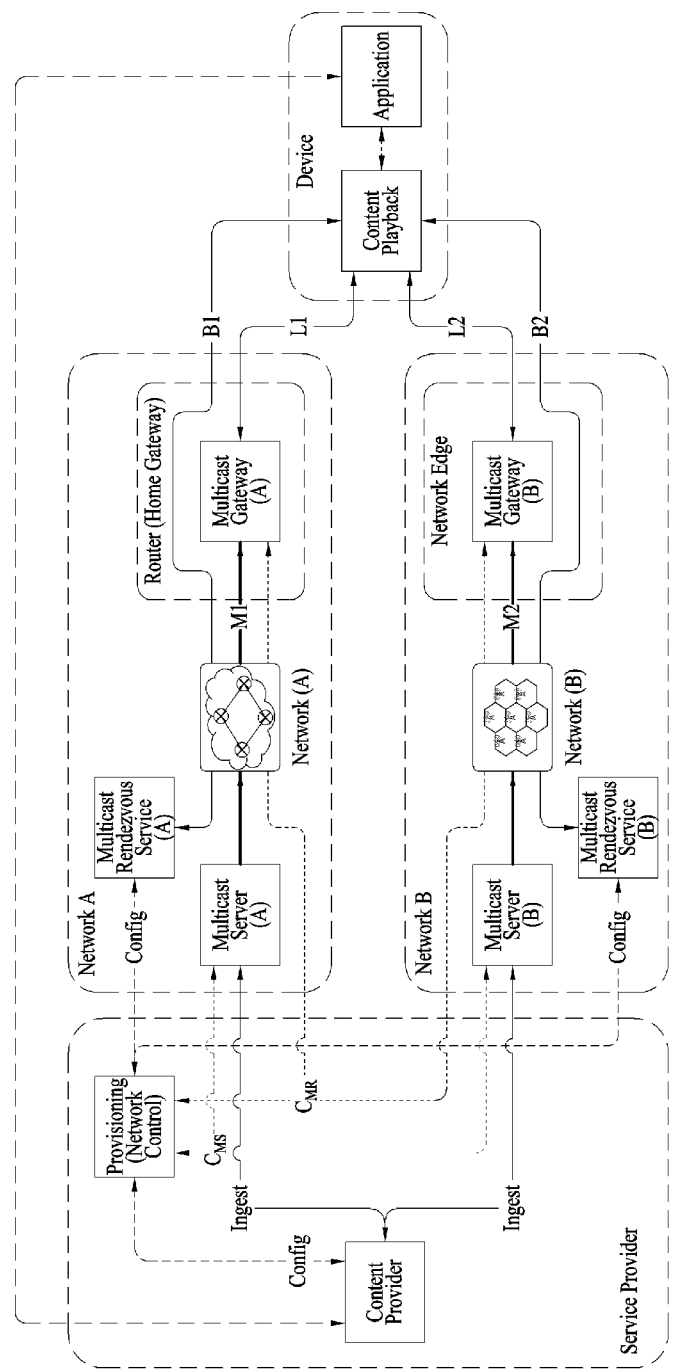
FIG. 16 illustrates exemplary multiple networks that a device accesses according to embodiments.

FIG. 16 illustrates exemplary multiple networks that a device accesses according to embodiments.

In a network architecture according to embodiments, the multicast signal processing method/apparatus according to embodiments capable of receiving the same multicast media service by accessing a plurality of networks may be considered. An embodiment of architectures and ABR multicast interfaces for the multicast signal processing method/apparatus according to embodiments capable of receiving the same multicast streaming service by accessing multiple networks will now be described. Embodiments may be implemented in a variety of architectures.

An embodiment is illustrated for the case in which all multicast rendezvous service functions are configured in regular deployment when a multicast server and a multicast gateway are configured in each network. A system according to embodiments may include a service provider, network(s), and a device. Configurations of the service provider, the network(s), and the device according to embodiments are as illustrated in FIG. 16. Each component illustrated in FIG. 16 corresponds to hardware, software, a processor, and/or a combination thereof.

In the architecture according to embodiments, multicast servers, multicast gateways, and multicast rendezvous service functions for respective networks provide services to a content playback function connected to each network. For example, the case in which the device accesses Wi-Fi through an ISP network and simultaneously accesses a mobile network may be considered.

Two L interfaces L1 and L2 and two B interfaces B1 and B2 may be configured for the content playback function in the device. The content playback function may receive media streaming from a multicast gateway A through the interface L1 and receive initial access information about the multicast gateway A through the interface B1. The content playback function may receive media streaming from a multicast gateway B through the interface L2 and receive initial access information about the multicast gateway B through the interface B2.

An application acquires a list of multicast services and access information about a corresponding multicast rendezvous service function through a service discovery interface. The service discovery interface may follow a method separately defined between the service provider and the application. In addition, each network may support data transmission and reception for the service discovery interface.

FIGS. 12 to 16 illustrate examples in which the multicast signal processing apparatus according to embodiments, illustrated in FIGS. 1 to 6 and FIGS. 9 to 11, is configured according to network types according to embodiments.

A flow of a procedure of receiving the same service even after a network is changed, after a procedure in which a device acquires a manifest and receives multicast media for an architecture, is illustrated.

A network change according to embodiments may include, for example, a change between network A (Wi-Fi) and network B (5G).

Figure 17:
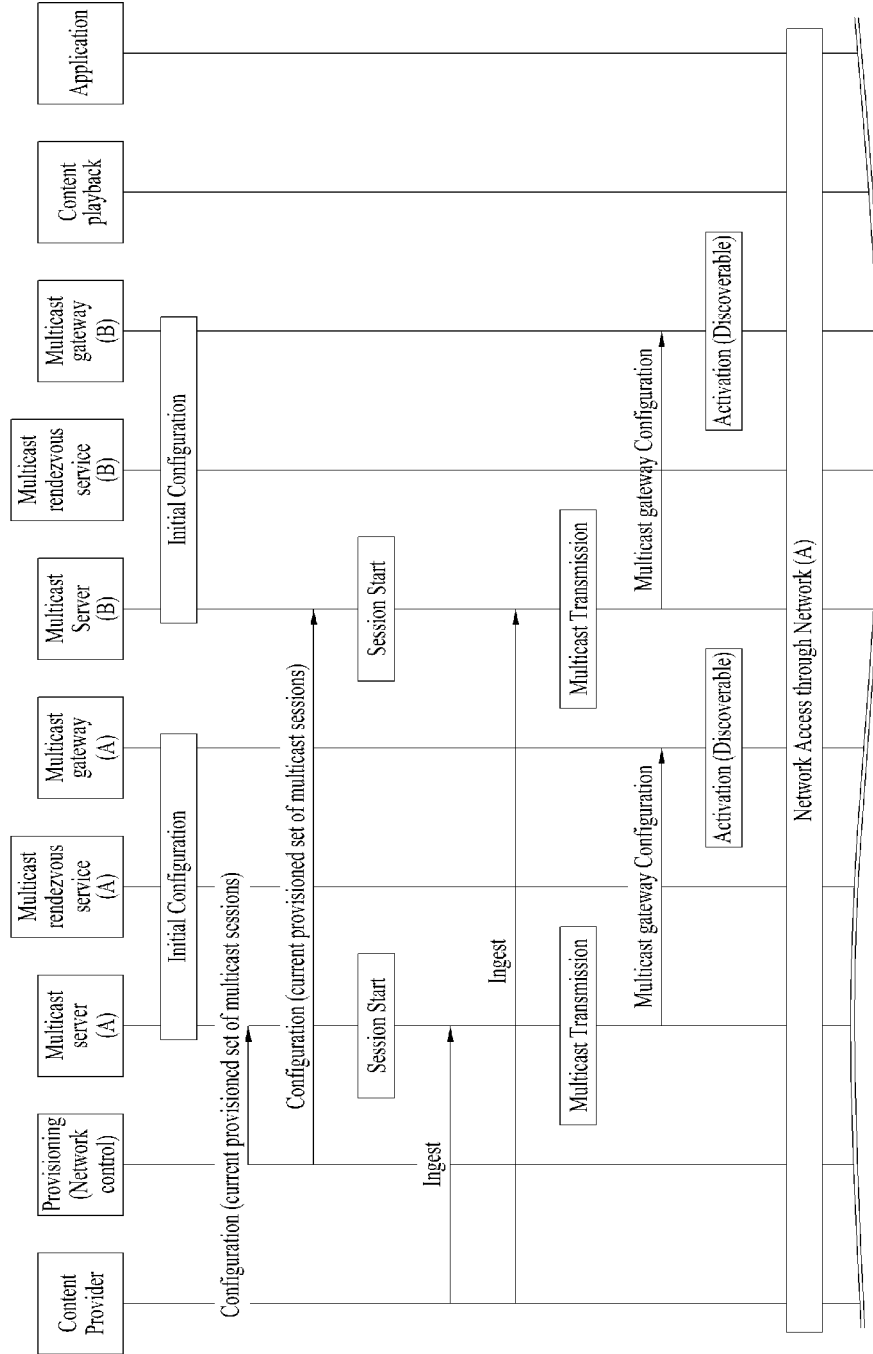
FIGS. 17, 18, and 19 illustrate a flowchart of a network change according to embodiments.
Figure 18:
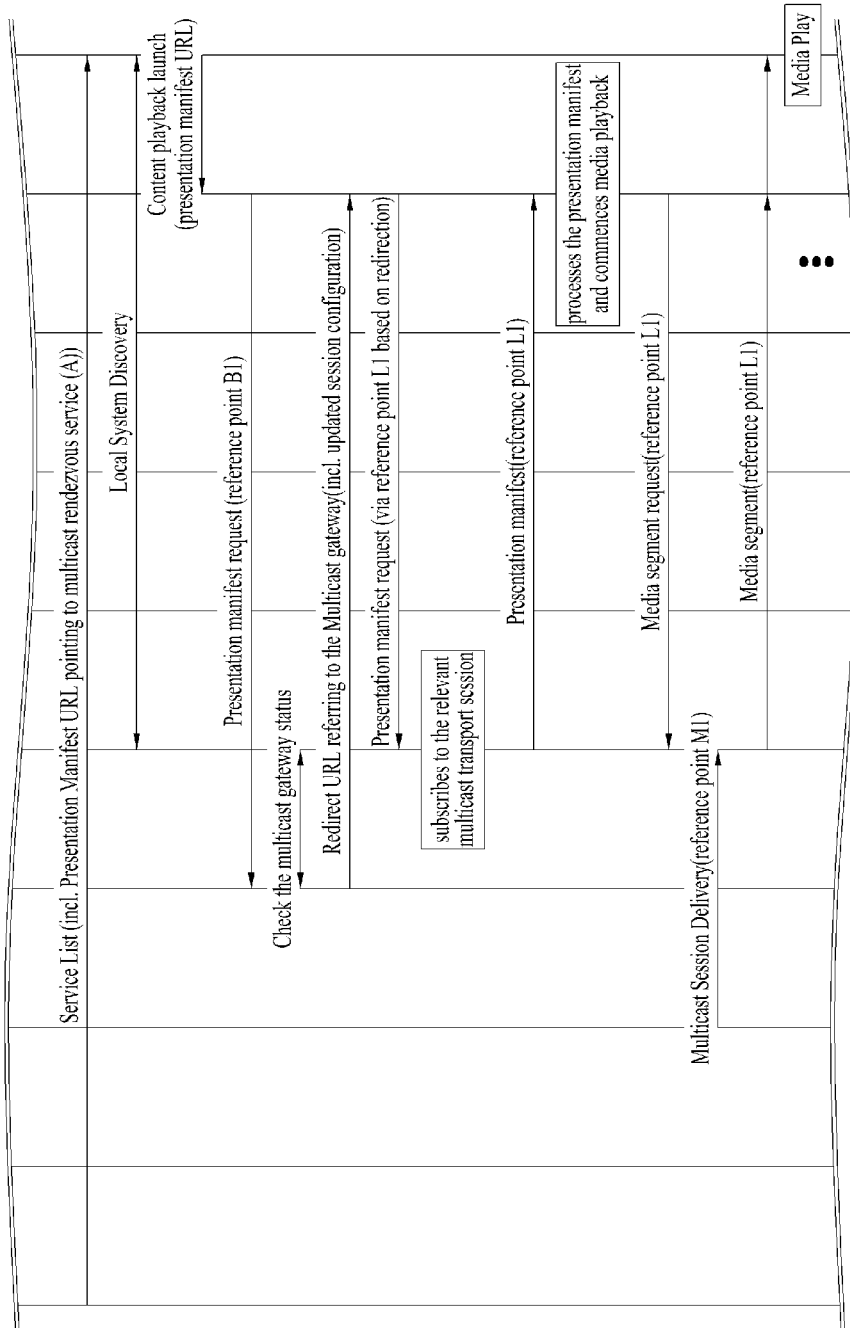
Figure 19:
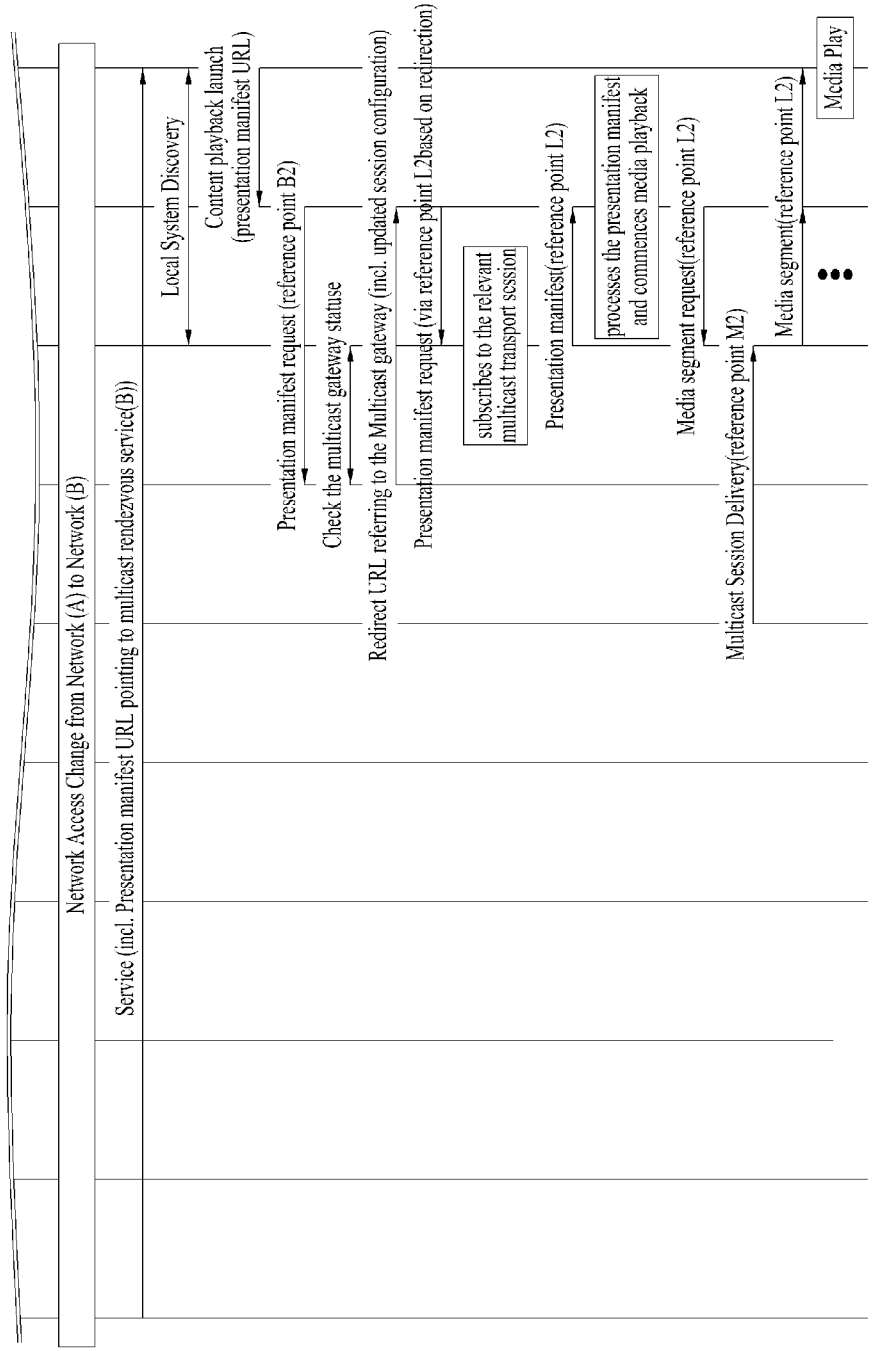

FIGS. 17, 18, and 19 illustrate a flowchart of a network change according to embodiments.

The flowchart of FIGS. 17 to 19 may be performed according to embodiments illustrated in FIGS. 1 to 6 and FIGS. 9 to 16. Each component constituting embodiments corresponds to hardware, software, a processor, and/or a combination thereof.

A flow related to the multicast server proceeds as follows.

Each function is deployed according to this architecture, and a configuration for the multicast service is applied to the multicast servers, the multicast gateways, and the multicast rendezvous service functions.

A provisioning function transmits configuration information about a currently provisioned multicast session to a multicast server A and a multicast server B through network control.

The configuration information about the multicast session may be delivered through multicast session elements illustrated in FIGS. 51 and 52.

If the multicast session is started, a media segment is ingested from a content provider to the multicast server A and the multicast server B to start multicast transmission. If there is a multicast gateway capable of receiving the media segment, the multicast gateway enters a receivable state.

When the device accesses a network A, the following operation may be performed.

The application may receive a service list from the service provider via the network A. To receive the service list, a service list acquisition method defined in the network A may be used. For example, if a service directory is configured in a DVB-I network, the application may receive the service list through interaction between the service provider, the service directory, and the application. For an ABR multicast operation, the service list may include a URL to request a presentation manifest mapped to a service ID.

The service list may be transmitted through service list elements illustrated in FIG. 50.

When a user selects multicast content to be received, the application may acquire a URL for requesting an initial presentation manifest through the service directory. In this case, the URL points to a multicast rendezvous service function A.

The application controls the content playback function to start an operation for receiving content. In this case, the application may deliver the URL for the multicast rendezvous service function A.

The content playback function makes a request for the presentation manifest to the multicast rendezvous service function A through the reference point B1 using the URL transmitted by the application.

The content playback function may make a request for the manifest through manifest request and redirection information illustrated in FIG. 52.

The multicast rendezvous service function A checks the status of the multicast gateway A configured in the same network. If a service for the requested presentation manifest is defined in a multicast configuration, the multicast rendezvous service function A transmits a redirection URL for the multicast gateway A to the content playback function. In this case, an updated multicast session configuration may be included in a transmitted redirection message.

Redirection may be performed through the manifest request and redirection information illustrated in FIG. 52.

Upon receiving the redirection message, the content playback function makes a request for the presentation manifest to the multicast gateway A through the reference point L1 according to the redirection.

Figure 47:
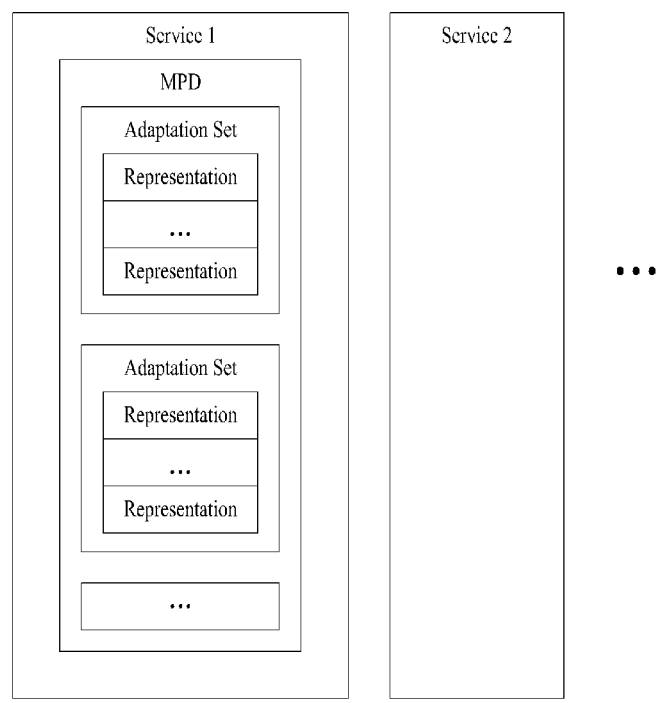
FIG. 47 illustrates services and configurations of service information according to embodiments.
Figure 48:
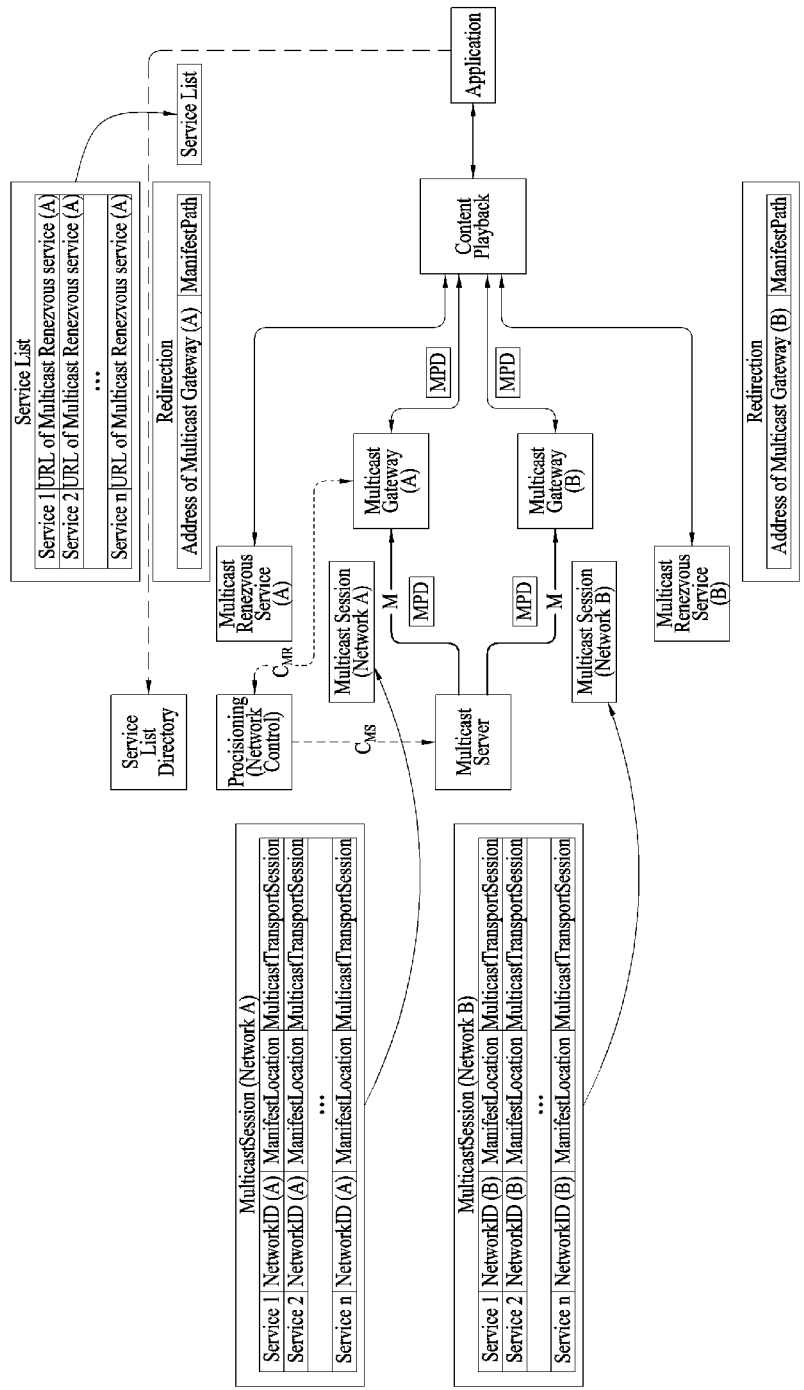
FIG. 48 illustrates a method of generating and transmitting a service list and a presentation manifest for ABR multicast according to embodiments.
Figure 49:
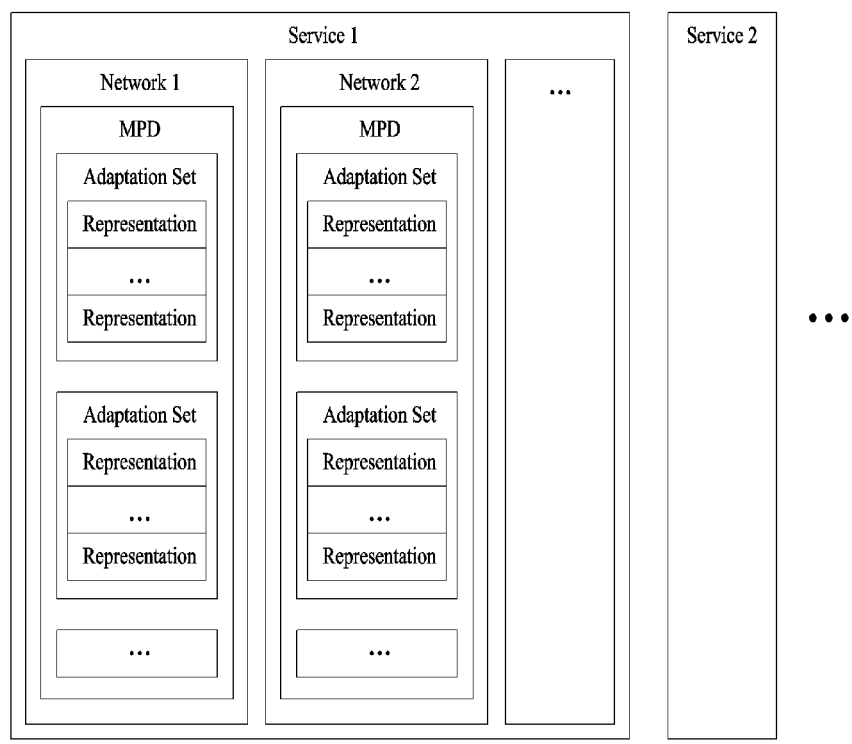
FIG. 49 illustrates management of a service list and a presentation manifest according to embodiments.

The content playback function may request the presentation manifest illustrated in FIGS. 47 to 49.

If the presentation manifest is previously cached in the multicast gateway A, the multicast gateway A transmits the presentation manifest to the content playback function.

The content playback function requests a media segment for corresponding content based on the received presentation manifest.

Multicast streaming is transmitted from the multicast server A to the multicast gateway A through an interface M1.

The content playback function may receive the requested media segment from the multicast gateway A and media is played. If there is no separate control, the media is continuously played.

In this state, if the device changes access from the network A to a network B, the following operation may be performed.

The application may receive the service list from the service provider via the network B. To receive the service list, a service list acquisition method defined in the network B may be used. In order to continuously receive the multicast session received through the network A, session information about a corresponding service ID may be exchanged. The received service list may include a URL to request a presentation manifest mapped to the service ID.

For a service being received, the application may obtain the URL to request the presentation manifest. In this case, the URL points to a multicast rendezvous service function B.

The application controls the content playback function to start an operation for receiving content. In this case, the application may deliver the URL for the multicast rendezvous service function B.

The content playback function makes a request for the presentation manifest to the multicast rendezvous service function B through the reference point B2 using the URL transmitted by the application.

The multicast rendezvous service function B checks the status of a multicast gateway B configured in the same network. If a service for the requested presentation manifest is defined in a multicast configuration, the multicast rendezvous service function B transmits a redirection URL for the multicast gateway B to the content playback function. In this case, an updated multicast session configuration may be included in a transmitted redirection message.

Upon receiving the redirection message, the content playback function makes a request for the presentation manifest to the multicast gateway B through the reference point L2 based on the redirection.

If the presentation manifest is previously cached in the multicast gateway B, the multicast gateway B transmits the presentation manifest to the content playback function.

The content playback function requests a media segment for corresponding content based on the received presentation manifest.

Multicast streaming is transmitted from the multicast server B to the multicast gateway B through an interface M2.

The content playback function may receive the requested media segment from the multicast gateway B and the media is played. If there is no separate control, the media is continuously played.

Figure 20:
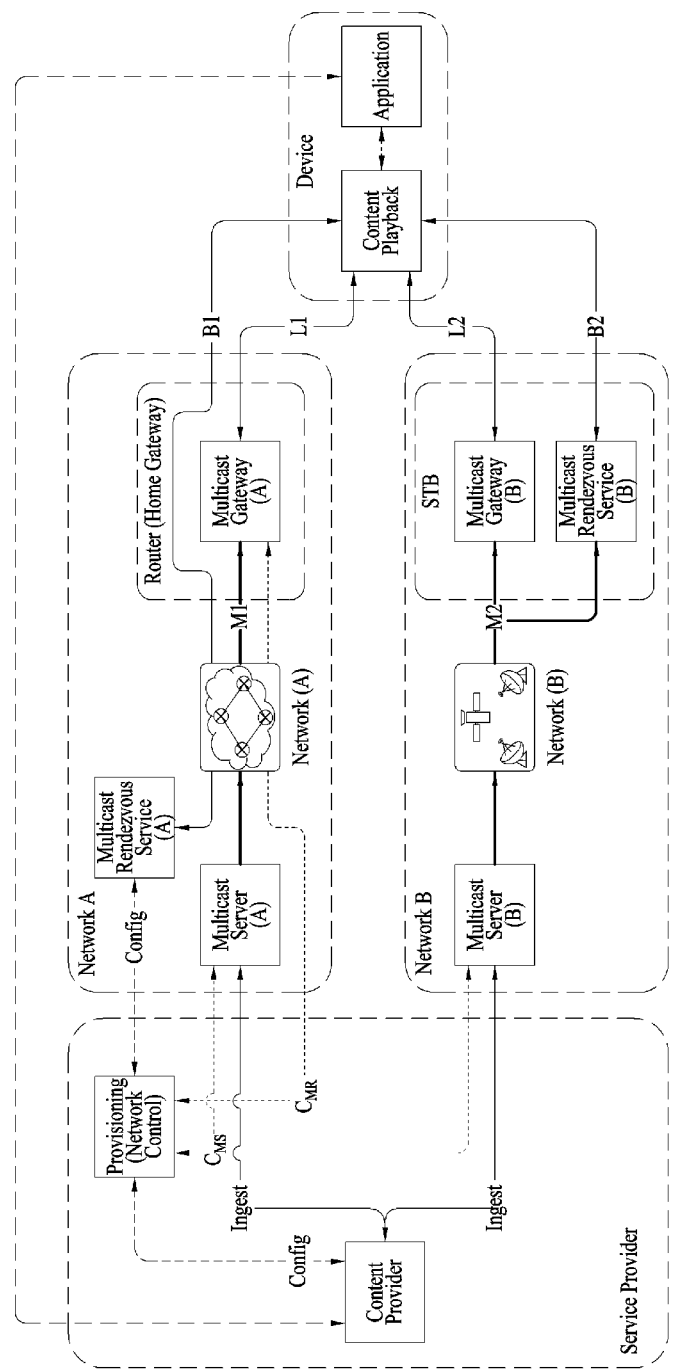
FIG. 20 illustrates an example in which multicast servers and multicast gateways are configured in respective networks according to embodiments.

FIG. 20 illustrates an example in which multicast servers and multicast gateways are configured in respective networks according to embodiments.

Embodiments may include network servers and gateways as illustrated in FIG. 20 in addition to the configuration of FIG. 16.

For the case in which the multicast servers and the multicast gateways are configured in respective networks, an embodiment in which multicast rendezvous service functions are configured in regular deployment and co-located deployment is illustrated. A system according to embodiments may include a service provider, network(s), and a device. Configurations of the service provider, the network(s), and the device according to embodiments are as illustrated in FIG. 20. Each component illustrated in FIG. 20 corresponds to hardware, software, a processor, and/or a combination thereof.

In the above architecture, multicast servers, multicast gateways, and multicast rendezvous service functions for respective networks provide services to a content playback function connected to each network. For example, the case in which the device accesses Wi-Fi through an ISP network and simultaneously accesses an STB through a satellite broadcast network may be considered.

Two L interfaces L1 and L2 and two B interfaces B1 and B2 may be configured for the content playback function in the device. The content playback function may receive media streaming from a multicast gateway A through the interface L1 and receive initial access information about the multicast gateway A through the interface B1. The content playback function may receive media streaming from a multicast gateway B through the interface L2 and receive initial access information about the multicast gateway B through the interface B2.

An application acquires a list of multicast services and access information about a corresponding multicast rendezvous service function through a service discovery interface. The service discovery interface may follow a method separately defined between the service provider and the application. In addition, each network may support data transmission and reception for the service discovery interface.

Figure 21:
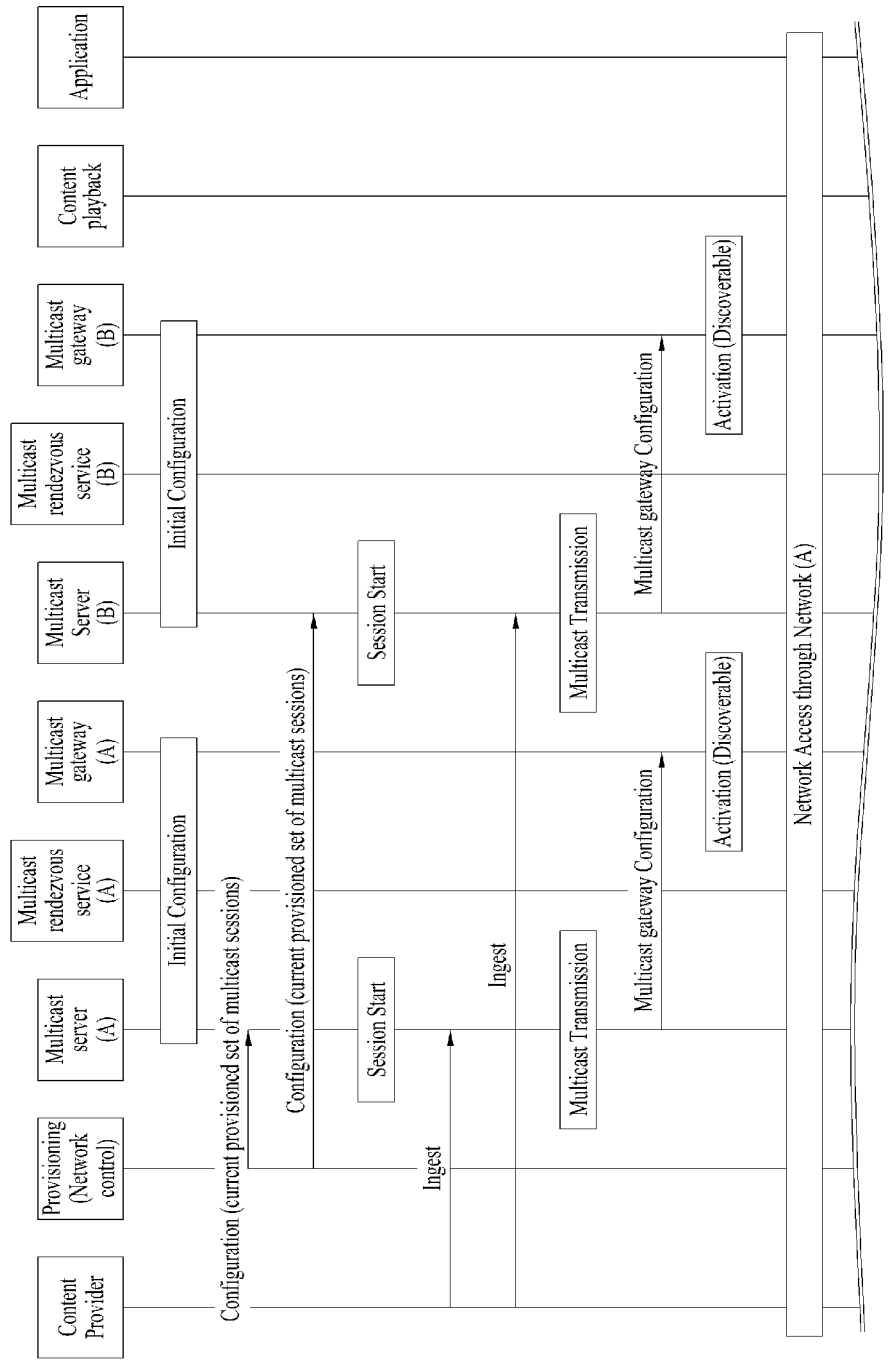
FIGS. 21, 22, and 23 illustrate a flowchart of a network change according to embodiments.
Figure 22:
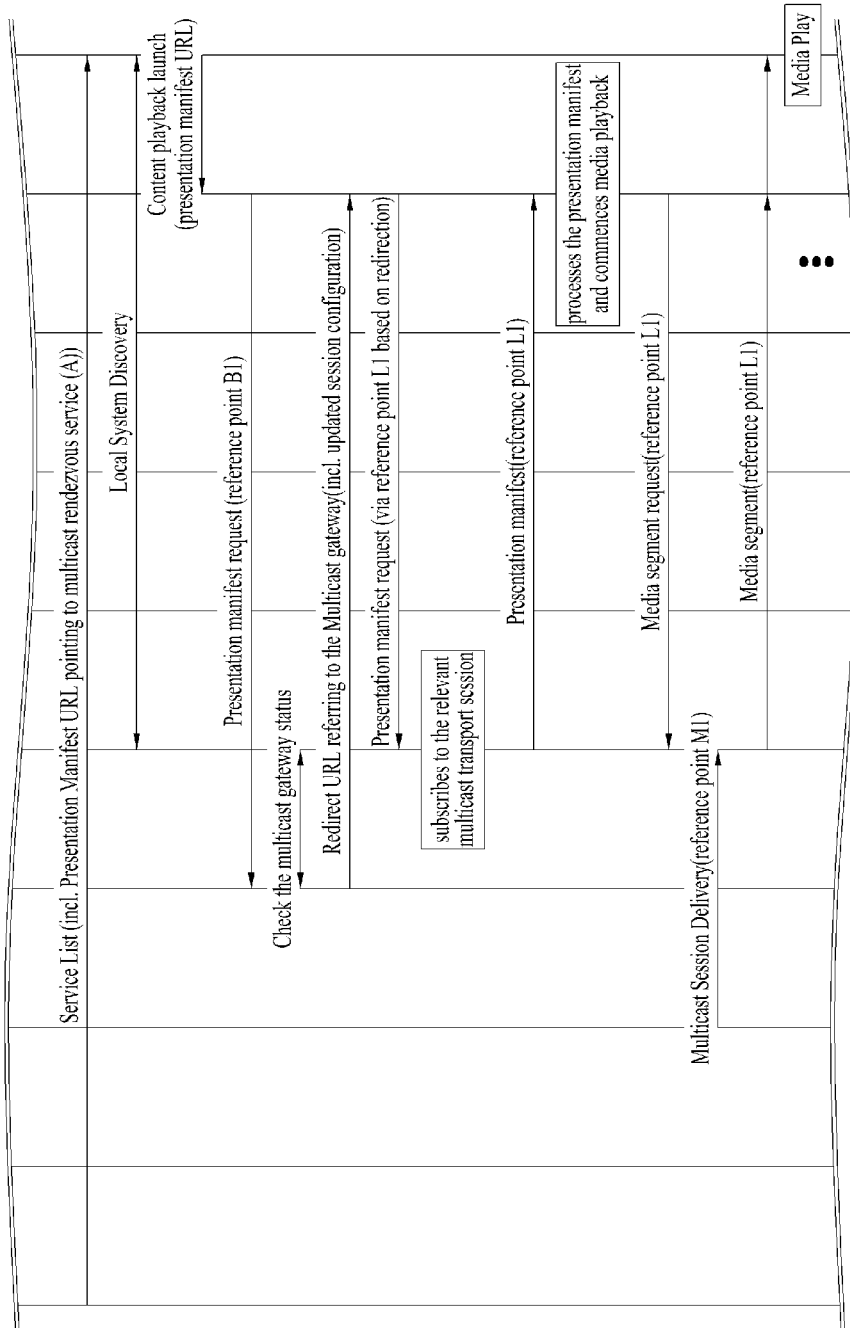
Figure 23:
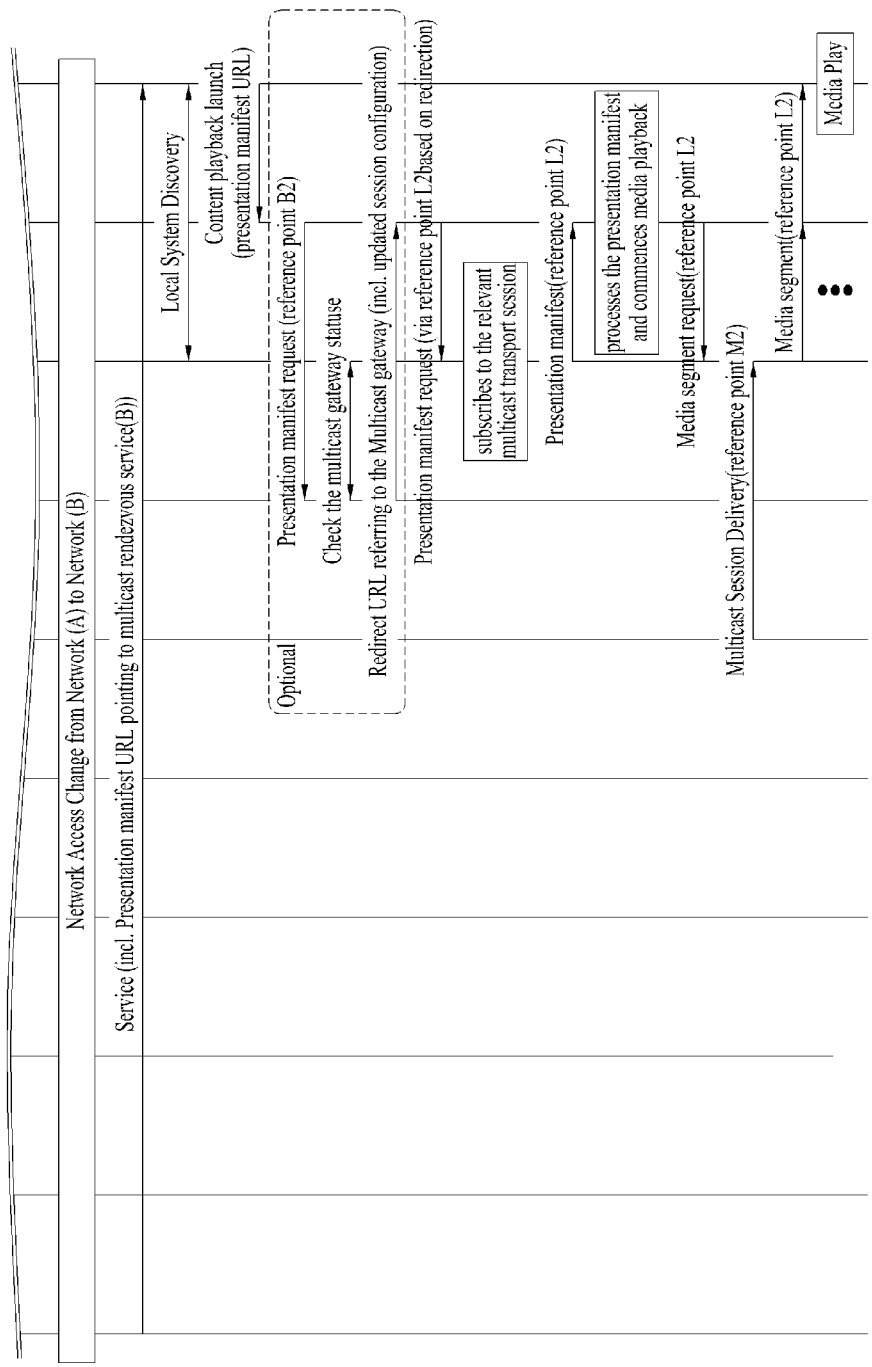

FIGS. 21, 22, and 23 illustrate a flowchart of a network change according to embodiments.

The flowchart of FIGS. 21 to 23 may be performed according to embodiments illustrated in FIGS. 1 to 6, 9 to 16, and 20. Each component constituting embodiments corresponds to hardware, software, a processor, and/or a combination thereof.

A flow of a procedure of receiving the same service even after a network is changed, after a procedure in which a device acquires a manifest and receives multicast media for an architecture according to embodiments, is illustrated. The difference between FIGS. 17 to 19 and FIGS. 21 to 23 is that a network of FIGS. 21 to 23 includes the case in which one network is not a bidirectional network.

A flow related to the multicast server proceeds as follows.

Each function is deployed according to the architecture, and a configuration for the multicast service is applied to the multicast servers, the multicast gateways, and the multicast rendezvous service functions.

A provisioning function transmits configuration information about a currently provisioned multicast session to a multicast server A and a multicast server B through network control.

If the multicast session is started, a media segment is ingested from a content provider to the multicast server A and the multicast server B to start multicast transmission. If there is a multicast gateway capable of receiving the media segment, the multicast gateway enters a receivable state.

When the device accesses a network A, the following operation may be performed.

The application may receive a service list from the service provider via the network A. To receive the service list, a service list acquisition method defined in the network A may be used. For example, if a service directory is configured in a DVB-I network, the application may receive the service list through interaction between the service provider, the service directory, and the application. For an ABR multicast operation, the service list may include a URL to request a presentation manifest mapped to a service ID.

When a user selects multicast content to be received, the application may acquire a URL for requesting an initial presentation manifest through the service directory. In this case, the URL points to a multicast rendezvous service function A.

The application controls the content playback function to start an operation for receiving content. In this case, the application may deliver the URL for the multicast rendezvous service function A.

The content playback function makes a request for the presentation manifest to the multicast rendezvous service function A through the reference point B1 using the URL transmitted by the application.

The multicast rendezvous service function A checks the status of the multicast gateway A configured in the same network. If a service for the requested presentation manifest is defined in a multicast configuration, the multicast rendezvous service function A transmits a redirection URL for the multicast gateway A to the content playback function. In this case, an updated multicast session configuration may be included in a transmitted redirection message.

Upon receiving the redirection message, the content playback function makes a request for the presentation manifest to the multicast gateway A through the reference point L1 according to the redirection.

If the presentation manifest is previously cached in the multicast gateway A, the multicast gateway A transmits the presentation manifest to the content playback function.

The content playback function requests a media segment for corresponding content based on the received presentation manifest.

Multicast streaming is transmitted from the multicast server A to the multicast gateway A through an interface M1.

The content playback function may receive the requested media segment from the multicast gateway A and media is played. If there is no separate control, the media is continuously played.

In this state, if the device changes access from the network A to a network B, the following operation may be performed.

The application may receive the service list from the service provider via the network B. To receive the service list, a service list acquisition method defined in the network B may be used. In order to continuously receive the multicast session received through the network A, session information about a corresponding service ID may be exchanged. The received service list may include a URL to request a presentation manifest mapped to the service ID.

For a service being received, the application may obtain the URL to request the presentation manifest. In this case, the URL points to a multicast gateway B and a multicast rendezvous service function B.

When a user selects multicast content to be received, the application may acquire a URL for requesting an initial presentation manifest through the service directory. In this case, the URL points to the multicast gateway B or the multicast rendezvous service function B.

The application controls the content playback function to start an operation for receiving content. In this case, the application may deliver the URL for the multicast gateway B or the multicast rendezvous service function B.

Since the multicast gateway and multicast rendezvous service function are configured in the same device (co-located deployment), the following procedure may optionally be performed.

The content playback function makes a request for the presentation manifest to the multicast rendezvous service function B through the reference point B2 using the URL transmitted by the application.

The multicast rendezvous service function B checks the status of the multicast gateway B configured in the same network. If a service for the requested presentation manifest is defined in a multicast configuration, the multicast rendezvous service function B transmits a redirection URL for the multicast gateway B to the content playback function. In this case, an updated multicast session configuration may be included in a transmitted redirection message.

Upon receiving the redirection message, the content playback function follows corresponding redirection.

Using the obtained URL, the content playback function makes a request for the presentation manifest to the multicast gateway B through the reference point L2.

If the presentation manifest is previously cached in the multicast gateway B, the multicast gateway B transmits the presentation manifest to the content playback function.

The content playback function requests a media segment for corresponding content based on the received presentation manifest.

Multicast streaming is transmitted from the multicast server B to the multicast gateway B through an interface M2.

The content playback function may receive the requested media segment from the multicast gateway B and the media is played. If there is no separate control, the media is continuously played.

Figure 24:
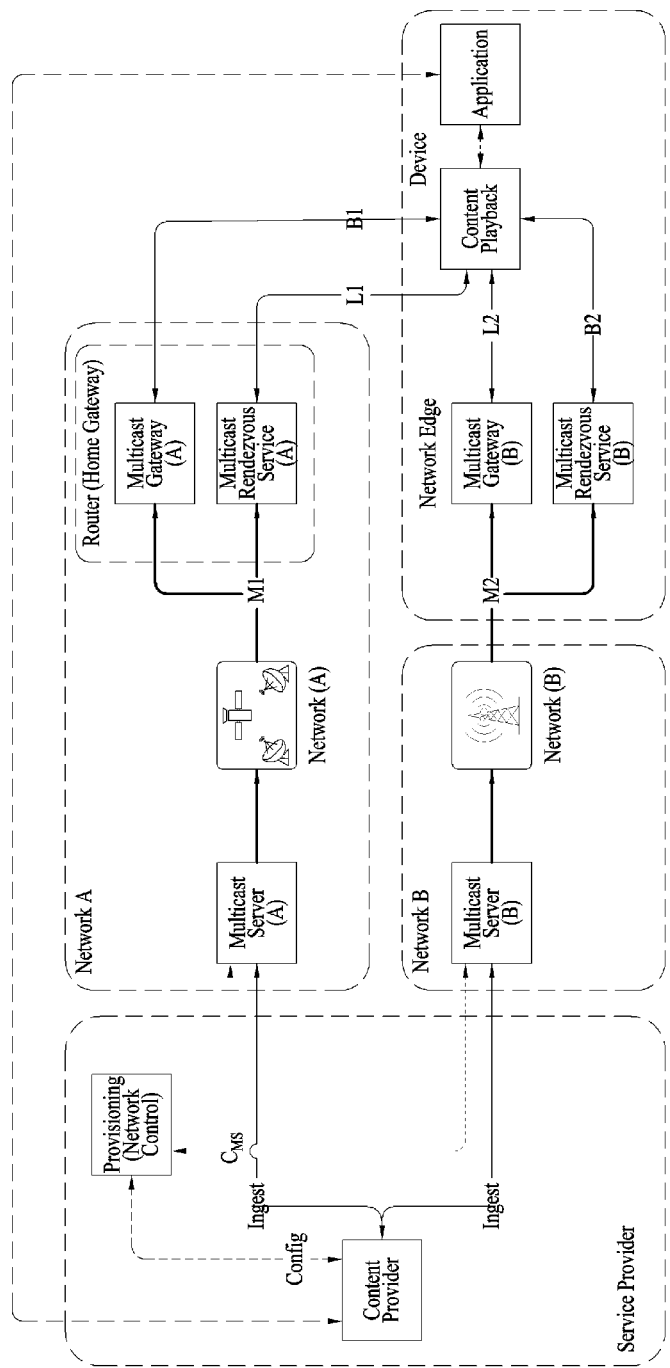
FIG. 24 illustrates an example in which multicast servers and multicast gateways are configured in respective networks according to embodiments.

FIG. 24 illustrates an example in which multicast servers and multicast gateways are configured in respective networks according to embodiments.

For the case in which the multicast servers and the multicast gateways are configured in respective networks, an embodiment in which all multicast rendezvous service functions are configured in co-located deployment is illustrated. A system according to embodiments may include a service provider, network(s), and a device. Configurations of the service provider, the network(s), and the device according to embodiments are as illustrated in FIG. 24. Each component illustrated in FIG. 24 corresponds to hardware, software, a processor, and/or a combination thereof.

In the architecture according to embodiments, multicast servers, multicast gateways, and multicast rendezvous service functions for respective networks provide services to a content playback function connected to each network. For example, the case in which the device accesses an STB through a satellite broadcast network and simultaneously receives broadcasting through a terrestrial broadcast network may be considered. Network types according to embodiments may be different. Both networks may be unidirectional networks.

Two L interfaces L1 and L2 and two B interfaces B1 and B2 may be configured for the content playback function in the device. The content playback function may receive media streaming from a multicast gateway A through the interface L1 and receive initial access information about the multicast gateway A through the interface B1. The content playback function may receive media streaming from a multicast gateway B through the interface L2 and receive initial access information about the multicast gateway B through the interface B2. Here, since the multicast gateway B and a multicast rendezvous service function B are configured within the device, the interfaces L2 and B2 may be replaced with internal interfaces of the device.

An application acquires a list of multicast services and access information about a corresponding multicast rendezvous service function through a service discovery interface. The service discovery interface may follow a method separately defined between the service provider and the application. In addition, each network may support data transmission and reception for the service discovery interface.

Figure 25:
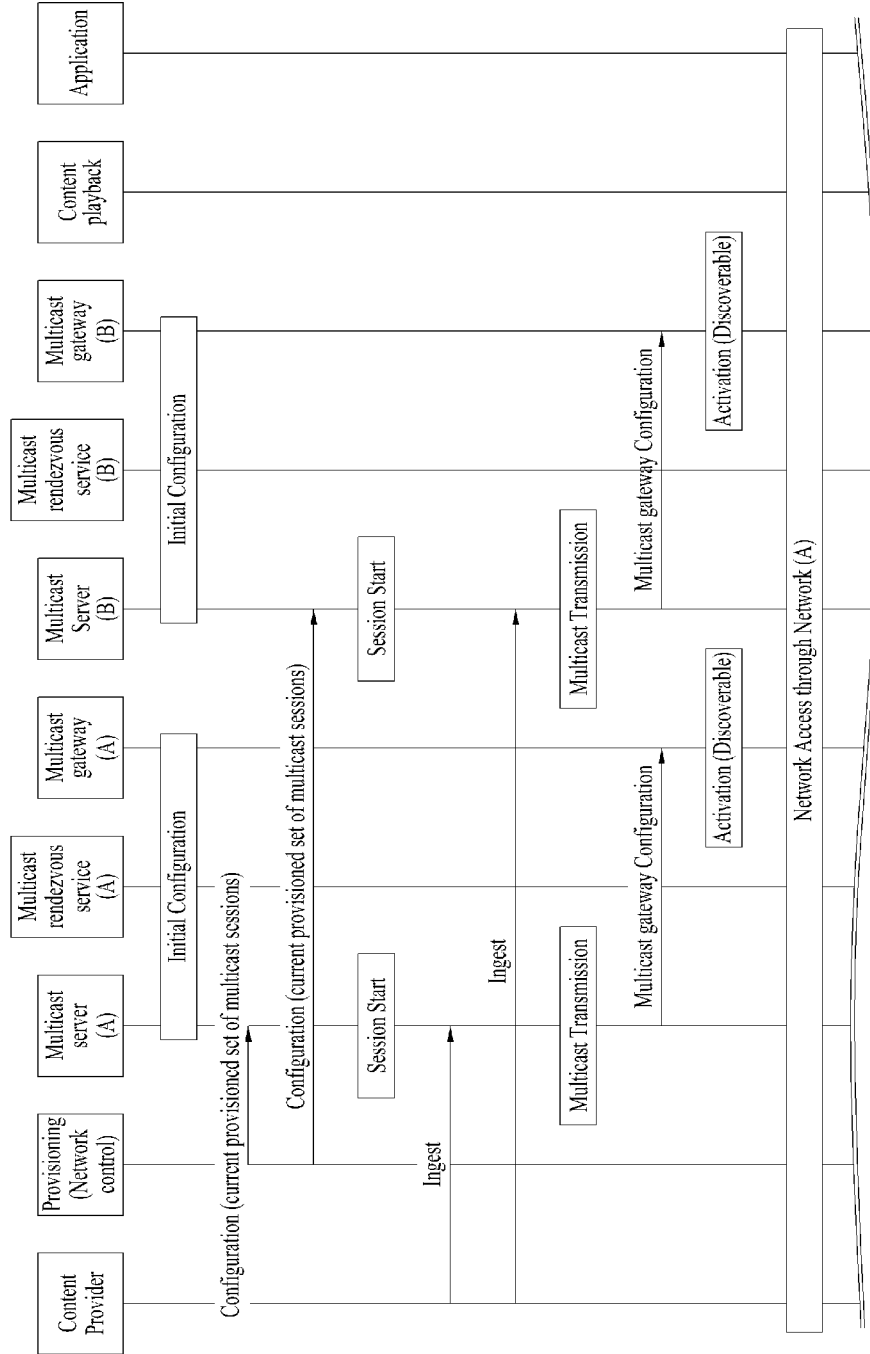
FIGS. 25, 26, and 27 illustrate a flowchart of a network change according to embodiments.
Figure 26:
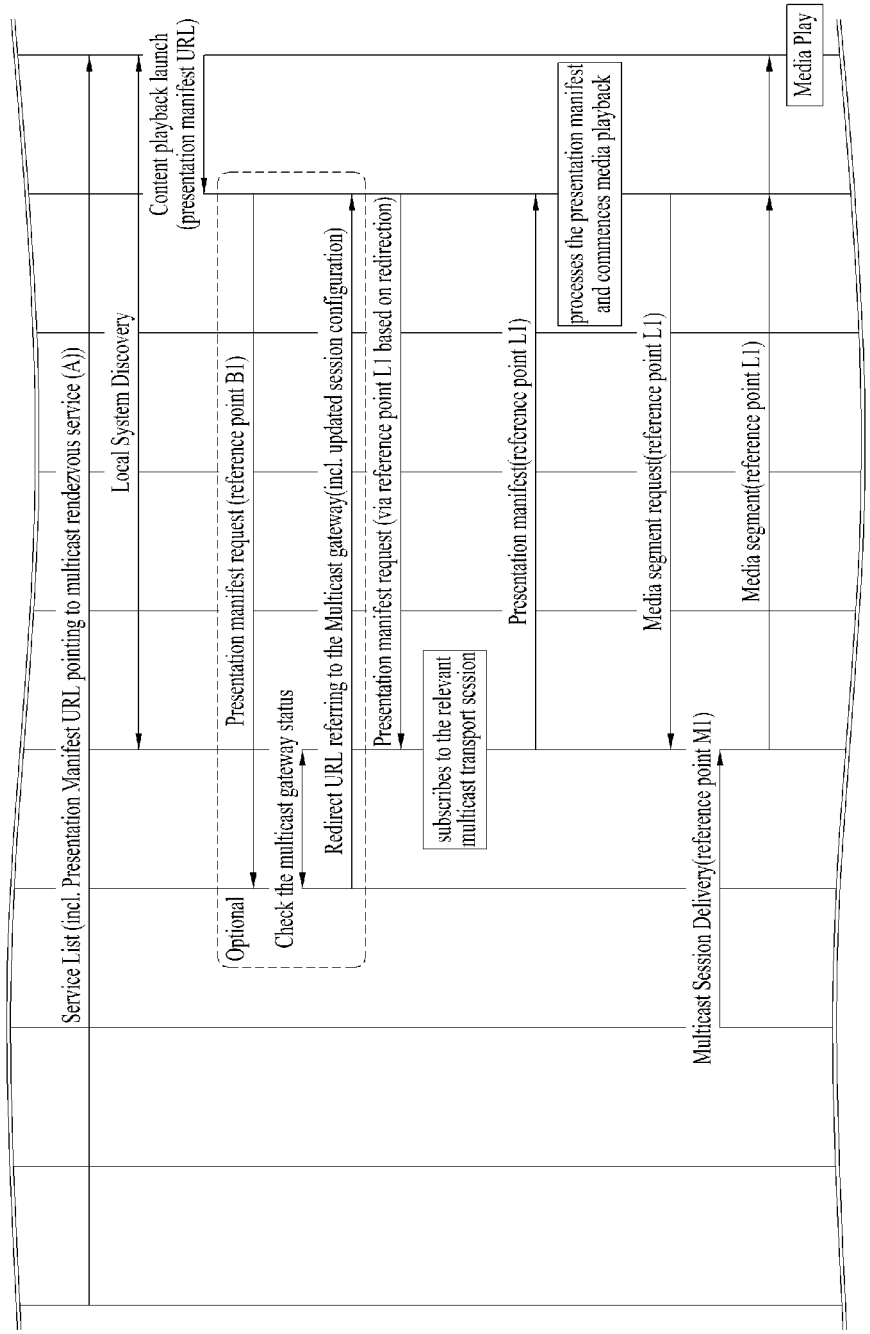
Figure 27:
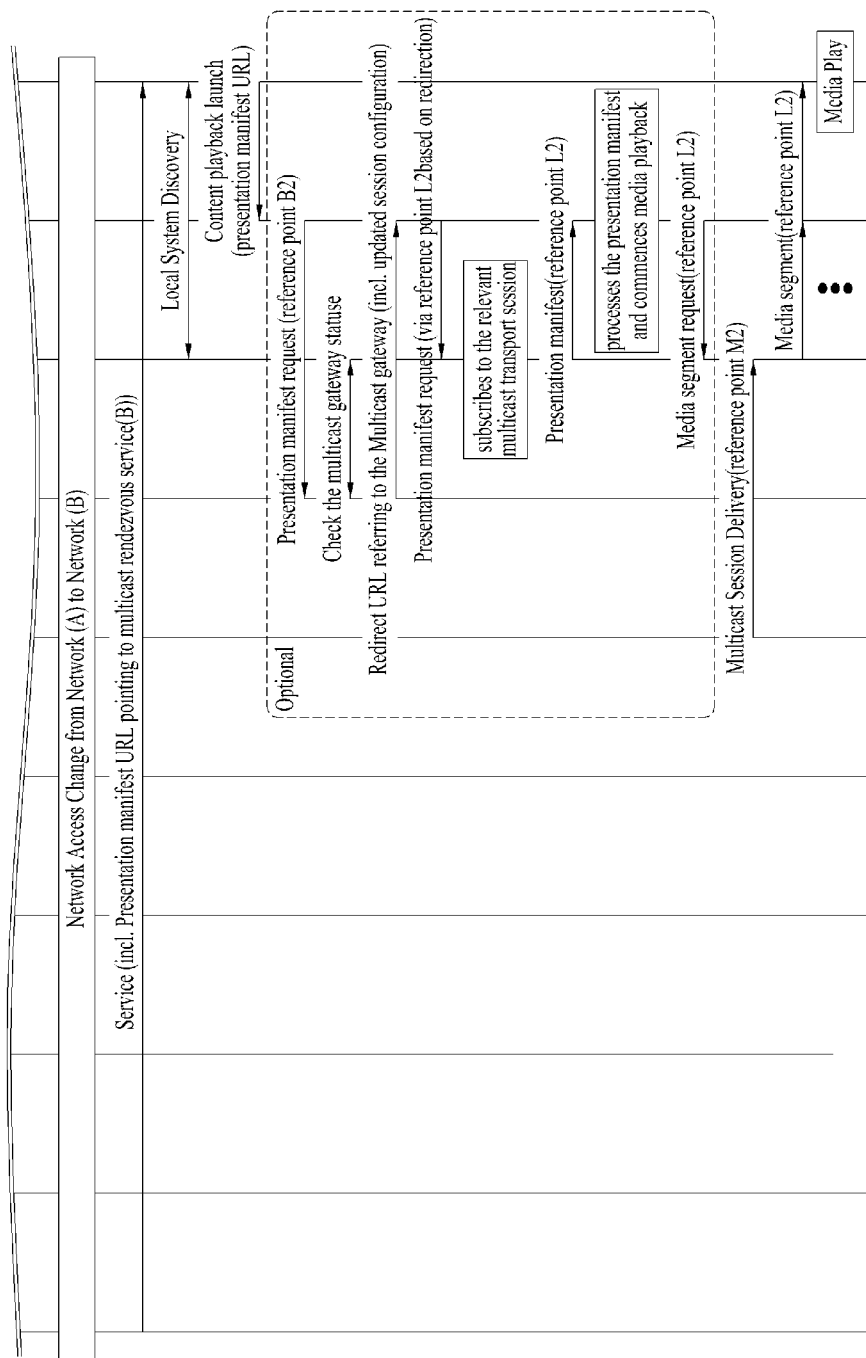

FIGS. 25, 26, and 27 illustrate a flowchart of a network change according to embodiments.

The flowchart of FIGS. 25 to 27 may be performed according to embodiments illustrated in FIGS. 1 to 6, 9 to 16, and 24. Each component constituting embodiments corresponds to hardware, software, a processor, and/or a combination thereof.

A flow of a procedure of receiving the same service even after a network is changed, after a procedure in which a device acquires a manifest and receives multicast media for an architecture according to embodiments, is illustrated.

A flow related to the multicast server proceeds as follows.

Each function is deployed according to the architecture, and a configuration for the multicast service is applied to the multicast servers, the multicast gateways, and the multicast rendezvous service functions.

A provisioning function transmits configuration information about a currently provisioned multicast session to a multicast server A and a multicast server B through network control.

If the multicast session is started, a media segment is ingested from a content provider to the multicast server A and the multicast server B to start multicast transmission. If there is a multicast gateway capable of receiving the media segment, the multicast gateway enters a receivable state.

When the device accesses a network A, the following operation may be performed.

The application may receive a service list from the service provider via the network A. To receive the service list, a service list acquisition method defined in the network A may be used. For example, if a service directory is configured in a DVB-I network, the application may receive the service list through interaction between the service provider, the service directory, and the application. For an ABR multicast operation, the service list may include a URL to request a presentation manifest mapped to a service ID.

When a user selects multicast content to be received, the application may acquire a URL for requesting an initial presentation manifest through the service directory. In this case, the URL points to the multicast gateway A or the multicast rendezvous service function A.

The application controls the content playback function to start an operation for receiving content. In this case, the application may deliver the URL for the multicast gateway A or the multicast rendezvous service function A.

Since the multicast gateway and the multicast rendezvous service function are configured in the same device (i.e., co-located deployment), the following procedure may optionally be performed.

The content playback function makes a request for the presentation manifest to the multicast rendezvous service function A through the reference point B1 using the URL transmitted by the application.

The multicast rendezvous service function A checks the status of the multicast gateway A configured in the same network. If a service for the requested presentation manifest is defined in a multicast configuration, the multicast rendezvous service function A transmits a redirection URL for the multicast gateway A to the content playback function. In this case, an updated multicast session configuration may be included in a transmitted redirection message.

Upon receiving the redirection message, the content playback function follows corresponding redirection.

Using the obtained URL, the content playback function makes a request for the presentation manifest to the multicast gateway A through the reference point L1.

If the presentation manifest is previously cached in the multicast gateway A, the multicast gateway A transmits the presentation manifest to the content playback function.

The content playback function requests a media segment for corresponding content based on the received presentation manifest.

Multicast streaming is transmitted from the multicast server A to the multicast gateway A through an interface M1.

The content playback function may receive the requested media segment from the multicast gateway A and media is played. If there is no separate control, the media is continuously played.

In this state, if the device changes access from the network A to a network B, the following operation may be performed.

The application may receive the service list from the service provider via the network B. To receive the service list, a service list acquisition method defined in the network B may be used. In order to continuously receive the multicast session received through the network A, session information about a corresponding service ID may be exchanged. The received service list may include a URL to request a presentation manifest mapped to the service ID.

Since the multicast gateway and the multicast rendezvous service function are configured in the device, an operation related to the interfaces L2 and B2 may optionally be performed.

For a service being received, the application may obtain the URL to request the presentation manifest. In this case, the URL points to a multicast rendezvous service function B.

The application controls the content playback function to start an operation for receiving content. In this case, the application may deliver the URL for the multicast rendezvous service function B.

The content playback function makes a request for the presentation manifest to the multicast rendezvous service function B through the reference point B2 using the URL transmitted by the application.

The multicast rendezvous service function B checks the status of the multicast gateway B configured in the same network. If a service for the requested presentation manifest is defined in a multicast configuration, the multicast rendezvous service function B transmits a redirection URL for the multicast gateway B to the content playback function. In this case, an updated multicast session configuration may be included in a transmitted redirection message.

Upon receiving the redirection message, the content playback function makes a request for the presentation manifest to the multicast gateway B through the reference point L2 based on the redirection.

If the presentation manifest is previously cached in the multicast gateway B, the multicast gateway B transmits the presentation manifest to the content playback function.

The content playback function requests a media segment for corresponding content based on the received presentation manifest.

Multicast streaming is transmitted from the multicast server B to the multicast gateway B through an interface M2.

The content playback function may receive the requested media segment from the multicast gateway B and the media is played. If there is no separate control, the media is continuously played.

Next, the multicast signal processing method/apparatus according to embodiments capable of accessing multiple networks will be further described. In the network architecture described according to embodiments, a device capable of receiving the same multicast media service by accessing a plurality of networks may be considered. An embodiment of architectures and ABR multicast interfaces for the device capable of receiving the same multicast streaming service by accessing multiple networks is described.

A multicast rendezvous service according to embodiments is different from bootstrap of broadcasting. A rendezvous flow in a network is a procedure of providing an initial network address to a UE when the UE desires to access the network.

A rendezvous function may be performed by a network according to embodiments. Bootstrapping may be performed by the UE. The rendezvous service may have a fixed address or URL. If a receiver is outside the network, the rendezvous function redirects an address for media to the UE since the UE has been connected to the address to receive the media when the UE first accesses the network. The UE may receive a manifest for actual media with the redirection address. The multicast rendezvous service is required because media transmission and reception is a multicast scheme and the media has already been viewed by someone else.

Figure 28:
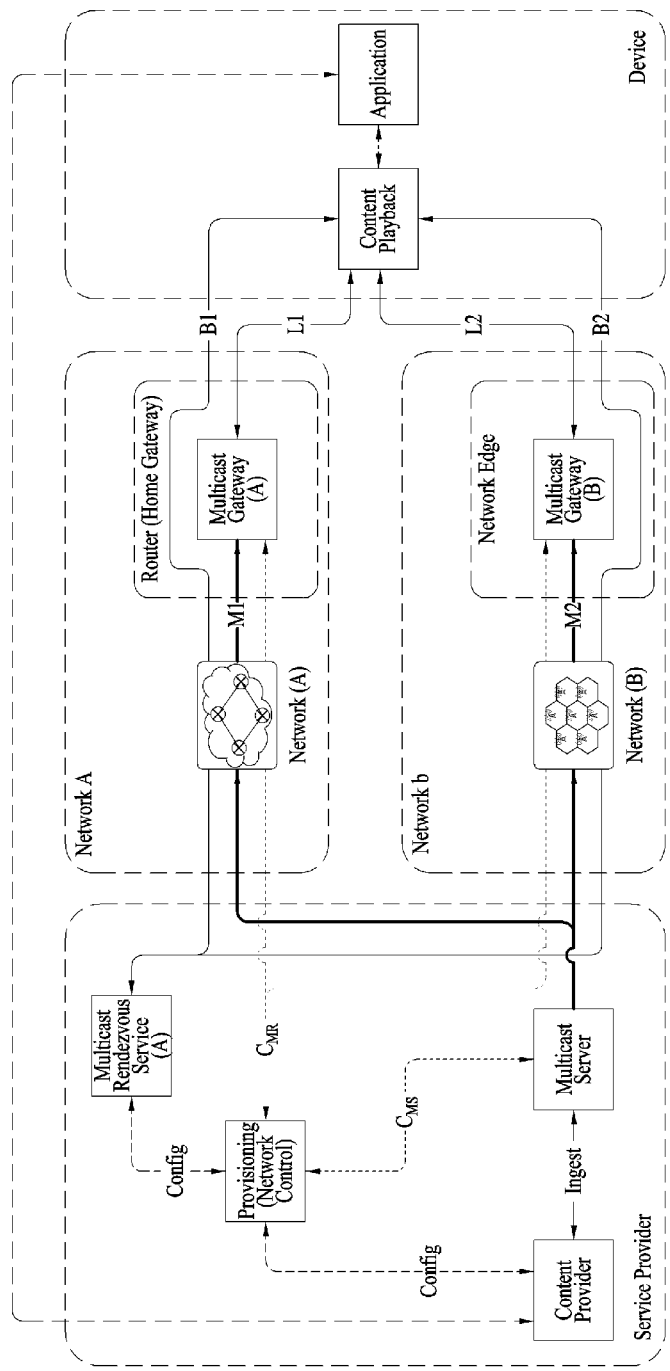
FIG. 28 illustrates an example in which a single multicast server provides a service through a plurality of heterogeneous networks and multicast gateways for the multicast server are configured in respective networks according to embodiments.

FIG. 28 illustrates an example in which a single multicast server provides a service through a plurality of heterogeneous networks and multicast gateways for the multicast server are configured in respective networks according to embodiments.

An embodiment is described below in which all multicast rendezvous service functions are configured in regular deployment in the case in which a single multicast server provides a service through a plurality of heterogeneous networks and multicast gateways for the multicast server are configured in respective networks. A system according to embodiments may include a service provider, network(s), and a device. Configurations of the provider, the network(s), and the device according to embodiments are as illustrated in FIG. 28. Each component illustrated in FIG. 28 corresponds to hardware, software, a processor, and/or a combination thereof.

In the architecture according to embodiments, a multicast server, a multicast gateway, and a multicast rendezvous service function for each network provide services to a content playback function connected to each network. For example, the case in which the device accesses Wi-Fi through an ISP network and simultaneously accesses a mobile network may be considered.

Two L interfaces L1 and L2 and two B interfaces B1 and B2 may be configured for the content playback function in the device. The content playback function may receive media streaming from a multicast gateway A through the interface L1 and receive initial access information about the multicast gateway A through the interface B1. The content playback function may receive media streaming from a multicast gateway B through the interface L2 and receive initial access information about the multicast gateway B through the interface B2.

An application acquires a list of multicast services and access information about a corresponding multicast rendezvous service function through a service discovery interface. The service discovery interface may follow a method separately defined between the service provider and the application. In addition, each network may support data transmission and reception for the service discovery interface.

Figure 29:
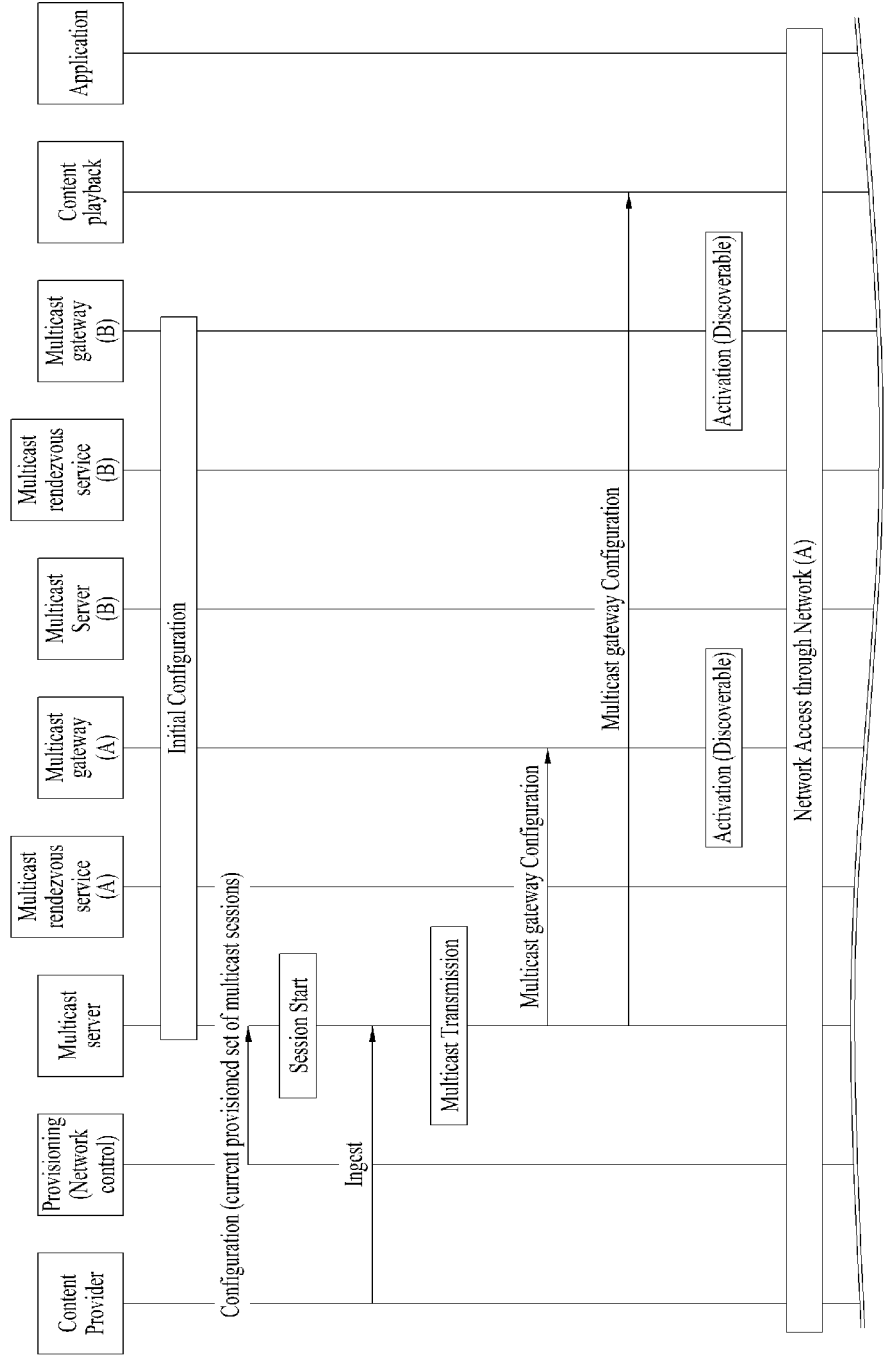
FIGS. 29, 30, and 31 illustrate a flowchart of a network change according to embodiments.
Figure 30:
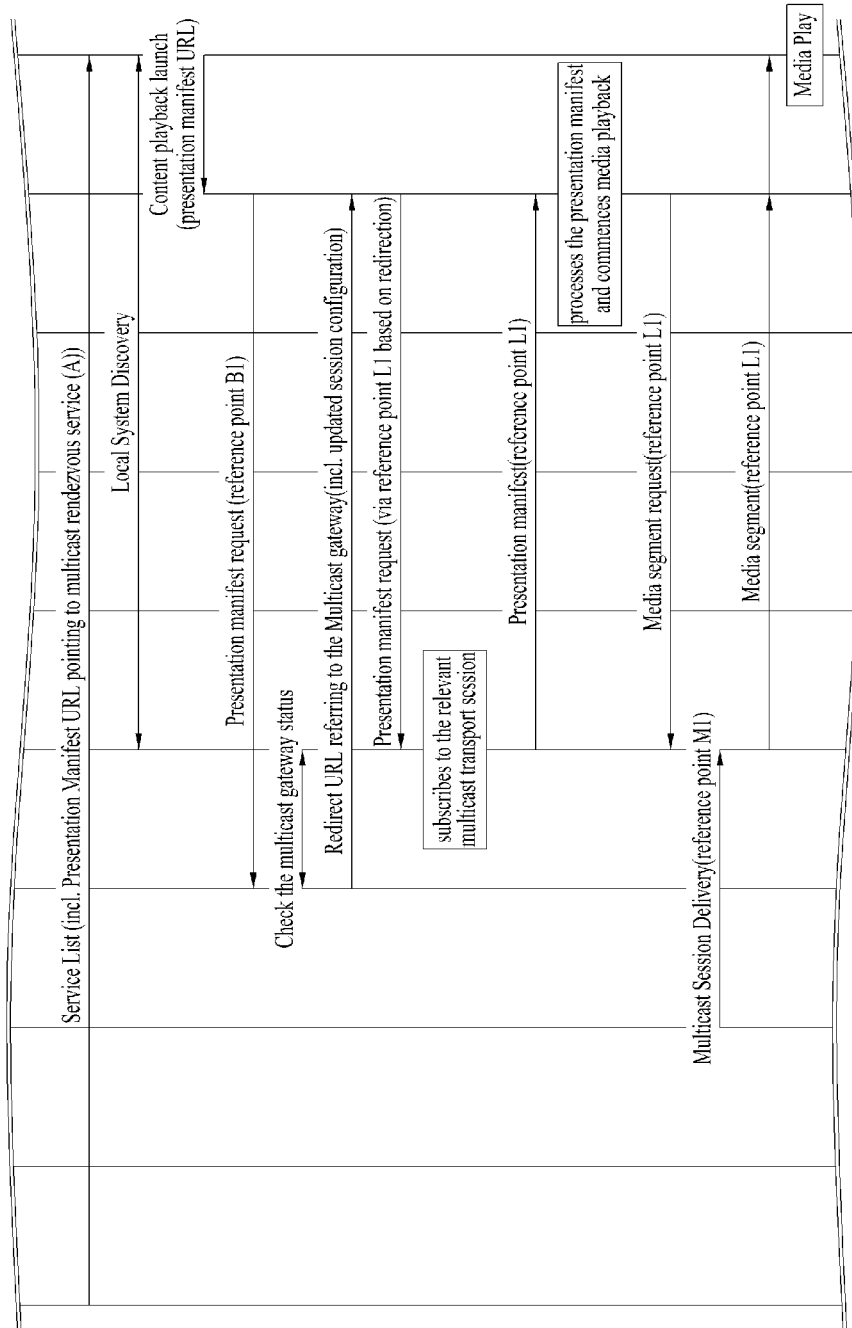
Figure 31:
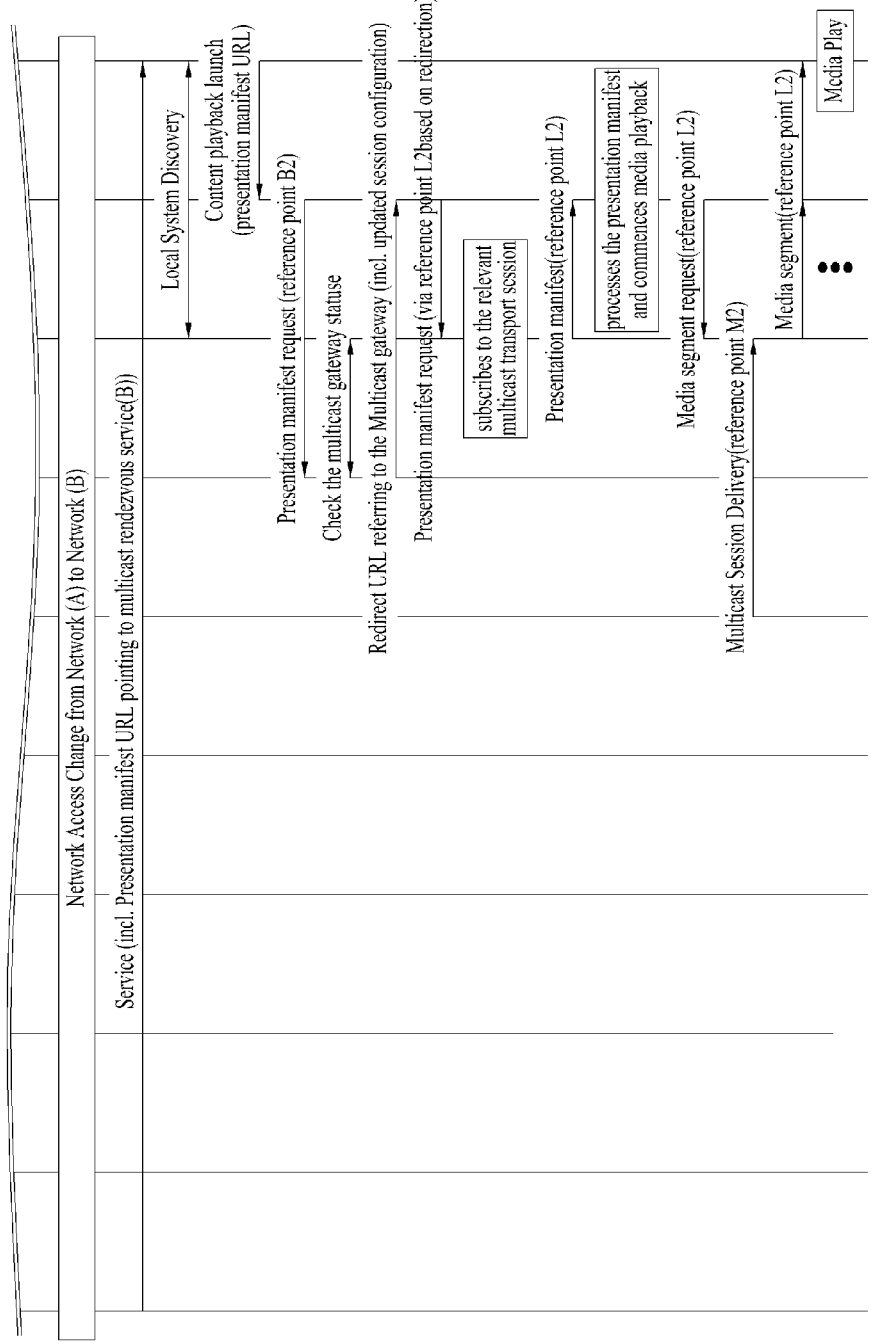

FIGS. 29, 30, and 31 illustrate a flowchart of a network change according to embodiments.

The flowchart of FIGS. 29 to 31 may be performed according to embodiments illustrated in FIGS. 1 to 6, 9 to 16, and 28. Each component constituting embodiments corresponds to hardware, software, a processor, and/or a combination thereof.

A flow of a procedure of receiving the same service even after a network is changed, after a procedure in which a device acquires a manifest and receives multicast media for an architecture according to embodiments, is illustrated.

A flow related to the multicast server proceeds as follows.

Each function is deployed according to the architecture, and a configuration for the multicast service is applied to the multicast server, the multicast gateways, and the multicast rendezvous service function.

A provisioning function transmits configuration information about a currently provisioned multicast session to a multicast server A and a multicast server B through network control.

If the multicast session is started, a media segment is ingested from a content provider to the multicast server to start multicast transmission. If there is a multicast gateway capable of receiving the media segment, the multicast gateway enters a receivable state.

When the device accesses a network A, the following operation may be performed.

The application may receive a service list from the service provider via the network A. To receive the service list, a service list acquisition method defined in the network A may be used. For example, if a service directory is configured in a DVB-I network, the application may receive the service list through interaction between the service provider, the service directory, and the application. For an ABR multicast operation, the service list may include a URL to request a presentation manifest mapped to a service ID.

When a user selects multicast content to be received, the application may acquire a URL for requesting an initial presentation manifest through the service directory. In this case, the URL points to a multicast rendezvous service function A.

The application controls the content playback function to start an operation for receiving content. In this case, the application may deliver the URL for the multicast rendezvous service function A.

The content playback function makes a request for the presentation manifest to the multicast rendezvous service function A through the reference point B1 using the URL transmitted by the application.

The multicast rendezvous service function A checks the status of the multicast gateway A configured in the same network. If a service for the requested presentation manifest is defined in a multicast configuration, the multicast rendezvous service function A transmits a redirection URL for the multicast gateway A to the content playback function. In this case, an updated multicast session configuration may be included in a transmitted redirection message.

Upon receiving the redirection message, the content playback function makes a request for the presentation manifest to the multicast gateway A through the reference point L1 according to the redirection.

If the presentation manifest is previously cached in the multicast gateway A, the multicast gateway A transmits the presentation manifest to the content playback function.

The content playback function requests a media segment for corresponding content based on the received presentation manifest.

Multicast streaming is transmitted from the multicast server to the multicast gateway A through an interface M1.

The content playback function may receive the requested media segment from the multicast gateway A and media is played. If there is no separate control, the media is continuously played.

In this state, if the device changes access from the network A to a network B, the following operation may be performed.

The application may receive the service list from the service provider via the network B. To receive the service list, a service list acquisition method defined in the network B may be used. In order to continuously receive the multicast session received through the network A, session information about a corresponding service ID may be exchanged. The received service list may include a URL to request a presentation manifest mapped to the service ID.

For a service being received, the application may obtain the URL to request the presentation manifest. In this case, the URL points to a multicast rendezvous service function B.

The application controls the content playback function to start an operation for receiving content. In this case, the application may deliver the URL for the multicast rendezvous service function B.

The content playback function makes a request for the presentation manifest to the multicast rendezvous service function B through the reference point B2 using the URL transmitted by the application.

The multicast rendezvous service function B checks the status of the multicast gateway B configured in the same network. If a service for the requested presentation manifest is defined in a multicast configuration, the multicast rendezvous service function B transmits a redirection URL for the multicast gateway B to the content playback function. In this case, an updated multicast session configuration may be included in a transmitted redirection message.

Upon receiving the redirection message, the content playback function makes a request for the presentation manifest to the multicast gateway B through the reference point L2 based on the redirection.

If the presentation manifest is previously cached in the multicast gateway B, the multicast gateway B transmits the presentation manifest to the content playback function.

The content playback function requests a media segment for corresponding content based on the received presentation manifest.

Multicast streaming is transmitted from the multicast server to the multicast gateway B through an interface M2.

The content playback function may receive the requested media segment from the multicast gateway B and the media is played. If there is no separate control, the media is continuously played.

Figure 32:
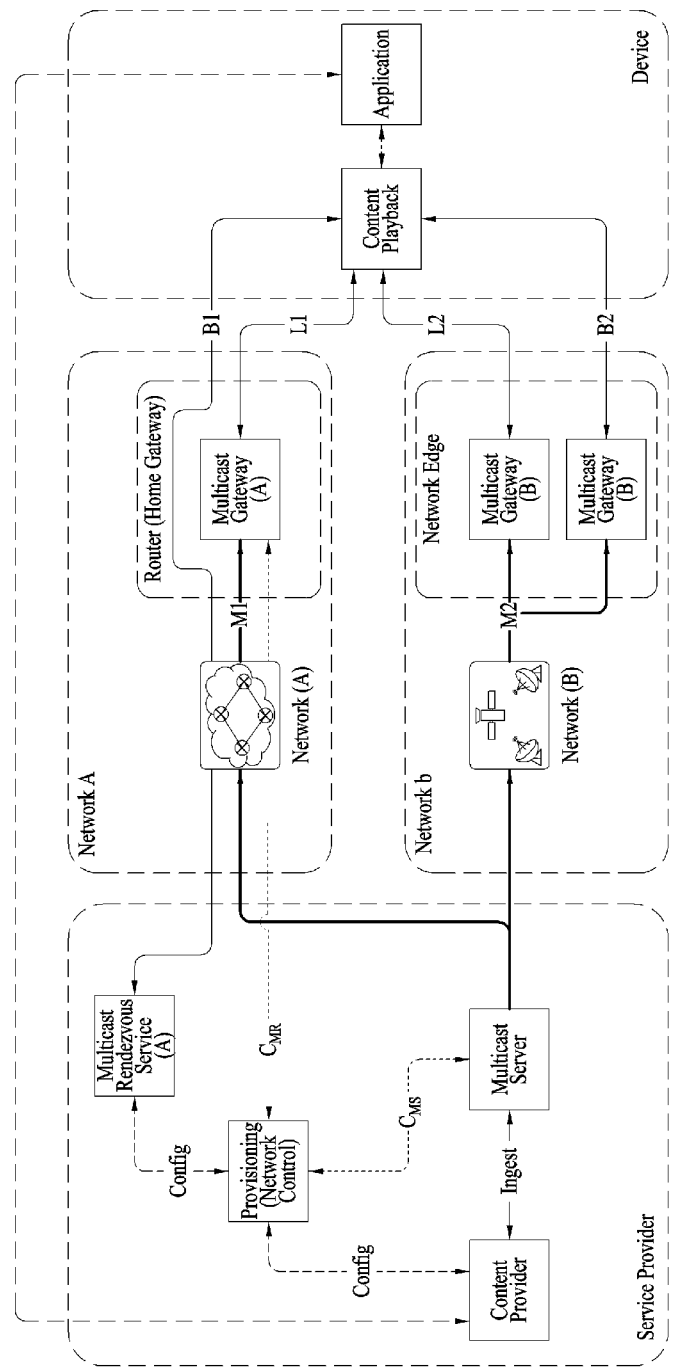
FIG. 32 illustrates an example in which a single multicast server provides a service through a plurality of heterogeneous networks and multicast gateways for the multicast server are configured in respective networks according to embodiments.

FIG. 32 illustrates an example in which a single multicast server provides a service through a plurality of heterogeneous networks and multicast gateways for the multicast server are configured in respective networks according to embodiments.

An embodiment is described below in which a multicast rendezvous service function is configured in regular deployment and co-located deployment in the case in which a single multicast server provides a service through a plurality of heterogeneous networks and multicast gateways for the multicast server are configured in respective networks. A system according to embodiments may include a service provider, network(s), and a device. Configurations of the provider, the network(s), and the device according to embodiments are as illustrated in FIG. 29. Each component illustrated in FIG. 29 corresponds to hardware, software, a processor, and/or a combination thereof.

In the architecture according to embodiments, a multicast server, a multicast gateway, and a multicast rendezvous service function for each network provide services to a content playback function connected to each network. For example, the case in which the device accesses Wi-Fi through an ISP network and simultaneously accesses an STB through a satellite broadcast network may be considered.

Two L interfaces L1 and L2 and two B interfaces B1 and B2 may be configured for the content playback function in the device. The content playback function may receive media streaming from a multicast gateway A through the interface L1 and receive initial access information about the multicast gateway A through the interface B1. The content playback function may receive media streaming from a multicast gateway B through the interface L2 and receive initial access information about the multicast gateway B through the interface B2.

An application acquires a list of multicast services and access information about a corresponding multicast rendezvous service function through a service discovery interface. The service discovery interface may follow a method separately defined between the service provider and the application. In addition, each network may support data transmission and reception for the service discovery interface.

Figure 33:
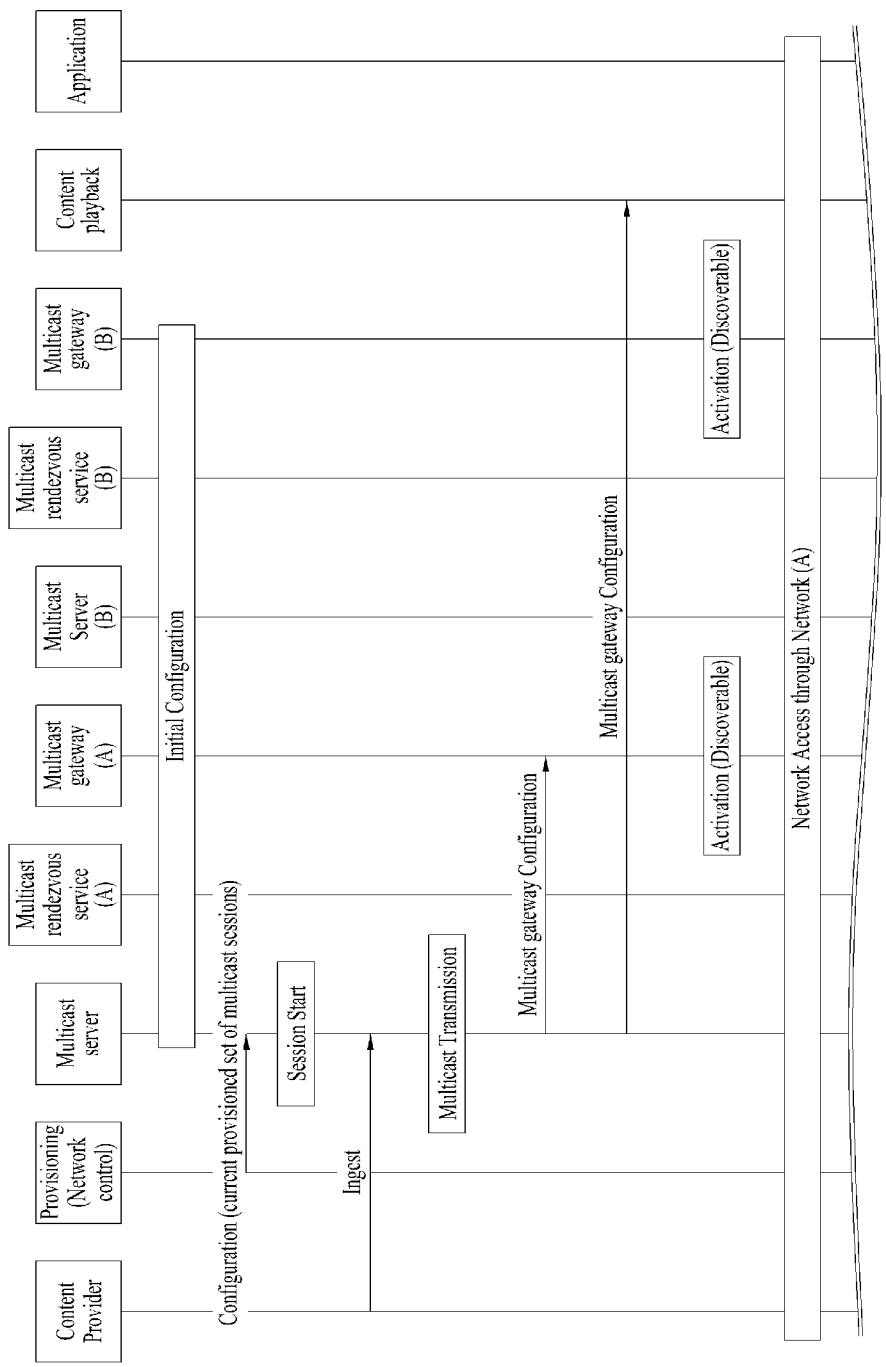
FIGS. 33, 34, and 35 illustrate a flowchart of a network change according to embodiments.
Figure 34:
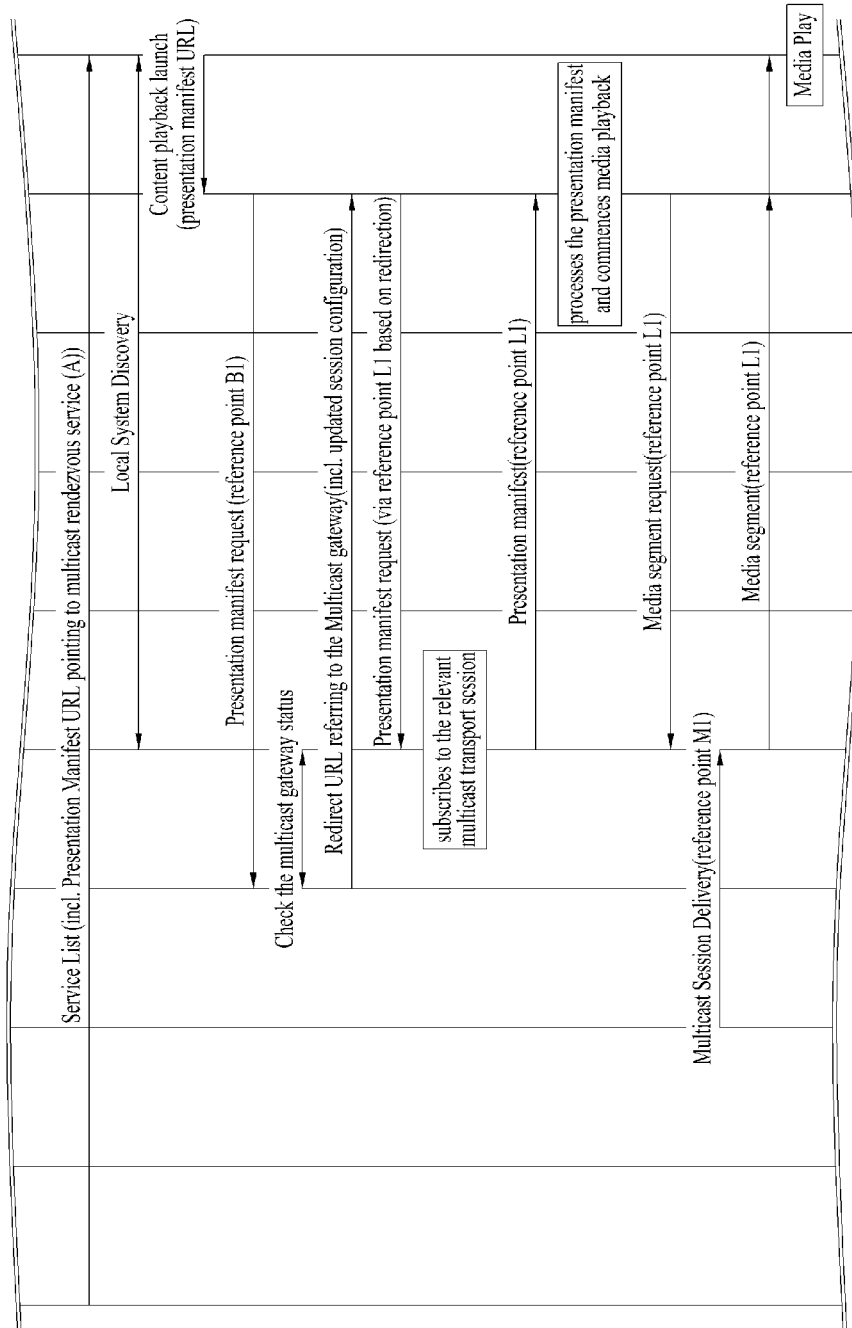
Figure 35:
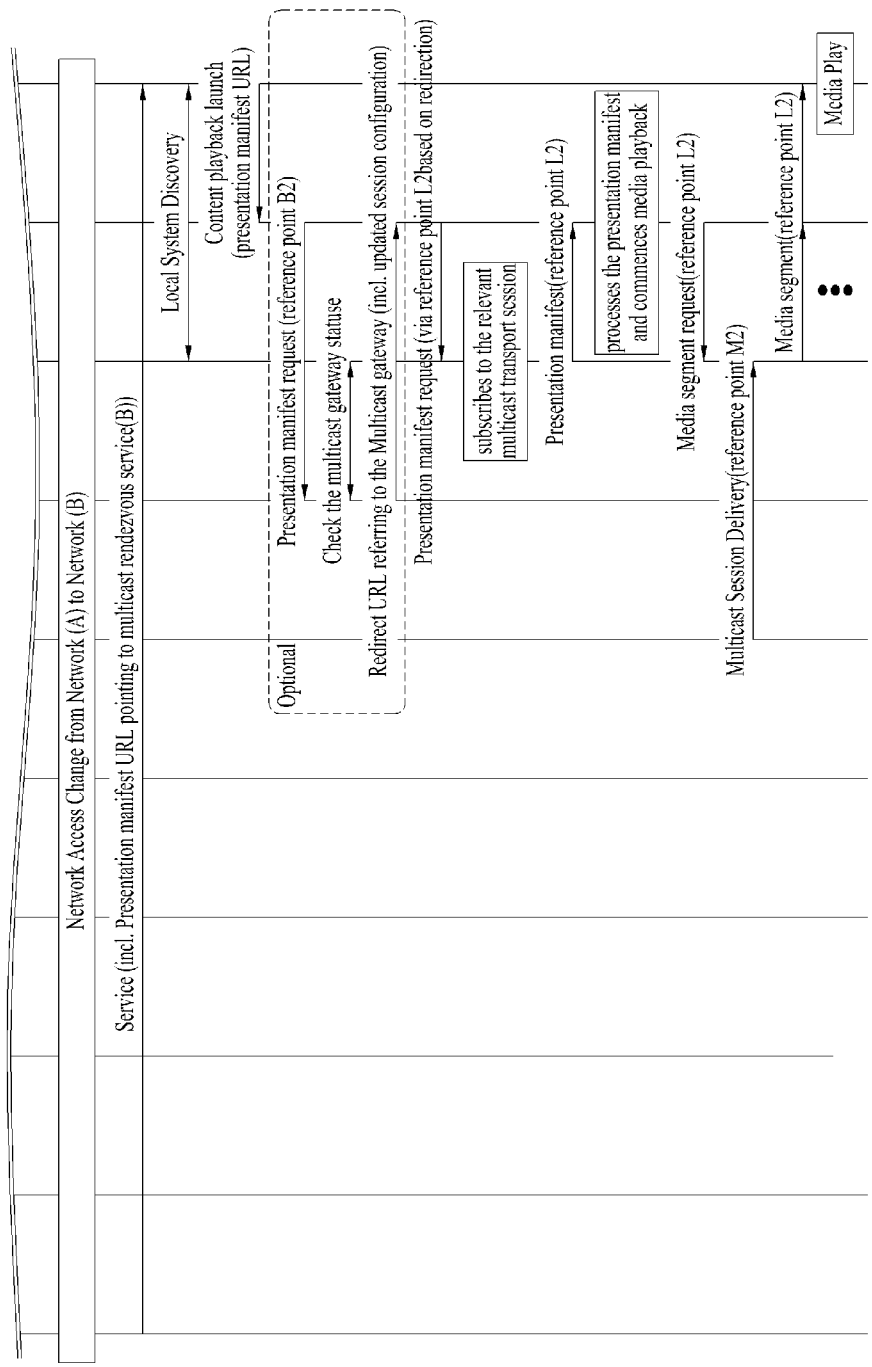

FIGS. 33, 34, and 35 illustrate a flowchart of a network change according to embodiments.

The flowchart of FIGS. 33 to 35 may be performed according to embodiments illustrated in FIGS. 1 to 6, 9 to 16, and 32. Each component constituting embodiments corresponds to hardware, software, a processor, and/or a combination thereof.

A flow of a procedure of receiving the same service even after a network is changed, after a procedure in which a device acquires a manifest and receives multicast media for an architecture according to embodiments, is illustrated.

A flow related to the multicast server proceeds as follows.

Each function is deployed according to the architecture, and a configuration for the multicast service is applied to the multicast server, the multicast gateways, and the multicast rendezvous service function.

A provisioning function transmits configuration information about a currently provisioned multicast session to the multicast server through network control.

If the multicast session is started, a media segment is ingested from a content provider to the multicast server to start multicast transmission. If there is a multicast gateway capable of receiving the media segment, the multicast gateway enters a receivable state.

When the device accesses a network A, the following operation may be performed.

The application may receive a service list from the service provider via the network A. To receive the service list, a service list acquisition method defined in the network A may be used. For example, if a service directory is configured in a DVB-I network, the application may receive the service list through interaction between the service provider, the service directory, and the application. For an ABR multicast operation, the service list may include a URL to request a presentation manifest mapped to a service ID.

When a user selects multicast content to be received, the application may acquire a URL for requesting an initial presentation manifest through the service directory. In this case, the URL points to a multicast rendezvous service function A.

The application controls the content playback function to start an operation for receiving content. In this case, the application may deliver the URL for the multicast rendezvous service function A.

The content playback function makes a request for the presentation manifest to the multicast rendezvous service function A through the reference point B1 using the URL transmitted by the application.

The multicast rendezvous service function A checks the status of the multicast gateway A configured in the same network. If a service for the requested presentation manifest is defined in a multicast configuration, the multicast rendezvous service function A transmits a redirection URL for the multicast gateway A to the content playback function. In this case, an updated multicast session configuration may be included in a transmitted redirection message.

Upon receiving the redirection message, the content playback function makes a request for the presentation manifest to the multicast gateway A through the reference point L1 according to the redirection.

If the presentation manifest is previously cached in the multicast gateway A, the multicast gateway A transmits the presentation manifest to the content playback function.

The content playback function requests a media segment for corresponding content based on the received presentation manifest.

Multicast streaming is transmitted from the multicast server to the multicast gateway A through an interface M1.

The content playback function may receive the requested media segment from the multicast gateway A and media is played. If there is no separate control, the media is continuously played.

In this state, if the device changes access from the network A to a network B, the following operation may be performed.

The application may receive the service list from the service provider via the network B. To receive the service list, a service list acquisition method defined in the network B may be used. In order to continuously receive the multicast session received through the network A, session information about a corresponding service ID may be exchanged. The received service list may include a URL to request a presentation manifest mapped to the service ID.

For a service being received, the application may obtain the URL to request the presentation manifest. In this case, the URL points to a multicast gateway B and a multicast rendezvous service function B.

When a user selects multicast content to be received, the application may acquire a URL for requesting an initial presentation manifest through the service directory. In this case, the URL points to the multicast gateway B or the multicast rendezvous service function B.

The application controls the content playback function to start an operation for receiving content. In this case, the application may deliver the URL for the multicast gateway B or the multicast rendezvous service function B.

Since the multicast gateway and multicast rendezvous service function are configured in the same device (co-located deployment), the following procedure may optionally be performed.

The content playback function makes a request for the presentation manifest to the multicast rendezvous service function B through the reference point B2 using the URL transmitted by the application.

The multicast rendezvous service function B checks the status of the multicast gateway B configured in the same network. If a service for the requested presentation manifest is defined in a multicast configuration, the multicast rendezvous service function B transmits a redirection URL for the multicast gateway B to the content playback function. In this case, an updated multicast session configuration may be included in a transmitted redirection message.

Upon receiving the redirection message, the content playback function follows corresponding redirection.

Using the obtained URL, the content playback function makes a request for the presentation manifest to the multicast gateway B through the reference point L2.

If the presentation manifest is previously cached in the multicast gateway B, the multicast gateway B transmits the presentation manifest to the content playback function.

The content playback function requests a media segment for corresponding content based on the received presentation manifest.

Multicast streaming is transmitted from the multicast server B to the multicast gateway B through an interface M2.

The content playback function may receive the requested media segment from the multicast gateway B and the media is played. If there is no separate control, the media is continuously played.

Figure 36:
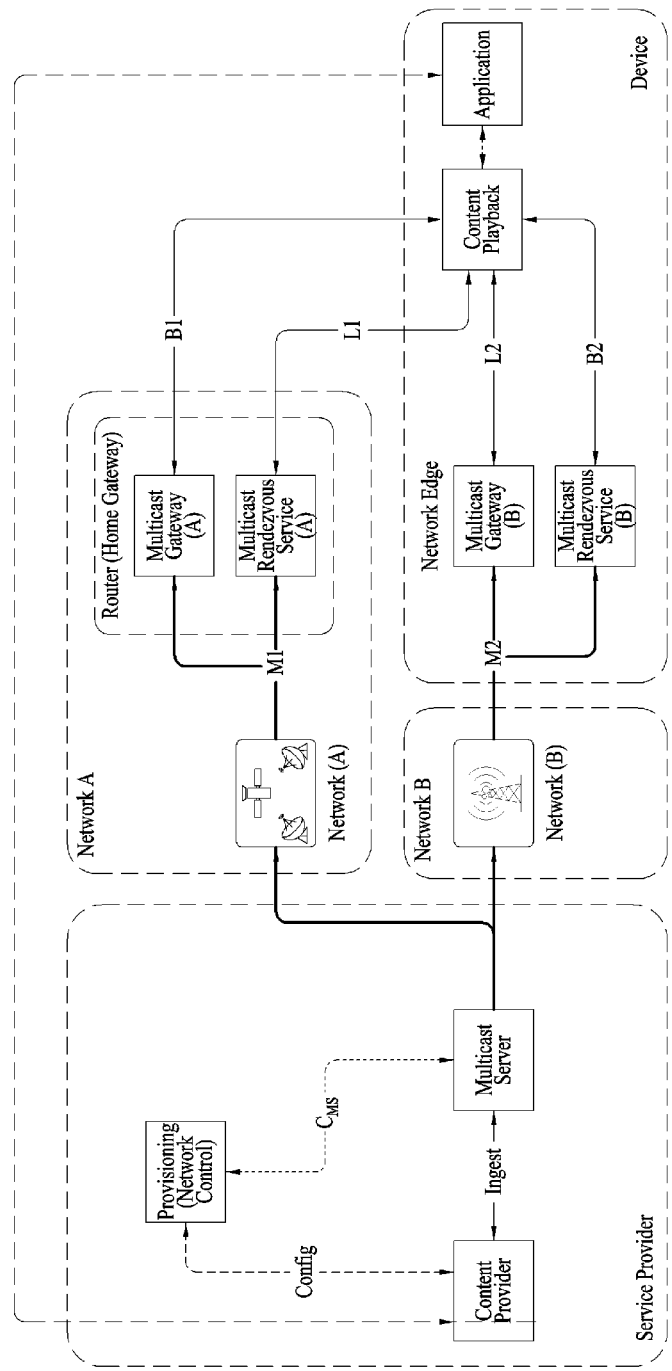
FIG. 36 illustrates an example in which all multicast rendezvous service functions are configured in co-located deployment in the case in which a multicast server and a multicast gateway are configured in each network according to embodiments.

FIG. 36 illustrates an example in which all multicast rendezvous service functions are configured in co-located deployment in the case in which a multicast server and a multicast gateway are configured in each network according to embodiments.

For the case in which the multicast server and the multicast gateway are configured in each network, an embodiment in which all multicast rendezvous service functions are configured in co-located deployment is illustrated. A system according to embodiments may include a service provider, network(s), and a device. Configurations of the service provider, the network(s), and the device according to embodiments are as illustrated in FIG. 36. Each component illustrated in FIG. 36 corresponds to hardware, software, a processor, and/or a combination thereof.

In the architecture according to embodiments, multicast servers, multicast gateways, and multicast rendezvous service functions for respective networks provide services to a content playback function connected to each network. For example, the case in which the device accesses an STB through a satellite broadcast network and simultaneously receives broadcasting through a terrestrial broadcast network may be considered.

Two L interfaces L1 and L2 and two B interfaces B1 and B2 may be configured for the content playback function in the device. The content playback function may receive media streaming from a multicast gateway A through the interface L1 and receive initial access information about the multicast gateway A through the interface B1. The content playback function may receive media streaming from a multicast gateway B through the interface L2 and receive initial access information about the multicast gateway B through the interface B2. Here, since the multicast gateway B and a multicast rendezvous service function B are configured within the device, the interfaces L2 and B2 may be replaced with internal interfaces of the device.

An application acquires a list of multicast services and access information about a corresponding multicast rendezvous service function through a service discovery interface. The service discovery interface may follow a method separately defined between the service provider and the application. In addition, each network may support data transmission and reception for the service discovery interface.

Figure 37:
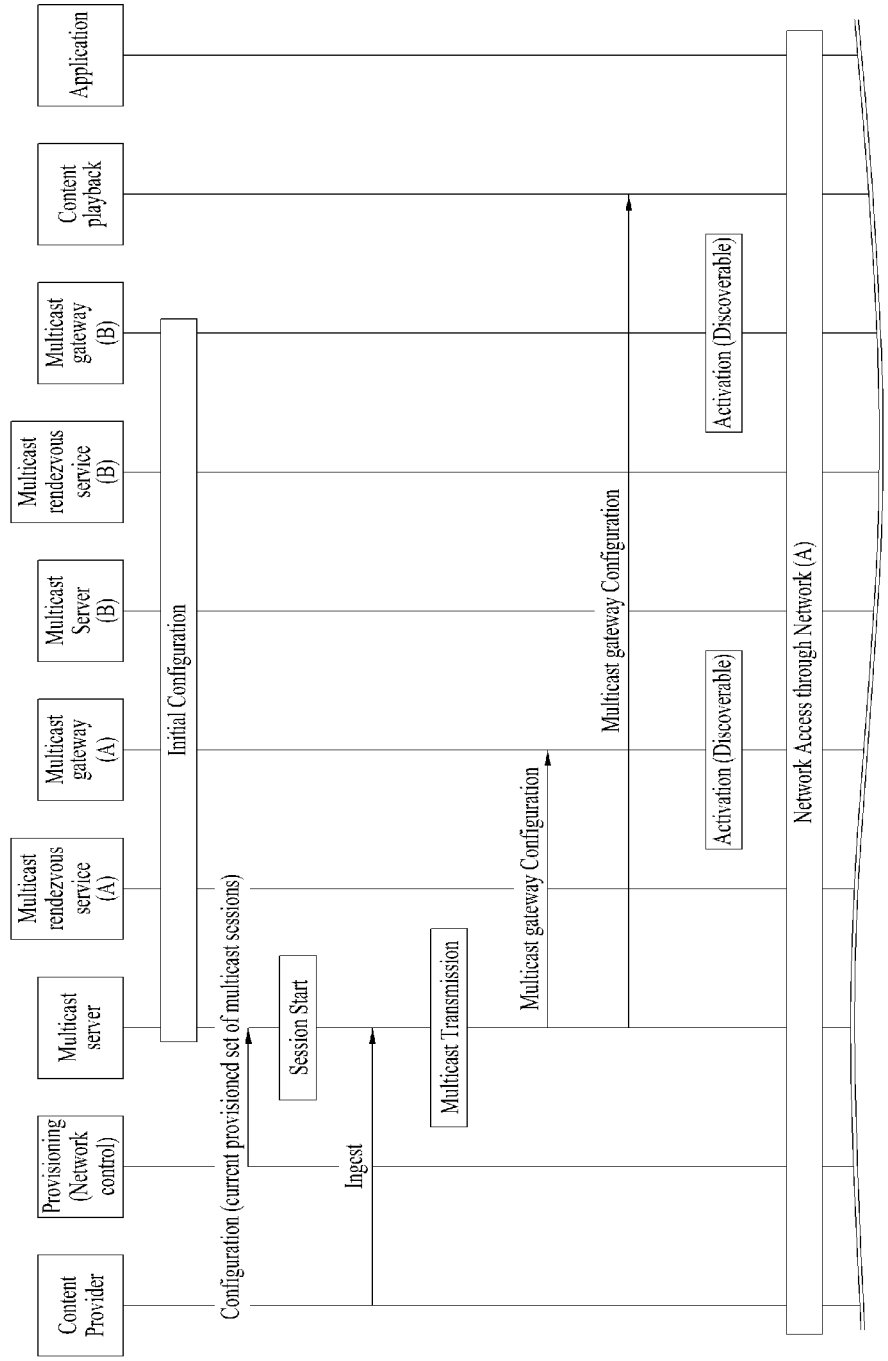
FIGS. 37, 38, and 39 illustrate a flowchart of a network change according to embodiments.
Figure 38:
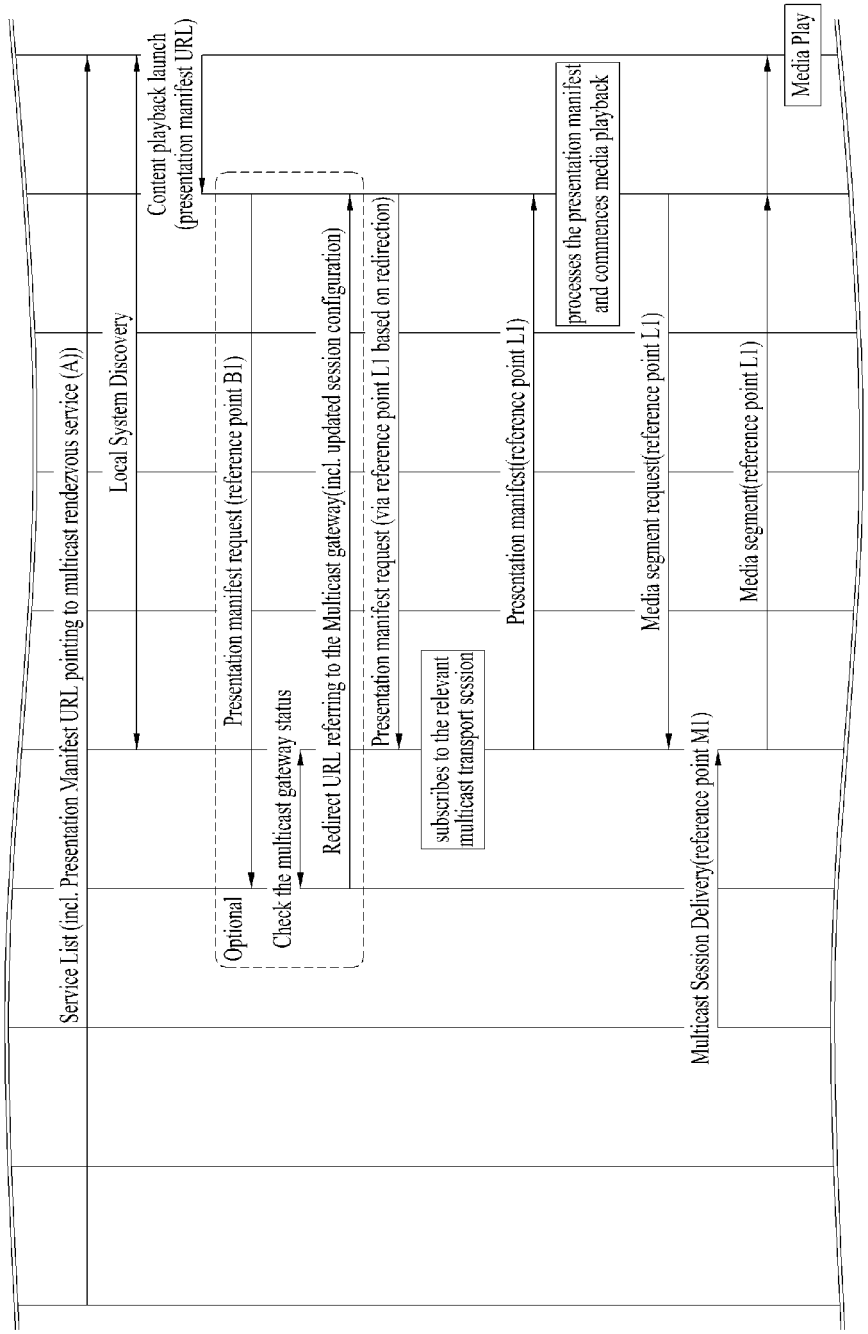
Figure 39:
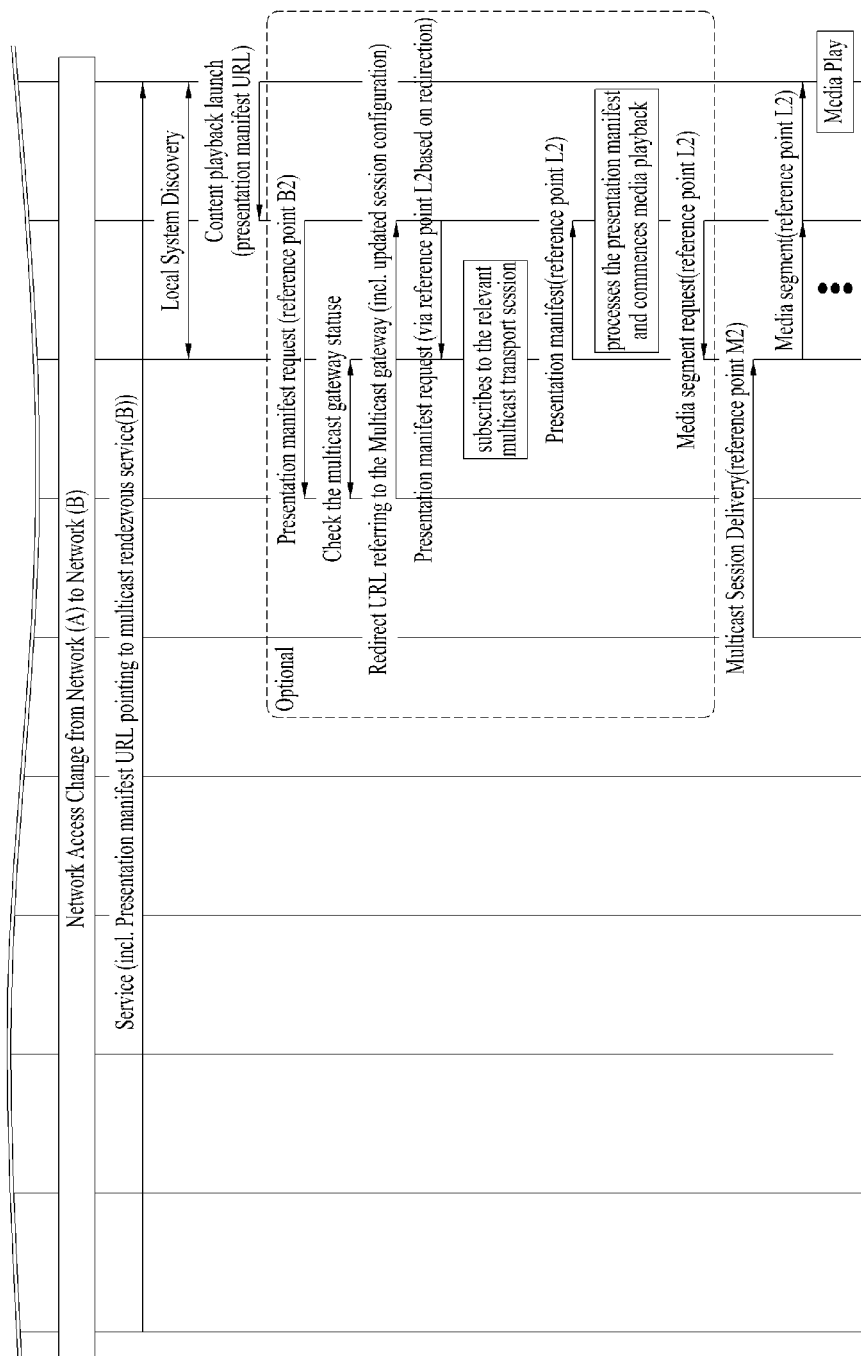

FIGS. 37, 38, and 39 illustrate a flowchart of a network change according to embodiments.

The flowchart of FIGS. 37 to 39 may be performed according to embodiments illustrated in FIGS. 1 to 6, 9 to 16, and 36. Each component constituting embodiments corresponds to hardware, software, a processor, and/or a combination thereof.

A flow of a procedure of receiving the same service even after a network is changed, after a procedure in which a device acquires a manifest and receives multicast media for an architecture according to embodiments, is illustrated.

A flow related to the multicast server proceeds as follows.

Each function is deployed according to the architecture, and a configuration for the multicast service is applied to the multicast server, the multicast gateways, and the multicast rendezvous service functions.

A provisioning function transmits configuration information about a currently provisioned multicast session to the multicast server through network control.

If the multicast session is started, a media segment is ingested from a content provider to the multicast server to start multicast transmission. If there is a multicast gateway capable of receiving the media segment, the multicast gateway enters a receivable state.

When the device accesses a network A, the following operation may be performed.

The application may receive a service list from the service provider via the network A. To receive the service list, a service list acquisition method defined in the network A may be used. For example, if a service directory is configured in a DVB-I network, the application may receive the service list through interaction between the service provider, the service directory, and the application. For an ABR multicast operation, the service list may include a URL to request a presentation manifest mapped to a service ID.

When a user selects multicast content to be received, the application may acquire a URL for requesting an initial presentation manifest through the service directory. In this case, the URL points to a multicast gateway A or a multicast rendezvous service function A.

The application controls the content playback function to start an operation for receiving content. In this case, the application may deliver the URL for the multicast gateway A or the multicast rendezvous service function A.

Since the multicast gateway and the multicast rendezvous service function are configured in the same device (i.e., co-located deployment), the following procedure may optionally be performed.

The content playback function makes a request for the presentation manifest to the multicast rendezvous service function A through the reference point B1 using the URL transmitted by the application.

The multicast rendezvous service function A checks the status of the multicast gateway A configured in the same network. If a service for the requested presentation manifest is defined in a multicast configuration, the multicast rendezvous service function A transmits a redirection URL for the multicast gateway A to the content playback function. In this case, an updated multicast session configuration may be included in a transmitted redirection message.

Upon receiving the redirection message, the content playback function follows corresponding redirection.

Using the obtained URL, the content playback function makes a request for the presentation manifest to the multicast gateway A through the reference point L1.

If the presentation manifest is previously cached in the multicast gateway A, the multicast gateway A transmits the presentation manifest to the content playback function.

The content playback function requests a media segment for corresponding content based on the received presentation manifest.

Multicast streaming is transmitted from the multicast server to the multicast gateway A through an interface M1.

The content playback function may receive the requested media segment from the multicast gateway A and media is played. If there is no separate control, the media is continuously played.

In this state, if the device changes access from the network A to a network B, the following operation may be performed.

The application may receive the service list from the service provider via the network B. To receive the service list, a service list acquisition method defined in the network B may be used. In order to continuously receive the multicast session received through the network A, session information about a corresponding service ID may be exchanged. The received service list may include a URL to request a presentation manifest mapped to the service ID.

Since the multicast gateway and the multicast rendezvous service function are configured in the device, an operation related to the interfaces L2 and B2 may optionally be performed.

For a service being received, the application may obtain the URL to request the presentation manifest. In this case, the URL points to a multicast rendezvous service function B.

The application controls the content playback function to start an operation for receiving content. In this case, the application may deliver the URL for the multicast rendezvous service function B.

The content playback function makes a request for the presentation manifest to the multicast rendezvous service function B through the reference point B2 using the URL transmitted by the application.

The multicast rendezvous service function B checks the status of the multicast gateway B configured in the same network. If a service for the requested presentation manifest is defined in a multicast configuration, the multicast rendezvous service function B transmits a redirection URL for the multicast gateway B to the content playback function. In this case, an updated multicast session configuration may be included in a transmitted redirection message.

Upon receiving the redirection message, the content playback function makes a request for the presentation manifest to the multicast gateway B through the reference point L2 based on the redirection.

If the presentation manifest is previously cached in the multicast gateway B, the multicast gateway B transmits the presentation manifest to the content playback function.

The content playback function requests a media segment for corresponding content based on the received presentation manifest.

Multicast streaming is transmitted from the multicast server to the multicast gateway B through an interface M2.

The content playback function may receive the requested media segment from the multicast gateway B and the media is played. If there is no separate control, the media is continuously played.

Next, the multicast signal processing method/apparatus according to embodiments capable of accessing multiple networks will be further described.

A multicast server may be located on each network.

Figure 40:
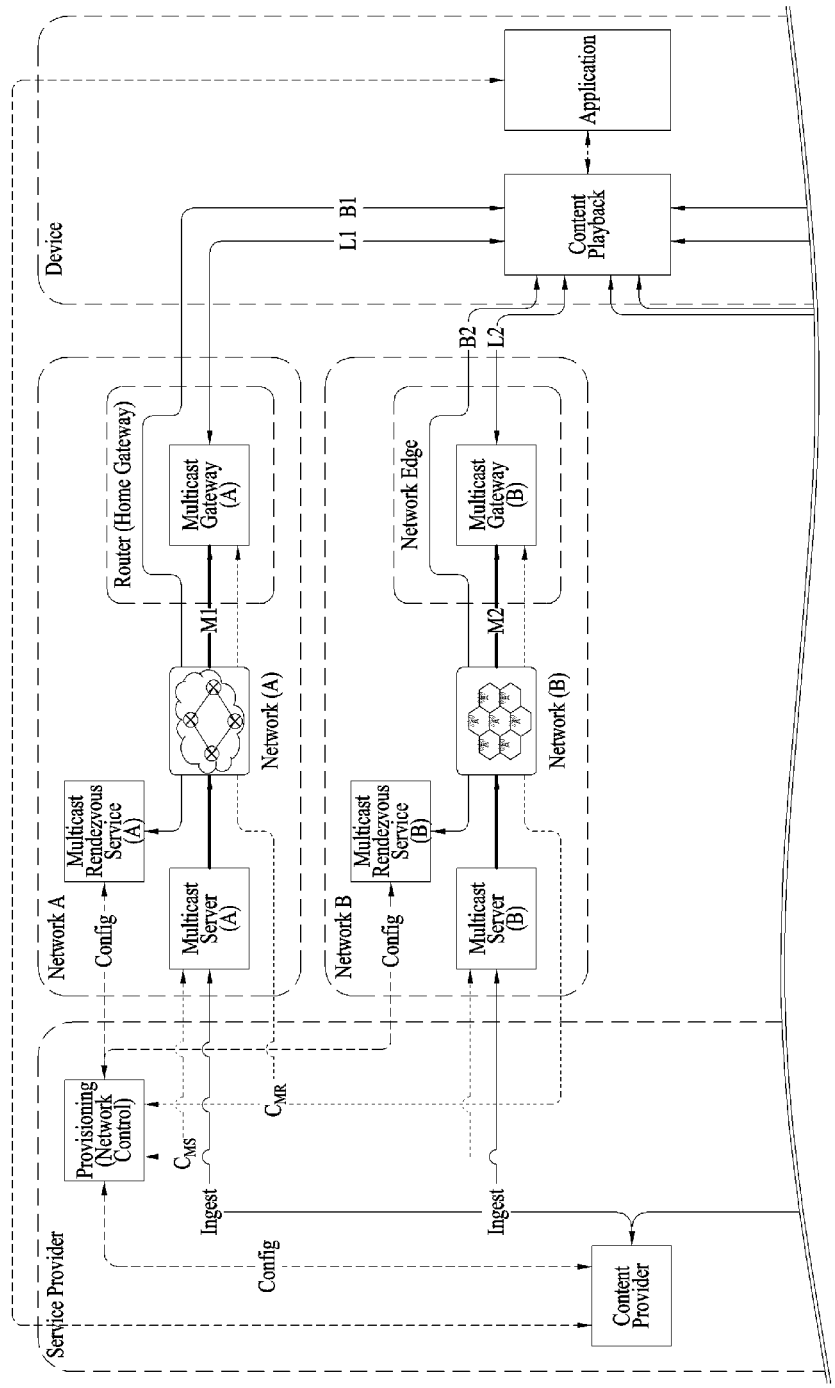
FIGS. 40 and 41 illustrate an embodiment in which a device accesses various serviceable networks when multicast servers and multicast gateways are configured in respective networks according to embodiments.
Figure 41:
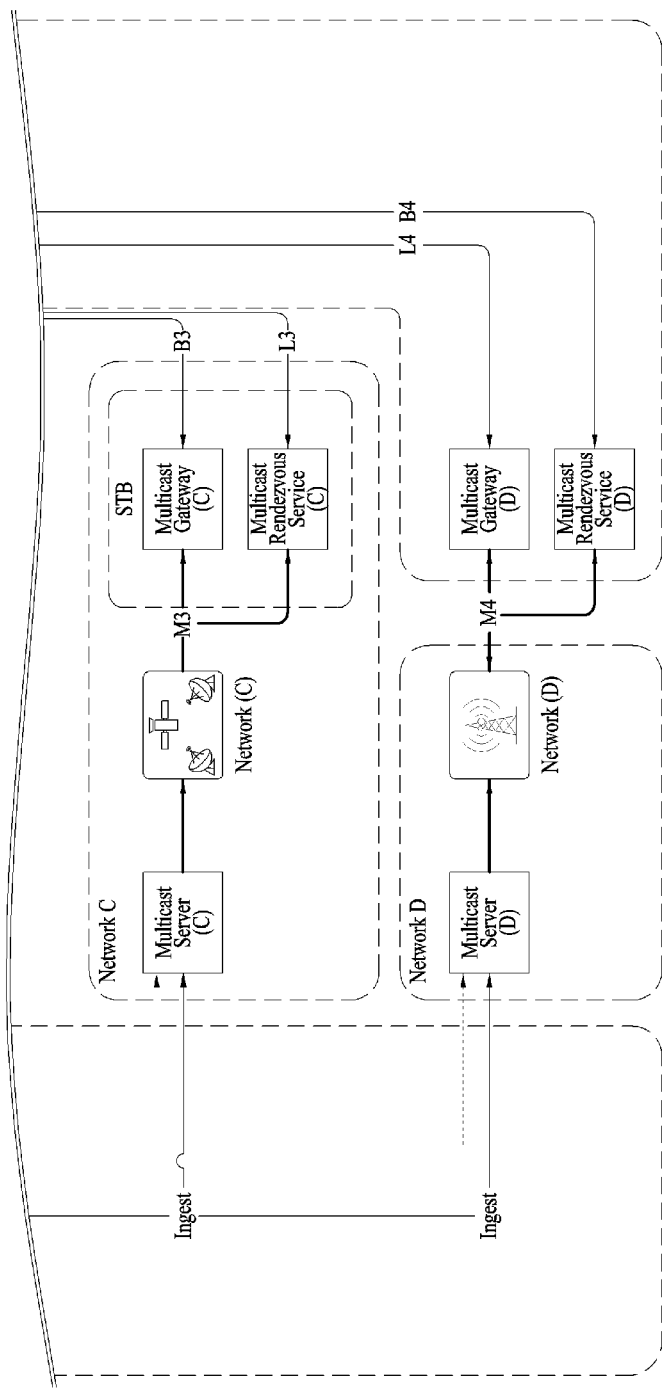

FIGS. 40 and 41 illustrate an embodiment in which a device accesses various serviceable networks when multicast servers and multicast gateways are configured in respective networks according to embodiments.

Each component constituting embodiments corresponds to hardware, software, a processor, and/or a combination thereof.

As described above, an embodiment in which a device accesses various serviceable networks when multicast servers and multicast gateways are configured in respective networks is described below. A system according to embodiments may include a service provider, network(s), and a device. Configurations of the service provider, the network(s), and the device are illustrated in FIGS. 40 and 41.

Figure 42:
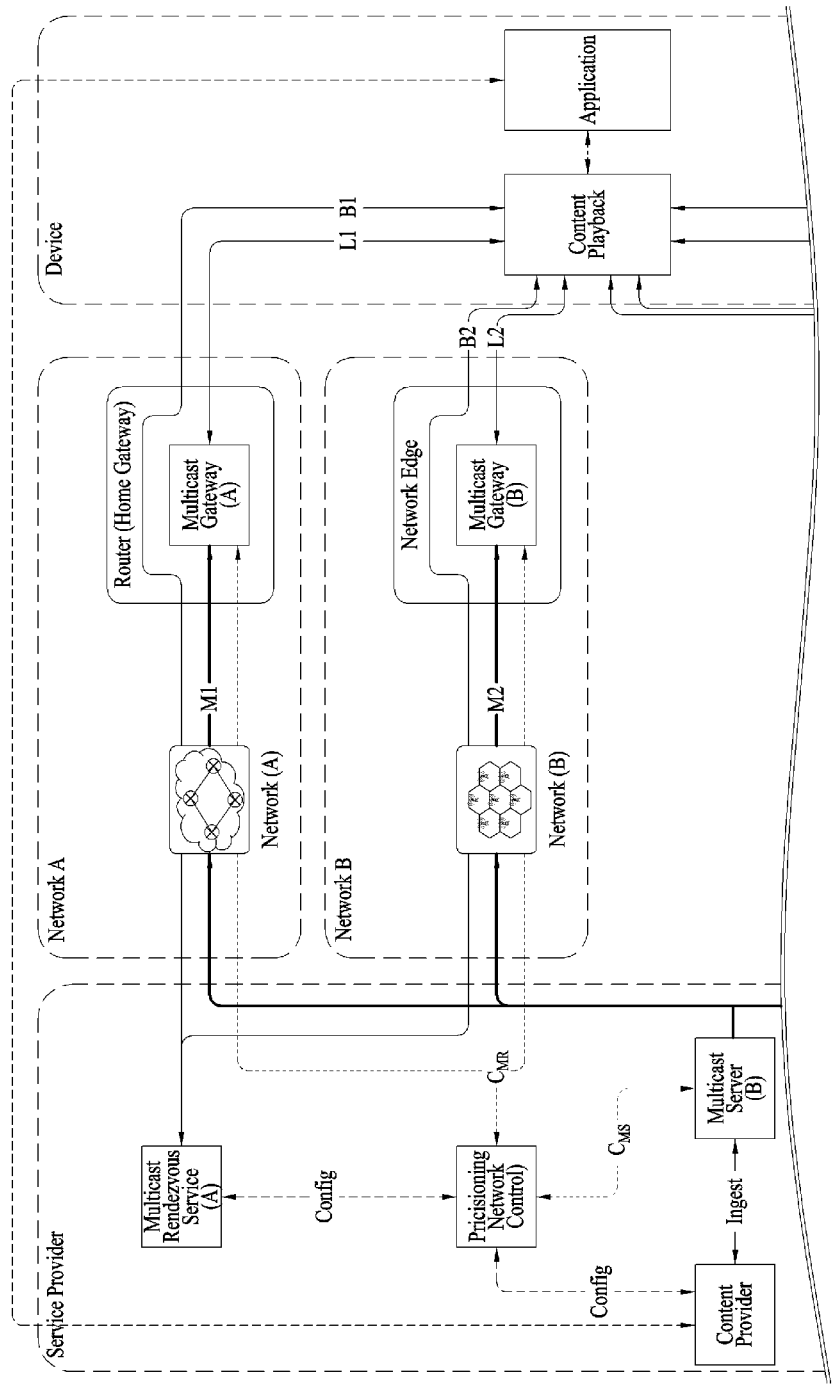
FIGS. 42 and 43 illustrate an example in which a single multicast provides a service through a plurality of heterogeneous networks and multicast gateways for the multicast server are configured in respective networks server according to embodiments.
Figure 43:
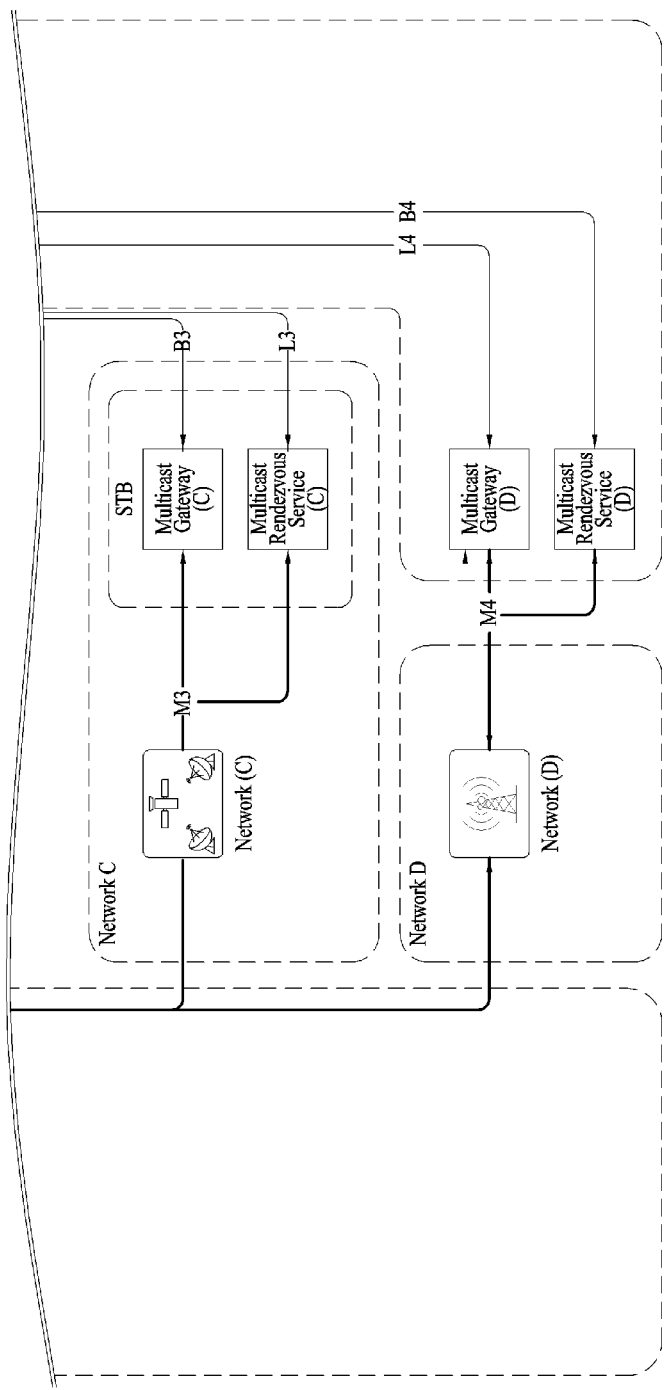

FIG. 38 illustrates (? FIGS. 42 and 43 illustrate) an example in which a single multicast server provides a service through a plurality of heterogeneous networks and multicast gateways for the multicast server are configured in respective networks according to embodiments.

An embodiment is described below in which the device access various serviceable networks in the case in which a single multicast server provides a service through a plurality of heterogeneous networks and multicast gateways for the multicast server are configured in respective networks. A system according to embodiments may include a service provider, network(s), and a device. Configurations of the provider, the network(s), and the device according to embodiments are illustrated.

Each component constituting embodiments corresponds to hardware, software, a processor, and/or a combination thereof.

In accordance with FIGS. 16 to 43, the transmission and reception devices according to embodiments efficiently control and provide a DVB multicast ABR and 5G media streaming in various network environments based on an operation according to embodiments.

Next, a reception operation and an operation for the reception device will be described.

For architectures according to the foregoing embodiments, the following protocol may be implemented.

Based on the architecture described according to embodiments, elements and attributes necessary for a device capable of performing ABR multicast streaming by accessing a plurality of transmission networks are defined.

A receiver according to embodiments may perform a reverse process of an operation of a transmitter. The receiver according to embodiments may perform ABR multicast streaming based on the following operation. The receiver according to embodiments may perform ABR multicast streaming based on the following network architecture.

Examples of protocol stacks in reception devices are described below.

Figure 44:
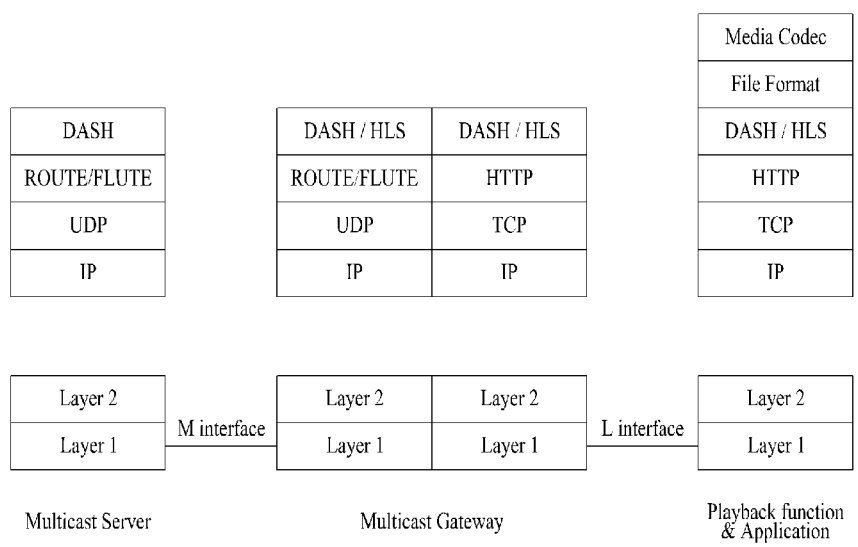
FIG. 44 illustrates a protocol configuration for ABR multicast according to embodiments.

FIG. 39 (? FIG. 44) illustrates a protocol configuration for ABR multicast according to embodiments.

For multicast ABR transmission, a multicast server may transmit multicast streaming through an interface M. In this case, ROUTE or FLUTE may be used as a multicast transmission protocol. A multicast gateway may use DASH or HLS for HTTP-based adaptive media streaming through an interface L for a playback function. In the playback function, a protocol for receiving HTTP-based adaptive media streaming from the multicast gateway, and a file format and media codec for the received adaptive streaming may be configured. Here, Layer 1 and Layer 2 protocols may be configured as optimal protocols for each network.

In order to access a plurality of networks, embodiments may include the following protocols.

Figure 45:
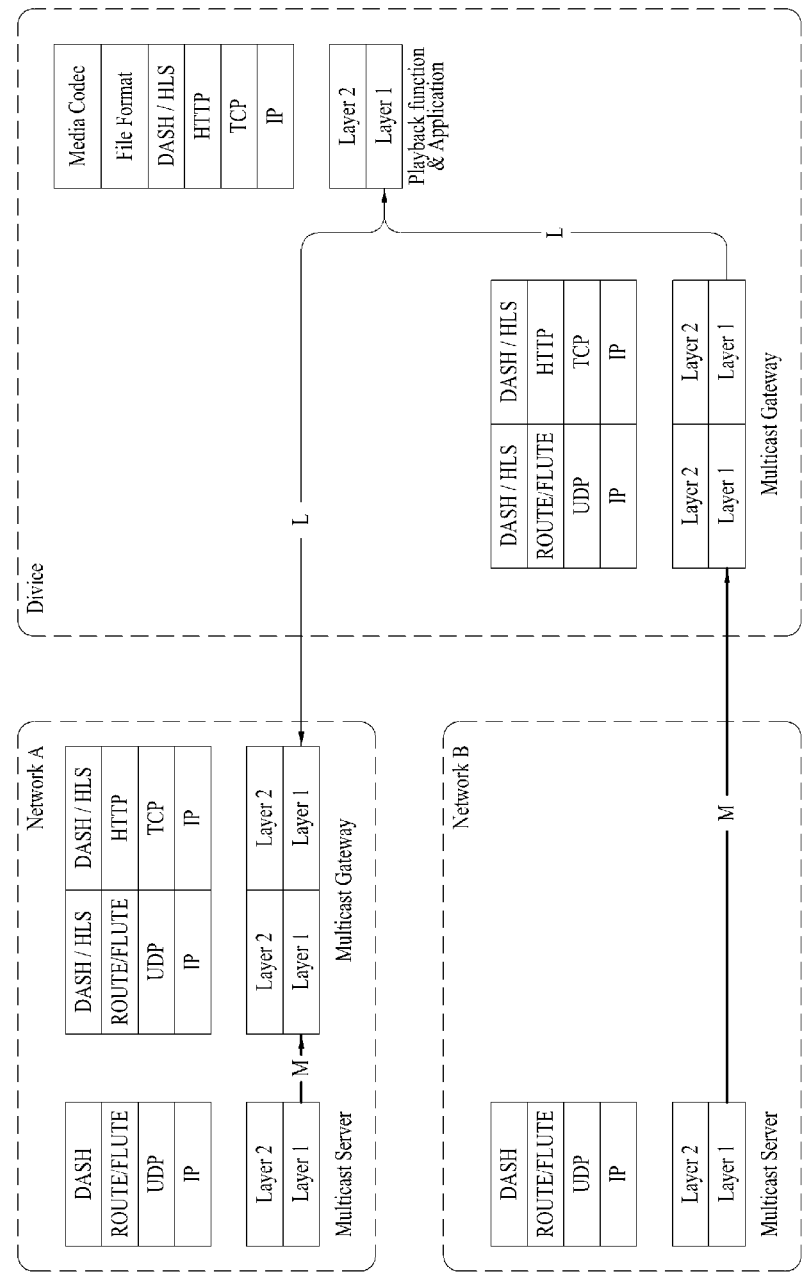
FIG. 45 illustrates an embodiment of protocols configurable in a reception device to access a plurality of networks according to embodiments.

FIG. 45 illustrates an embodiment of protocols configurable in a reception device to access a plurality of networks according to embodiments.

When the multicast signal processing apparatus according to embodiments is implemented as the reception device, protocols implemented in the architectures according to the above-described embodiments are illustrated.

According to embodiments, the case is considered in which, for a network A, a multicast gateway is configured in the network and, for a network B, a multicast gateway is configured in a device.

According to embodiments, in order to provide an ABR multicast streaming service through the network A, the multicast gateway configured on the network A receives multicast streaming from a multicast server and transmits multicast streaming to the device through an HTTP-based adaptive media streaming method through an interface L. Therefore, a protocol stack capable of receiving adaptive media streaming through the interface L may be configured in the device.

In addition, in order to receive ABR multicast streaming through the network B, the case in which the multicast gateway is configured in the device may be considered. Therefore, a protocol stack capable of receiving adaptive media streaming through an interface M for network B may be configured in the device.

Therefore, protocols for the interface M and the interface L may be simultaneously configured in the reception device for receiving a multicast ABR service by accessing a plurality of networks. In this case, the multicast gateway in the device may convert multicast streaming into HTTP-based adaptive media streaming in the same way as the multicast gateway configured on the network and transmit the converted media streaming through the interface L in the device.

Figure 46:
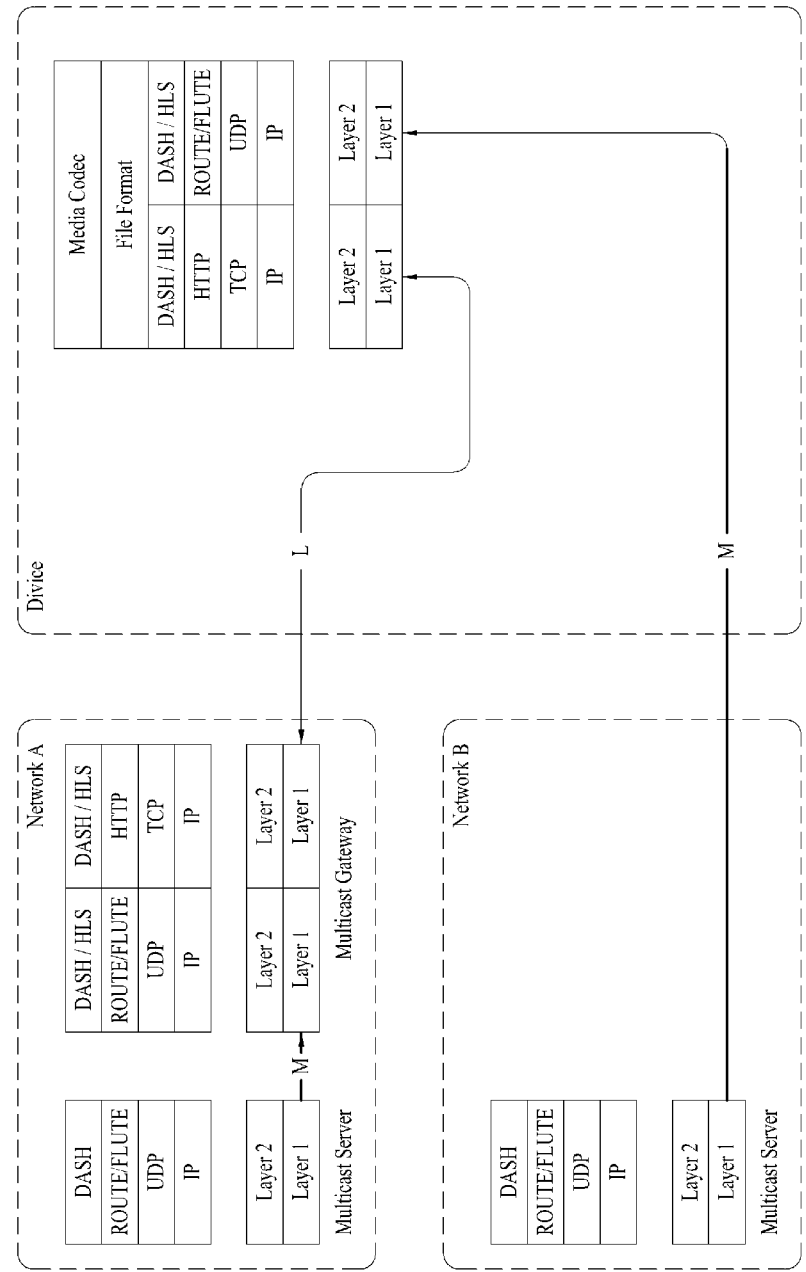
FIG. 46 illustrates protocols according to embodiments.

FIG. 46 illustrates protocols according to embodiments.

According to embodiments, the case is considered in which, for a network A, a multicast gateway is configured in the network and, for a network B, a multicast gateway is configured in a device.

According to embodiments, in order to provide an ABR multicast streaming service through the network A, the multicast gateway configured on the network A receives multicast streaming from a multicast server and transmits multicast streaming to the device through an HTTP-based adaptive media streaming method through an interface L. Therefore, a protocol stack capable of receiving adaptive media streaming through the interface L may be configured in the device.

In addition, in order to receive ABR multicast streaming through the network B, the case in which the multicast gateway is configured in the device may be considered. Therefore, a protocol stack capable of receiving adaptive media streaming through an interface M for the network B may be configured in the device.

Therefore, protocols for the interface M and the interface L may be simultaneously configured in the reception device for receiving a multicast ABR service by accessing a plurality of networks. In this case, the multicast gateway in the device may be configured with the interface L in the device unlike the multicast gateway configured on the network. In this case, the interface L may be configured by a direct protocol stack without a separate interface. For streaming received through the network A, the device may operate as a playback function and, for streaming received through the network B, the device may operate as the multicast gateway. When the device operates as the multicast gateway, the interface L may be omitted and a payload of a multicast protocol may become adaptive media streaming data.

An operation of generating, transmitting, and receiving a service list and a presentation manifest according to embodiments is described below.

FIG. 47 illustrates services and configurations of service information according to embodiments.

For a DASH-based multicast ABR service, a service provider according to embodiments may configure a presentation manifest (e.g., an MPD) as follows along with a service list. In terms of providing services, a service list and a presentation manifest for the same content may be configured so as not to overlap.

FIG. 48 illustrates a method of generating and transmitting a service list and a presentation manifest for ABR multicast according to embodiments.

In order to support ABR multicast, the multicast signal processing method/apparatus according to embodiments may generate, transmit, and receive the service list and the presentation manifest as illustrated in FIG. 48.

Elements capable of being transmitted may be determined according to interfaces defined in the multicast ABR architecture. An application of the reception device may receive a service list from a service list directory and the service list may include a service ID and a URL for a multicast rendezvous service function. When a content playback function makes a request for a manifest to the multicast rendezvous service function through the URL, the content playback function may receive the presentation manifest through an interface L by obtaining an address of a multicast gateway and a path for the manifest through a redirection message of the multicast rendezvous service function. The multicast gateway may receive the presentation manifest (e.g., MPD) from a multicast server. To this end, the multicast gateway may obtain multicast session configuration information.

FIG. 49 illustrates management of a service list and a presentation manifest according to embodiments.

The reception device according to embodiments may manage a service list and a presentation manifest as illustrated in FIG. 49. For the service list and presentation manifest (e.g., MPD) configured by the architecture according to embodiments, a receiver capable of receiving a multicast ABR service through a plurality of networks may mange the service list as follows.

That is, for the same service, MPDs for multiple networks such as Network 1 and Network 2 may be generated and transmitted/received.

In embodiments, since adaptation sets provided by respective networks may be different in a device receiving the multicast ABR service using a plurality of networks, a separate presentation manifest is configured and managed according to a network.

When a function for receiving the multicast ABR service is configured in a TV and broadcast content is also simultaneously received in the corresponding receiver, the service list according to embodiments may be managed together with a channel map.

FIG. 50 illustrates a service list according to embodiments.

FIG. 50 illustrates a syntax of a service list transmitted and received in FIGS. 6, 17 to 19, 21 to 23, 25 to 27, 29 to 31, 33 to 35, and 37 to 39.

Service list (ServiceList)—A root element including configuration information about a service.

Service identifier (@serviceIdentifier)—An identifier that identifies a service.

Presentation manifest request address (PresentationManifestRequestURL)—An element for information about a multicast rendezvous service function when one service is configured through multiple multicast rendezvous service functions.

Network type (@NetworkType)—A type of a network in which a multicast rendezvous service function is deployed.

When a device simultaneously accesses the network, the network type may be used to configure priority.

Host address (@HostAddress)—An address of a corresponding multicast rendezvous service.

Rendezvous service type (@RendezvousServerType)—An attribute for deployment of a multicast rendezvous service function. For example, 0 represents regular deployment, and 1 represents co-located deployment.

Multicast transport session (MulticastTransportSession)—An element for a multicast transport session. This element may be transmitted optionally if a device includes a multicast gateway. If the MulticastTransportSession element is not sent, information may be provided through multicast gateway configuration.

FIG. 51 illustrates a multicast session according to embodiments.

An embodiment of the configuration of a multicast session element is described below. The multicast session element is transmitted by a provisioning function to a multicast server and a multicast gateway. Therefore, interfaces CMS and CMR may be used. If a network supports only unidirectional transmission, the multicast session element may be delivered to the multicast server through the interface CMR and then delivered by the multicast server to the multicast gateway through an interface M.

@serviceIdentifier: A service identifier of a logical service with which this session is associated @contentPlaybackAvailabilityOffset: Availability time offset adjustment applied to an original presentation manifest when passed to an instance of a duration string content playback function.

@networkIdentifier: An identifier of a network to which a current multicast session is transmitted.

PresentationManifestLocator: A URL of a presentation manifest for a linear service.

@manifestId: An identifier that uniquely identifies this presentation manifest within the scope of a multicast session @contentType: A MIME content type of this presentation manifest.

MulticastTransportSession: A container for multicast transport session parameters.

@networkIdentifier—An identifier for a network in which a current multicast session is being serviced. A receiver may identify a network in which the same multicast service is received.

Manifest request and redirection operation according to embodiments

In the above architecture, a syntax of a request URL of an HTTP message that the content playback function sends to the multicast rendezvous service function is as follows.

http[s]://<Host>/<ManifestPath>[?<field>=<value> [&<field>=<value>]*]

Elements included in a URL according to embodiments are illustrated in FIG. 52.

FIG. 52 illustrates elements included in a request URL of an HTTP message according to embodiments.

Host: An FQDN (or IP address) and optionally a port number of a multicast rendezvous service function.

ManifestPath: A resource path for retrieving a presentation manifest from a specified host.

AToken: An authentication token that authorizes access to a multicast rendezvous service function if required by a system operator. This value may be included in an original presentation manifest URL, added by a third-party CDN broker as part of an earlier HTTP redirection URL, or generated locally by the application.

Priority: A presentation retrieving priority during establishment of multiple networks.

MGstatus: A current status of a multicast gateway. For example, a value of 0 indicates an inactive status and a value of 1 indicates an active status.

MGid: A port number of a multicast gateway, optionally preceded by an IP address. A format is [IP address]: port.

MGhost: A host name of a multicast gateway

Ori: A host name (FQDN) of an original targeted host.

An application may replace the original targeted host name (FQDN) with a local multicast rendezvous service host name or address. Moreover, in case of relying on a third-party CDN broker, the latter indicates the original targeted host name (FQDN) before redirecting a request to a multicast rendezvous service function.

Priority—When a playback function makes a request for a manifest to a multicast rendezvous service function and the multicast rendezvous service function is capable of redirecting the manifest to a plurality of multicast gateways, different priorities may be assigned to networks in which respective multicast gateways are configured, so that priority of multicast reception may be determined.

Upon receiving a request URL, the multicast rendezvous service function may send a 307 temporary redirect response. Here, a syntax of a redirect URL of a location response header is as follows:

http[s]://<Host>[/session ID]/<ManifestPath> [?conf=<multicast session

Elements included in a URL according to embodiments are as follows.

FIG. 53 illustrates information included in a redirect URL of a location response header according to embodiments.

Host: An IP address or FQDN and optionally a port number of a multicast gateway (e.g., "router.example:8088" or "192.0.2.1:8088").

Session ID: A unique presentation session identifier delivered and generated by a multicast rendezvous service function, including one or more URL path elements.

ManifestPath: A resource path for retrieving a presentation manifest from a specified host.

RequestedPriority: A priority requested by a content playback function.

conf: Multicast session parameters may take the form of a multicast gateway configuration instance document including one multicast session.

The document may be compressed using Gzip and base64url encoding prior to inclusion as a URL query string parameter.

RequestedPriority—When a playback function makes a request for a manifest to a multicast rendezvous service function, if priorities for multiple multicast gateways are configured, a priority given upon requesting redirection transmission may be restored. The multicast rendezvous service function may indicate redirection to a multicast gateway with the highest priority capable of performing redirection.

In this case, if the presentation manifest is related to a multicast session in a multicast session configuration (a service is capable of being transmitted in multicast), the multicast rendezvous service function may redirect the request to the multicast gateway as follows:

HTTP/1.1 307 Temporary Redirect

Server: <Multicast gateway>

Location: http[s]://<Multicast gateway>/<ManifestPath> [?<requestedPriority]*

A URL corresponding to a location field of an HTTP header may include a session identifier and a query parameter for piggybacking a multicast gateway configuration instance document including a multicast session corresponding to a requested presentation manifest.

Next, operations of a content provider and a service provider according to embodiments will be described.

An architecture according to embodiments may include a content provider, a service provider, a network, and a device according to embodiments. Each component may correspond to hardware, software, a processor, and/or a combination thereof. A processor according to embodiments may perform an operation according to embodiments and may be connected to a memory that stores information about the operation.

Figure 54:
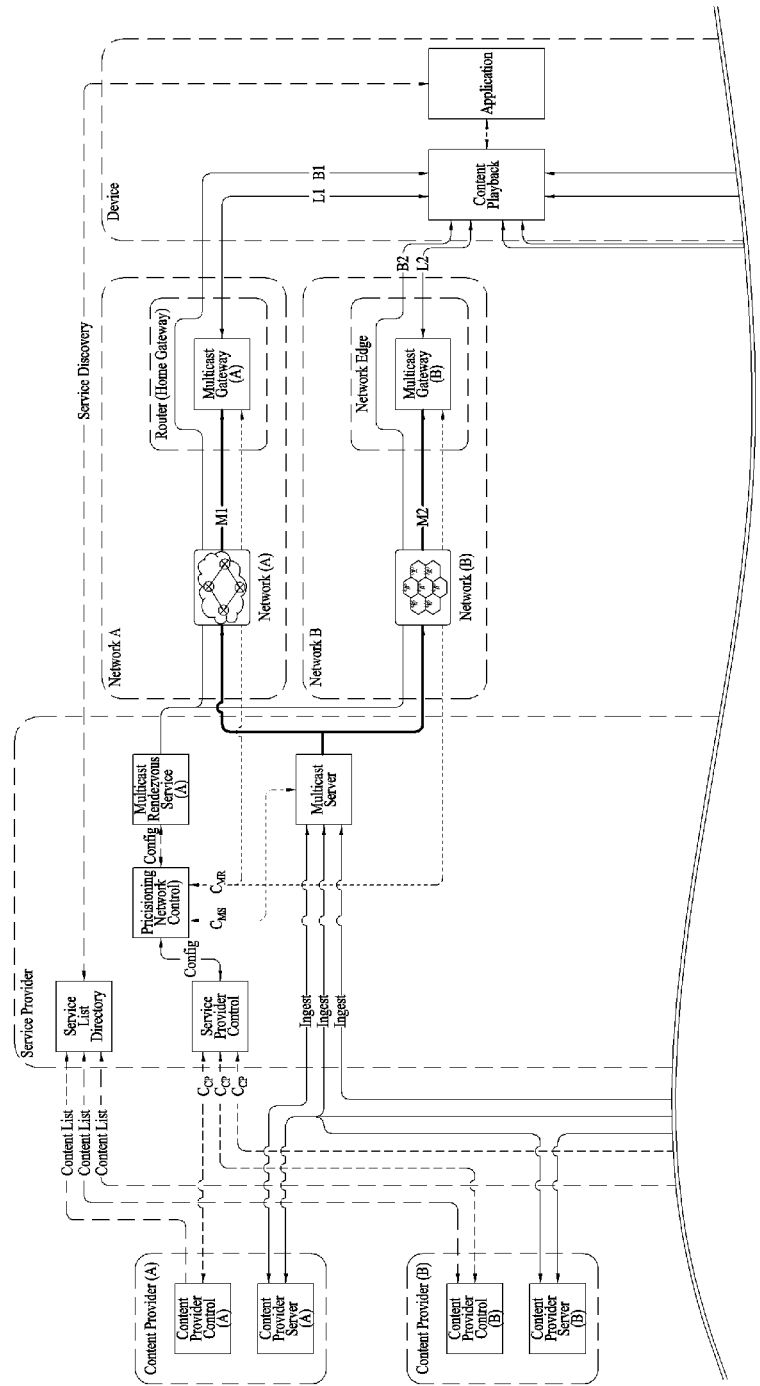
FIGS. 54 and 55 illustrate multiple content providers according to embodiments.
Figure 55:
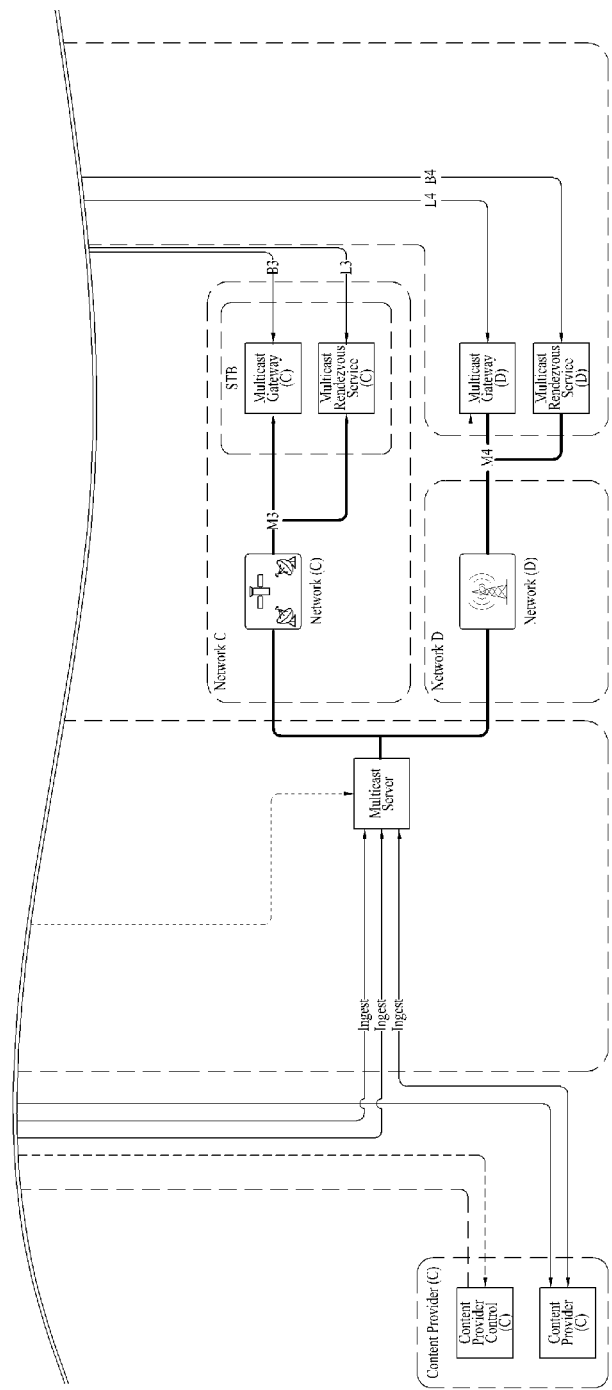

FIGS. 54 and 55 illustrate multiple content providers according to embodiments.

An architecture according to embodiments is illustrated in which a service is provided using content generated from a plurality of content providers. In the architecture according to embodiments, for respective networks, multicast servers, multicast gateways, and multicast rendezvous service functions provide services to a content playback function connected to the networks.

In this case, a service provider may provide a service to a reception device using a plurality of networks. The service provider may configure a service list directory and obtain a content list to be serviced through content provider control functions configured in the respective content providers. The received content list may be configured as a service list in a form suitable for services, and the service list is provided to an application.

The application acquires a list of multicast services and access information about a corresponding multicast rendezvous service function through a service discovery interface. The service discovery interface may follow a method separately defined between the service provider and the application. In addition, each network may support data transmission and reception for the service discovery interface.

A content provider server ingests content to the multicast server configured in the service provider. In this case, information about the ingested content may be transferred from each content provider control function to each service provider control function. The service provider control function may configure multicast session configuration information using the information about the content and forward the multicast session information to the multicast server and the multicast gateway.

The content playback function in the device may configure interfaces L and interfaces B for respective networks. Media streaming may be received through a multicast gateway A, a multicast gateway B, a multicast gateway C, and a multicast gateway D via interfaces L1, L2, L3, and L4, and initial access information about the multicast gateways may be received via interfaces B1, B2, B3, and B4. Here, since the multicast gateway D and a multicast rendezvous service function D are configured within the device, the interfaces L4 and B4 may be replaced with internal interfaces of the device.

Figure 56:
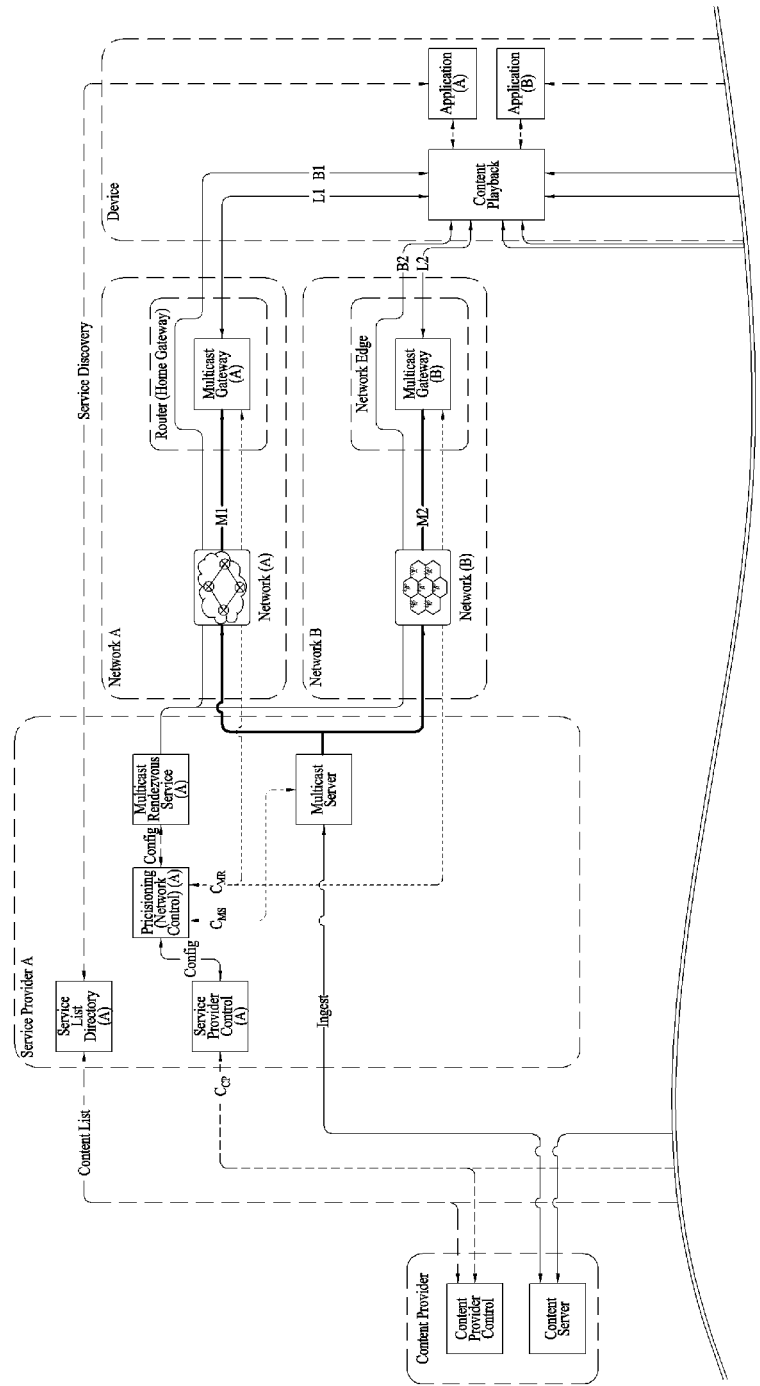
FIGS. 56 and 57 illustrate multiple service providers according to embodiments.
Figure 57:
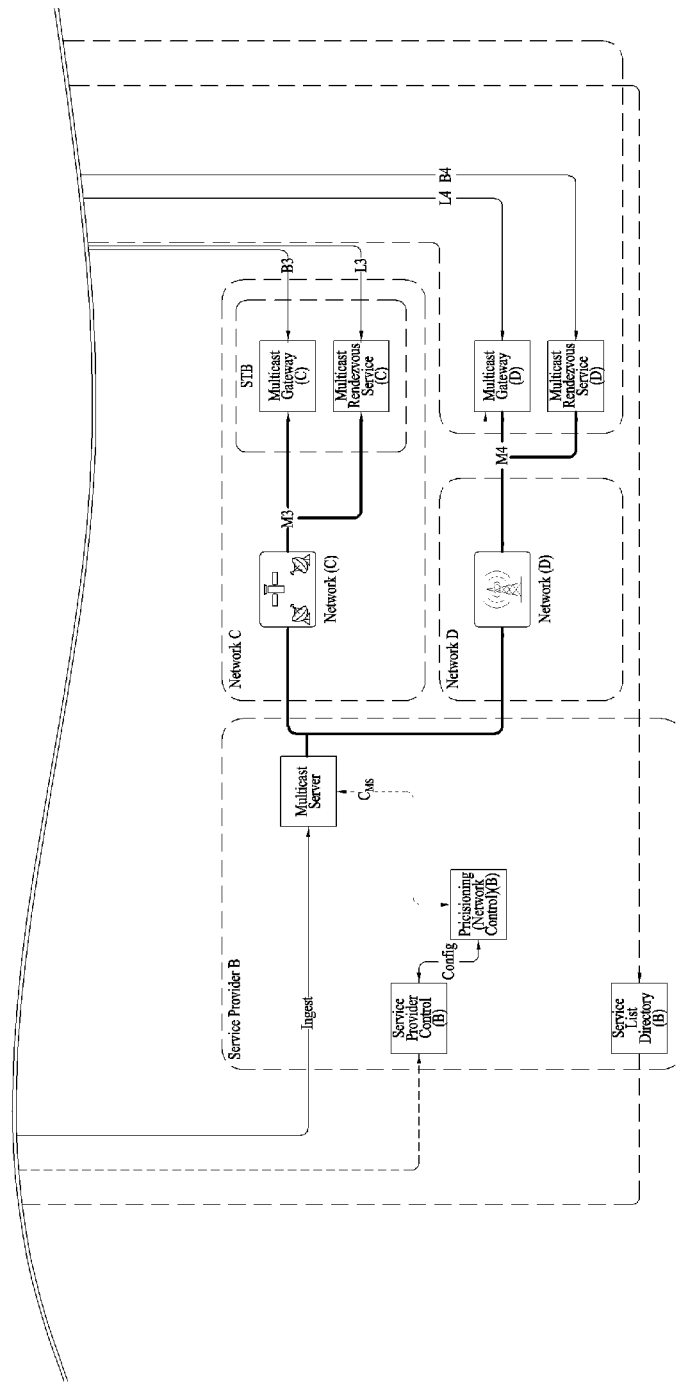
Figure 58:
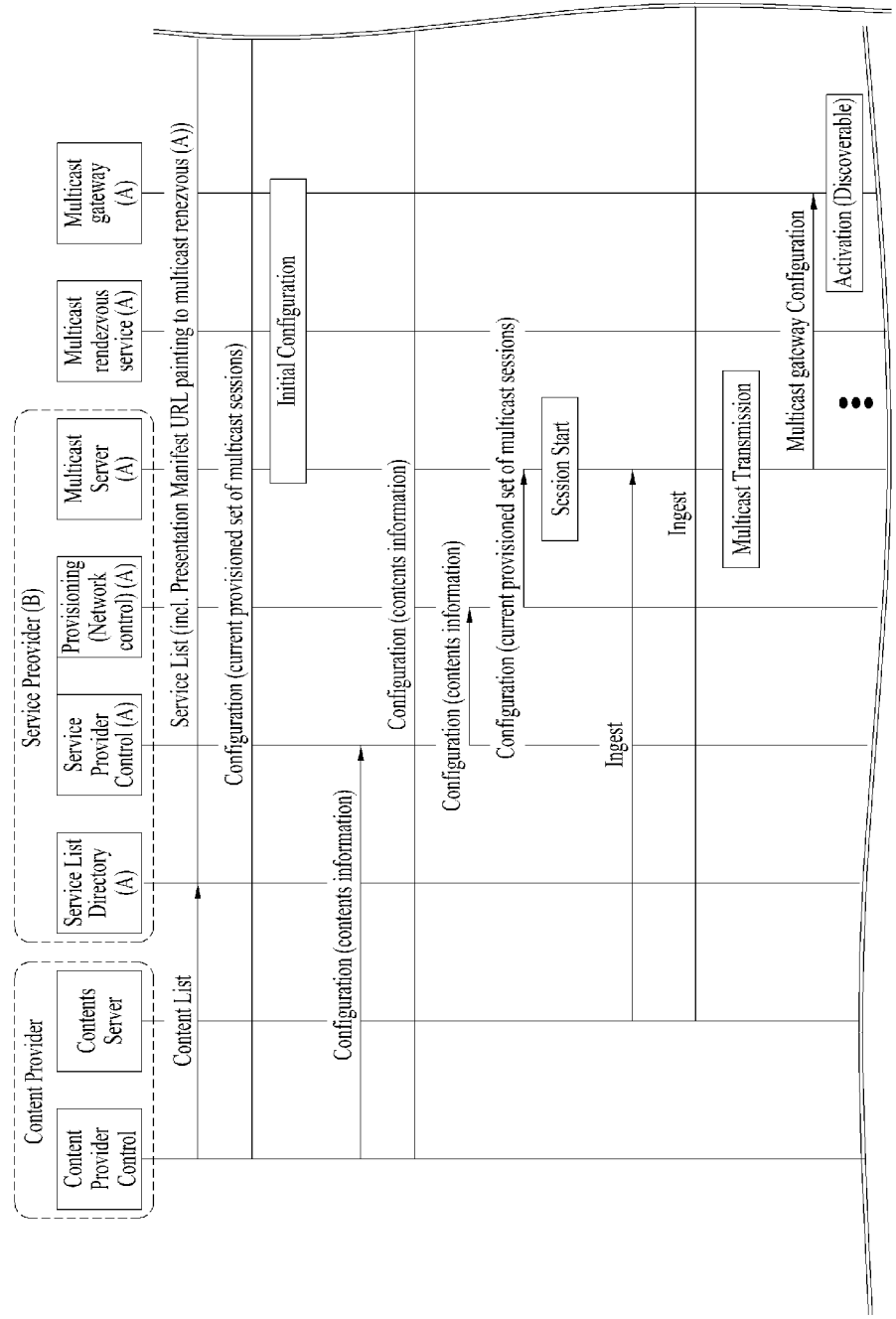
FIGS. 58, 59, 60, 61, 62, and 63 illustrate a flowchart of a change of service providers according to embodiments.

FIGS. 56 and 57 illustrate multiple service providers according to embodiments.

An architecture according to embodiments is illustrated in which a service is provided to a content provider through a plurality of service providers. In the architecture according to embodiments, for respective networks, multicast servers, multicast gateways, and multicast rendezvous service functions provide services to a content playback function connected to the networks.

In this case, the respective service providers may provide services to a reception device using a plurality of networks. Each of the service providers may configure a service list directory and obtain a content list to be serviced through a content provider control function of the content provider. The received content list may be configured as a service list in a form suitable for services, and the service list is provided to applications.

Each application acquires a list of multicast services and access information about a corresponding multicast rendezvous service function through a service discovery interface. The service discovery interface may follow a method separately defined between the service provider and the application. In addition, each network may support data transmission and reception for the service discovery interface.

A content provider server ingests content to multicast servers configured in the service providers. In this case, information about the ingested content may be transferred from a content provider control function to service provider control functions. Each service provider control function may configure multicast session configuration information using the information about the content and forward the multicast session information to each multicast server and each multicast gateway.

The content playback function in the device may configure interfaces L and interfaces B for respective networks. Media streaming may be received through a multicast gateway A, a multicast gateway B, a multicast gateway C, and a multicast gateway D via interfaces L1, L2, L3, and L4, and initial access information about the multicast gateways may be received via interfaces B1, B2, B3, and B4. Here, since the multicast gateway D and a multicast rendezvous service function D are configured within the device, the interfaces L4 and B4 may be replaced with internal interfaces of the device.

FIGS. 58, 59, 60, 61, 62, and 63 illustrate a flowchart of a change of service providers according to embodiments.

A flow of a procedure of receiving the same content even after a service provider is changed, after a procedure in which a device acquires a manifest and receives multicast media for an architecture according to embodiments, is illustrated.

A flow related to the content provider may proceed as follows.

The content provider control function transfers a content list to service provider control functions of a service provider A and a service provider B.

Each service provider control function reconstructs the content list into a service list and transmits the service list to each associated application.

A flow related to the multicast servers proceeds as follows. (Operation independent of the respective service providers)

Each function is deployed according to the architecture, and a configuration for the multicast service is applied to the multicast servers, the multicast gateways, and the multicast rendezvous service functions.

A provisioning function transmits configuration information about a currently provisioned multicast session to the multicast servers through network control.

If the multicast session is started, a media segment is ingested from the content provider to the multicast servers to start multicast transmission. If there is a multicast gateway capable of receiving the media segment, the multicast gateway enters a receivable state.

When the device receives a service from a service provider A, the following operation may be performed.

An application A may receive a service list from a service list directory A via a network A. To receive the service list, a service list acquisition method defined in the network A may be used. For example, if a service directory is configured in a DVB-I network, the application A may receive the service list through interaction between the service provider, the service directory, and the application. For an ABR multicast operation, the service list may include a URL to request a presentation manifest mapped to a service ID.

When a user selects multicast content to be received, the application may acquire a URL for requesting an initial presentation manifest through the service directory. In this case, the URL points to a multicast gateway A or a multicast rendezvous service function A.

The application A controls the content playback function to start an operation for receiving content. In this case, the application A may deliver the URL for the multicast gateway A or the multicast rendezvous service function A.

The content playback function makes a request for the presentation manifest to the multicast rendezvous service function A through the reference point B1 using the URL transmitted by the application A.

The multicast rendezvous service function A checks the status of the multicast gateway A configured in the same network. If a service for the requested presentation manifest is defined in a multicast configuration, the multicast rendezvous service function A transmits a redirection URL for the multicast gateway A to the content playback function. In this case, an updated multicast session configuration may be included in a transmitted redirection message.

Upon receiving the redirection message, the content playback function makes a request for the presentation manifest to the multicast gateway A through the reference point L1 according to the redirection.

If the presentation manifest is previously cached in the multicast gateway A, the multicast gateway A transmits the presentation manifest to the content playback function.

The content playback function requests a media segment for corresponding content based on the received presentation manifest.

Multicast streaming is transmitted from the multicast server A to the multicast gateway A through an interface M1.

The content playback function may receive the requested media segment from the multicast gateway A and media is played. If there is no separate control, the media is continuously played.

In this state, if the device accesses a service provider B from the service provider A and changes access from the network A to a network B, the following operation may be performed.

An application B may receive the service list from a service list directory B via the network B. To receive the service list, a service list acquisition method defined in the network B may be used. For example, if a service directory is configured in a DVB-I network, the application B may receive the service list through interaction between the service provider, the service directory, and the application. For an ABR multicast operation, the service list may include a URL to request a presentation manifest mapped to a service ID.

For a service being received, the application B may obtain the URL to request the presentation manifest. In this case, the URL points to a multicast gateway B and a multicast rendezvous service function B.

When a user selects multicast content to be received, the application may acquire a URL for requesting an initial presentation manifest through the service directory. In this case, the URL points to a multicast gateway B or a multicast rendezvous service function B.

The application controls the content playback function to start an operation for receiving content. In this case, the application may forward the URL for the multicast gateway B or the multicast rendezvous service function B.

If the multicast gateway and multicast rendezvous service function are configured in the same device (co-located deployment), the following procedure may optionally be performed.

The content playback function makes a request for the presentation manifest to the multicast rendezvous service function B through the reference point B2 using the URL transmitted by the application B.

The multicast rendezvous service function B checks the status of the multicast gateway B configured in the same network. If a service for the requested presentation manifest is defined in a multicast configuration, the multicast rendezvous service function B transmits a redirection URL for the multicast gateway B to the content playback function. In this case, an updated multicast session configuration may be included in a transmitted redirection message.

Upon receiving the redirection message, the content playback function follows corresponding redirection.

Using the obtained URL, the content playback function makes a request for the presentation manifest to the multicast gateway B through the reference point L2.

If the presentation manifest is previously cached in the multicast gateway B, the multicast gateway B transmits the presentation manifest to the content playback function.

The content playback function requests a media segment for corresponding content based on the received presentation manifest.

Multicast streaming is transmitted from the multicast server to the multicast gateway B through an interface M2.

The content playback function may receive the requested media segment from the multicast gateway B and the media is played. If there is no separate control, the media is continuously played.

The method/device according to embodiments may be associated with a 5G system architecture as follows.

The 5G System may be composed of the following network functions (NF).

Abbreviations according to the embodiments are as follows: Authentication Server Function (AUSF), Core Access and Mobility Management Function (AMF), Data Network (DN), e.g. operator services, Internet access or 3rd party services, Structured Data Storage Network Function (SDSF), Unstructured Data Storage Network Function (UDSF), Network Exposure Function (NEF), NF Repository Function (NRF), Policy Control Function (PCF), Session Management Function (SMF), Unified Data Management (UDM), User Plane Function (UPF), Application Function (AF), User Equipment (UE), (Radio) Access Network ((R) AN).

Figure 64:
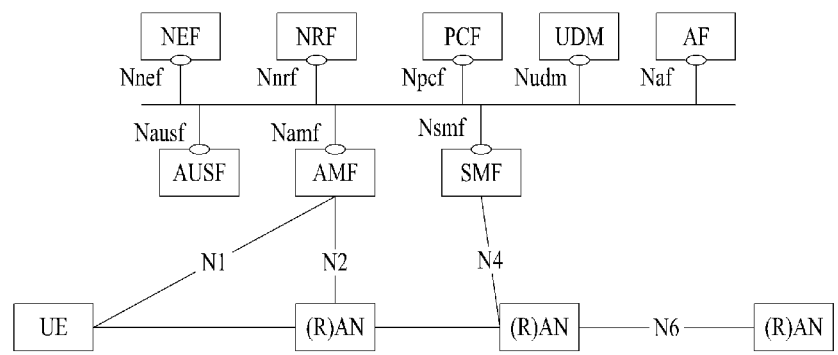
FIG. 64 illustrates a 5G system service-based architecture according to embodiments.

FIG. 64 illustrates a 5G system service-based architecture according to embodiments.

The above figure illustrates an architecture of a non-roaming case of a 5G system as service-based interfaces. User plane data is delivered via a data network (DN), a UPF, an (R)AN, and a UE, and the other functions may process control plane data.

Here, each service-based interface is as follows: Namf: Service-based interface exhibited by AMF. Nsmf: Service-based interface exhibited by SMF. Nnef: Service-based interface exhibited by NEF. Npcf: Service-based interface exhibited by PCF. Nudm: Service-based interface exhibited by UDM. Naf: Service-based interface exhibited by AF. Nnrf: Service-based interface exhibited by NRF. Nausf: Service-based interface exhibited by AUSF.

Figure 65:
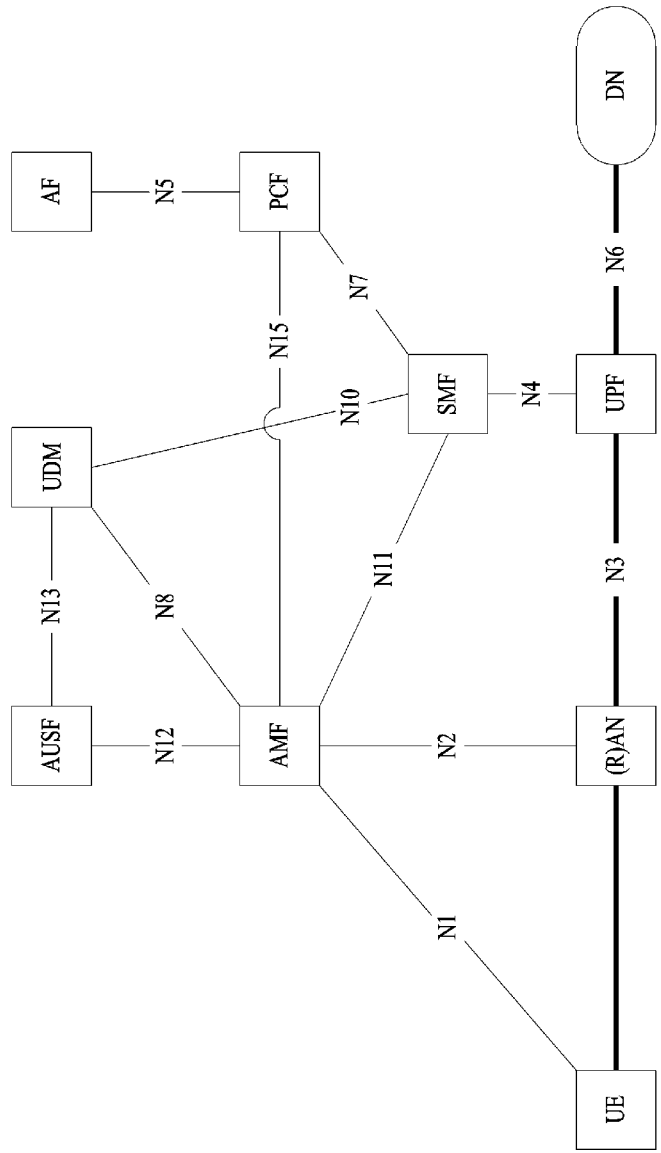
FIG. 65 illustrates a 5G system architecture in a reference point representation according to embodiments.

FIG. 65 illustrates a 5G system architecture in a reference point representation according to embodiments.

The figure illustrates the 5G system architecture for a non-roaming case using reference points indicating how different network functions interact.

User plane data is delivered via a DN, a UPF, a (R)AN, and a UE, and the other functions may process control plane data. Therefore, data is transmitted through N6 and N3, which are reference points between corresponding functions, and the (R)AN and the UE may be wirelessly connected.

Here, the reference points may be defined as: N1: Reference point between the UE and the AMF. N2: Reference point between the (R)AN and the AMF. N3: Reference point between the (R)AN and the UPF. N4: Reference point between the SMF and the UPF. N5: Reference point between the PCF and an AF. N6: Reference point between the UPF and a Data Network. N7: Reference point between the SMF and the PCF. N7r: Reference point between the PCF in the visited network and the PCF in the home network. N8: Reference point between the UDM and the AMF. N9: Reference point between two Core UPFs. N10: Reference point between the UDM and the SMF. N11: Reference point between the AMF and the SMF. N12: Reference point between AMF and AUSF. N13: Reference point between the UDM and Authentication Server function the AUSF. N14: Reference point between two AMFs. N15: Reference point between the PCF and the AMF in case of non-roaming scenario, PCF in the visited network and AMF in case of roaming scenario. N16: Reference point between two SMFs, (in roaming case between SMF in the visited network and the SMF in the home network). N17: Reference point between AMF and EIR. N18: Reference point between any NF and UDSF. N19: Reference point between NEF and SDSF.

The reference points listed above may be defined as separate protocols or as messages with separate identifiers in a common protocol. To this end, an interface of a control plane may be physically shared with other reference points, and reference points may be identified using each protocol or message set.

Figure 66:
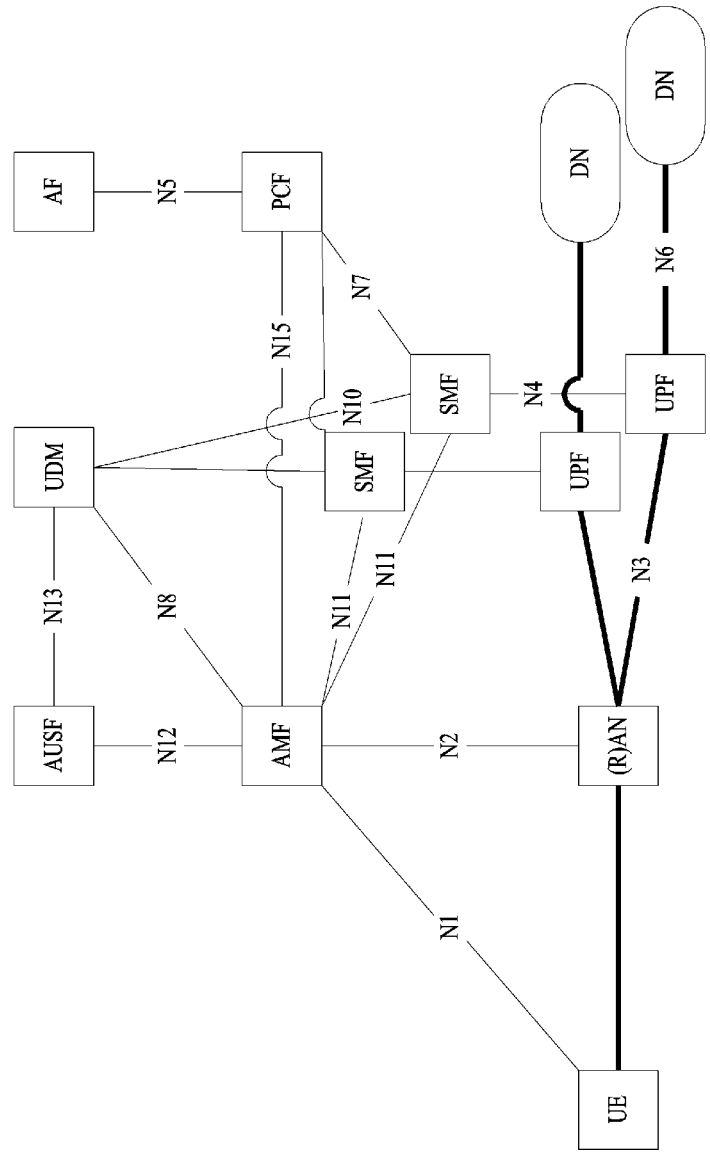
FIG. 66 illustrates a 5G system architecture for multiple PDU sessions according to embodiments.

FIG. 66 illustrates a 5G system architecture for multiple PDU sessions according to embodiments.

FIG. 66 illustrates a network architecture for supporting two DNs based on the 5G system architecture described above. In order to perform access to one DN, a UPF and an SMF may be separately configured for the DN, and these functions may also be connected through a control plane function and a reference point, respectively. Therefore, each DN provides a separate PDU session and the SMF may control the corresponding session.

Although FIG. 66 illustrates simultaneous access to two DNs. In some cases, access to two or more DNs may be performed according to a network configuration.

Figure 67:
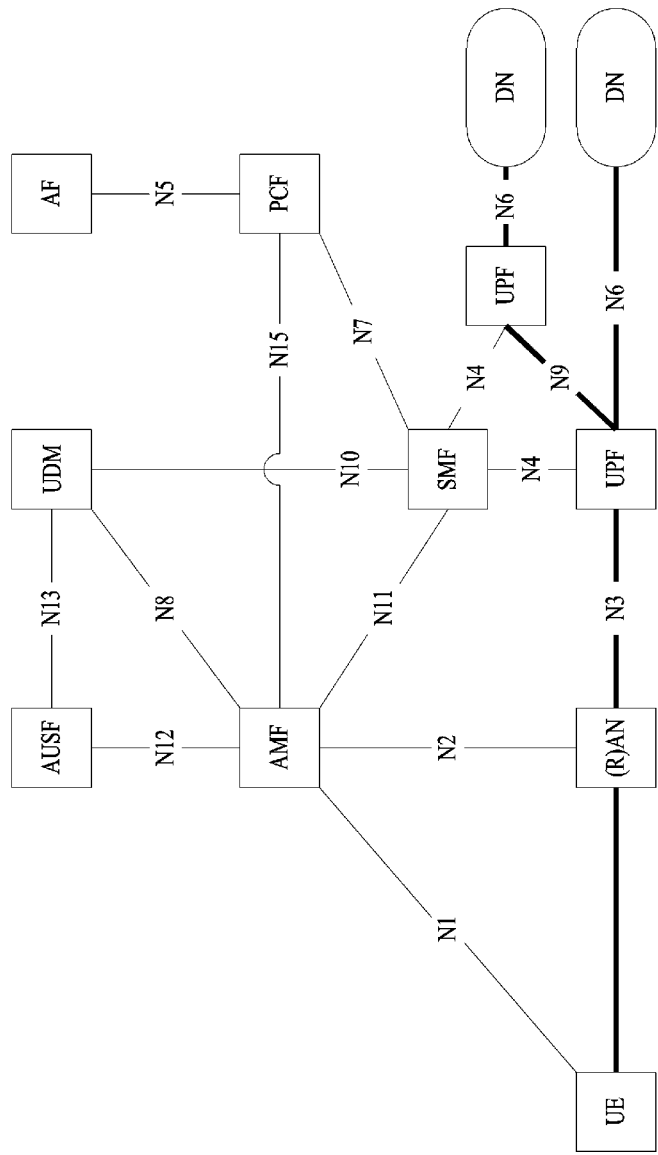
FIG. 67 illustrates a 5G system architecture for coexistence access to two data networks according to embodiments.

FIG. 67 illustrates a 5G system architecture for coexistence access to two DNs according to embodiments.

FIG. 67 may follow one PDU session option.

FIG. 67 is a network architecture configured such that a PDU session provided by each DN may operate as a single session using a single SMF when access to two DNs is performed.

Figure 68:
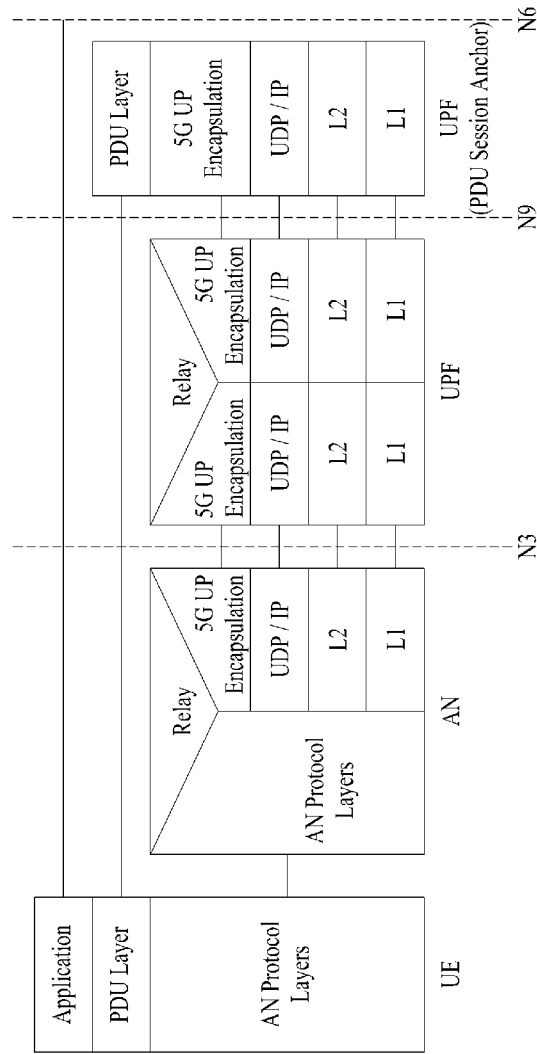
FIG. 68 illustrates a user plane protocol stack according to embodiments.

For this network architecture, a user plane protocol stack for one PDU session may be defined as illustrated in FIG. 68.

FIG. 68 illustrates a user plane protocol stack according to embodiments.

PDU layer: This layer corresponds to a PDU carried between a UE and a DN over a PDU session. When the PDU session type is IPv6, the PDU layer corresponds to an IPv6 packet. When the PDU session type is Ethernet, the PDU layer corresponds to an Ethernet frame.

5G encapsulation: This layer supports multiplexing traffic of different PDU sessions (possibly corresponding to different PDU session types) over N3 (i.e., between an AN and a 5GC) or over N9 (i.e., between different UPFs of the 5GC). This layer provides encapsulation on a per PDU session level. This layer also carries marking associated with a QoS flow.

AN protocol stack: This set of protocols/layers depends on an AN. When the AN is a 3GPP RAN, these protocols/layers are defined by a 3GPP RAN.

The number of UPFs on a data path is not constrained by 3GPP specifications. There may be a data path of a PDU session 0 or 1 or multiple UPFs that do not support a PDU session anchor functionality for this PDU session. For an IP type PDU session, a UPF acting as a PDU session anchor is an IP anchor point of an IP address/prefix allocated to the UE.

For the 5G architecture described above, functionalities of each function are as follows.

Access and mobility management function (AMF)

The AMF may include the following functionalities. A single AMF instance may support all or part of the following functionalities. Termination of a RAN CP interface (N2), termination of a NAS (N1), NAS ciphering and integrity protection, registration management, connection management, reachability management, mobility management, lawful intercept (for AMF events and interfaces to an LI system), provision of transport for SM messages between a UE and an SMF, transparent proxy for routing SM messages, access authentication, access authorization, provision of transport for SMS messages between a UE and an SMSF, a security anchor function (SEA), interaction with an AUSF and a UE, reception of an intermediate key established as a result of a UE authentication process. In the case of USIM based authentication, the AMF retrieves security material from the AUSF. The AMF may further include a function of security context management (SCM). The SCM receives a key from an SEA that the SCM uses to derive access-network specific keys.

The AMF may include the following functionalities to support a non-3GPP access network.

Support for an interface N2 with N3IWF. Over this interface, some information (e.g., 3GPP cell identification) and procedures (e.g., related to handover) defined over 3GPP access may not be applied, and non-3GPP access specific information that is not applied to 3GPP access may be applied.

Support for NAS signaling with a UE over N3IWF. Some procedures supported by NAS signaling over 3GPP access may be not applicable to untrusted non-3GPP (e.g., paging) access.

Support for authentication of UEs connected over N3IWF. Management of mobility, authentication, and separate security context state(s) of a UE connected via non-3GPP access or connected via 3GPP and non-3GPP access simultaneously. Support for a coordinated RM management context valid over 3GPP and non-3GPP access. Support for a dedicated CM management context for a UE for connectivity over non-3GPP access. A session management function (SMF).

The SMF may include the following functionalities. A single SMF instance may support all or some of the following functionalities.

Session management, for example, session establishment, modification, and release, including tunnel maintenance between a UPF and an AN node, UE IP address allocation and management (including optional authorization), selection and control of a UP function, configuration of traffic steering at a UPF to route traffic to a proper destination, termination of interfaces towards policy control functions, and control of part of policy enforcement and QoS. Lawful intercept (for SM events and interfaces to an LI system), termination of SM parts of NAS messages, downlink data notification, an initiator of AN specific SM information sent via an AMF over N2 to an AN, determination of an SSC mode of a session, roaming functionality, handling of local enforcement to apply QoS SLAs (VPLMN), charging data collection and charging interface (VPLMN), lawful intercept (in the VPLMN for SM events and interfaces to an LI System), and support for interaction with an external DN for transport of signaling for PDU session authorization/authentication by the external DN.

User Plane Function (UPF)

The UPF may include the following functionalities. A single UPF instance may support all or some of the following functionalities.

An anchor point for intra-/inter-RAT mobility (when applicable), an external PDU session point of interconnection to a data network, packet routing and forwarding, packet inspection and a user plane part of policy rule enforcement, lawful intercept (UP collection), traffic usage reporting, an uplink classifier to support routing traffic flows to a data network, a branching point to support a multi-homed PDU session, QoS handling for a user plane (e.g., packet filtering, gating, and UL/DL rate enforcement), uplink traffic verification (SDF to QoS flow mapping), transport level packet marking on uplink and downlink, and downlink packet buffering and downlink data notification triggering.

Policy Function (PCF)

The PCF may include the following functionalities.

The PCF supports a unified policy framework to govern network behavior. The PCF provides policy rules to control plane functions. The PCF implements a front end to access subscription information relevant for policy decisions in a user data repository (UDR).

Network Exposure Function (NEF)

The NEF may include the following functionalities.

The NEF provides a means to securely expose services and capabilities provided by 3GPP network functions for a third party, internal exposure/re-exposure, application functions, and/or edge computing as described in section 5.13.

The NEF receives information from other network functions (based on exposed capabilities of other network functions). The NEF may store the received information as structured data using a standardized interface to a data storage network function (interface to be defined by 3GPP). The stored information may be "re-exposed" by the NEF to other network functions and application functions and may be used for other purposes such as analytics.

NF Repository Function (NRF)

The NRF may include the following functionalities.

The NRF supports a service discovery function. The NRF receives an NF discovery request from an NF instance and provides information of discovered NF instances (be discovered) to the NF instance. The NRF maintains information about available NF instances and services supported thereby.

Figure 59:
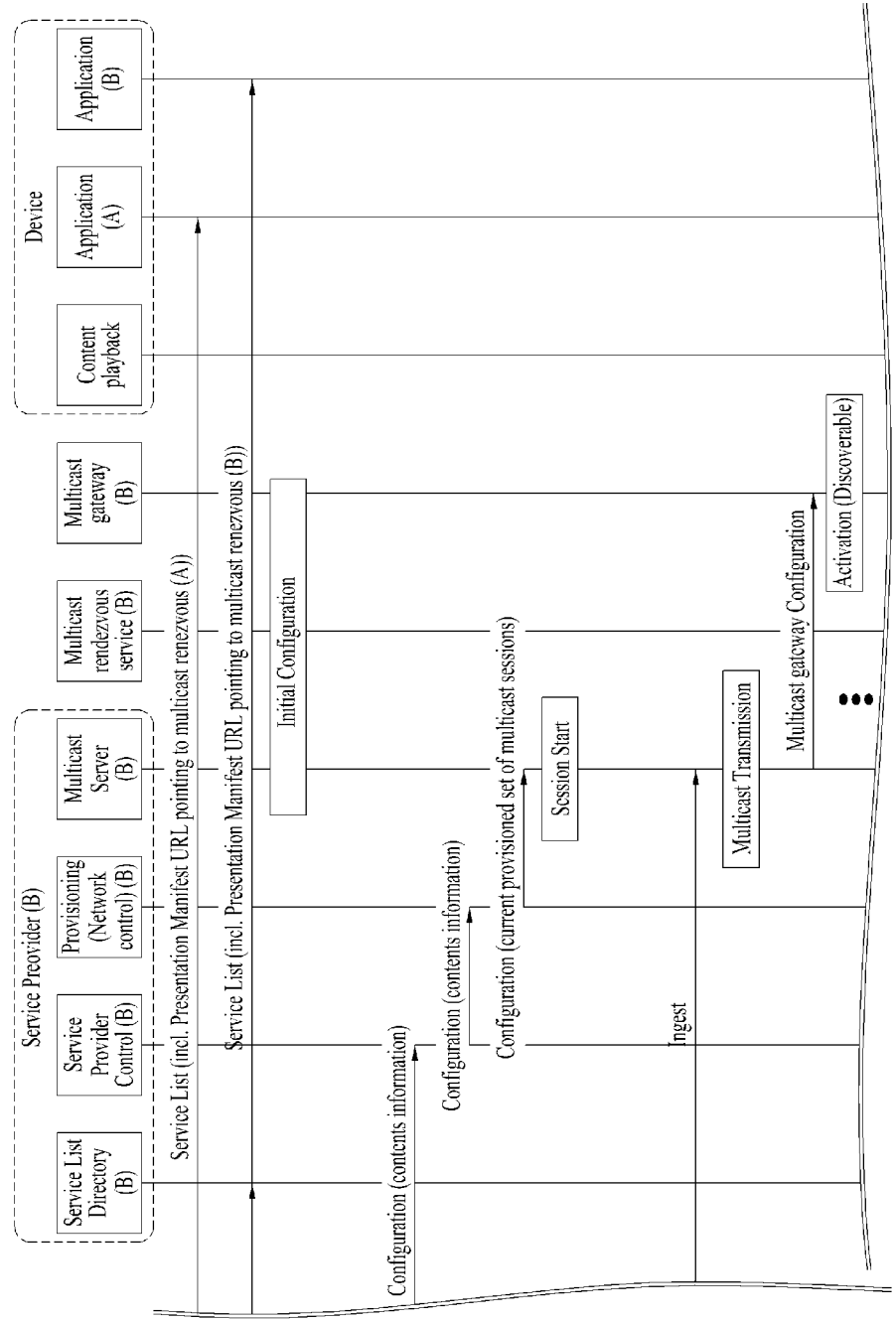
Figure 60:
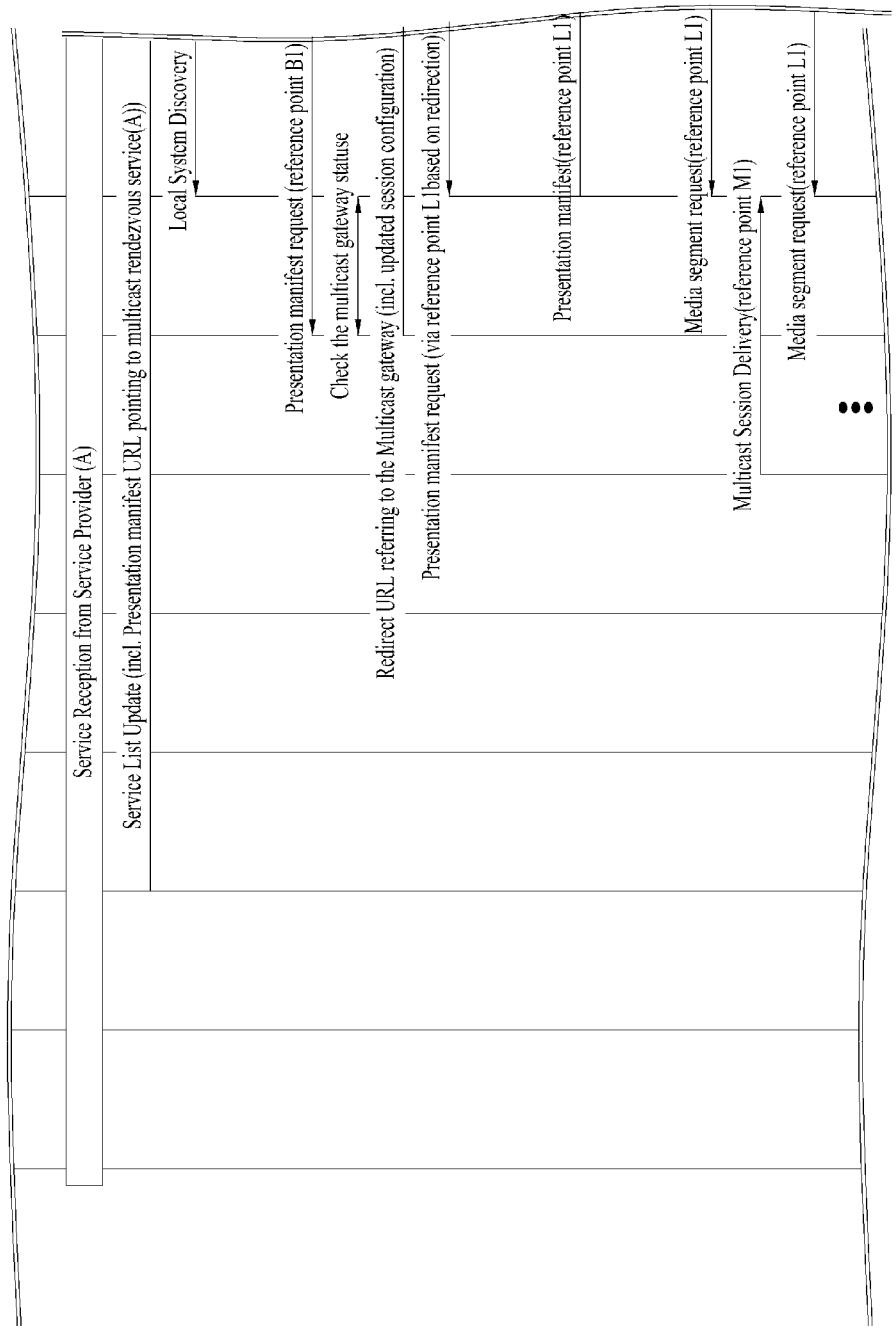
Figure 61:
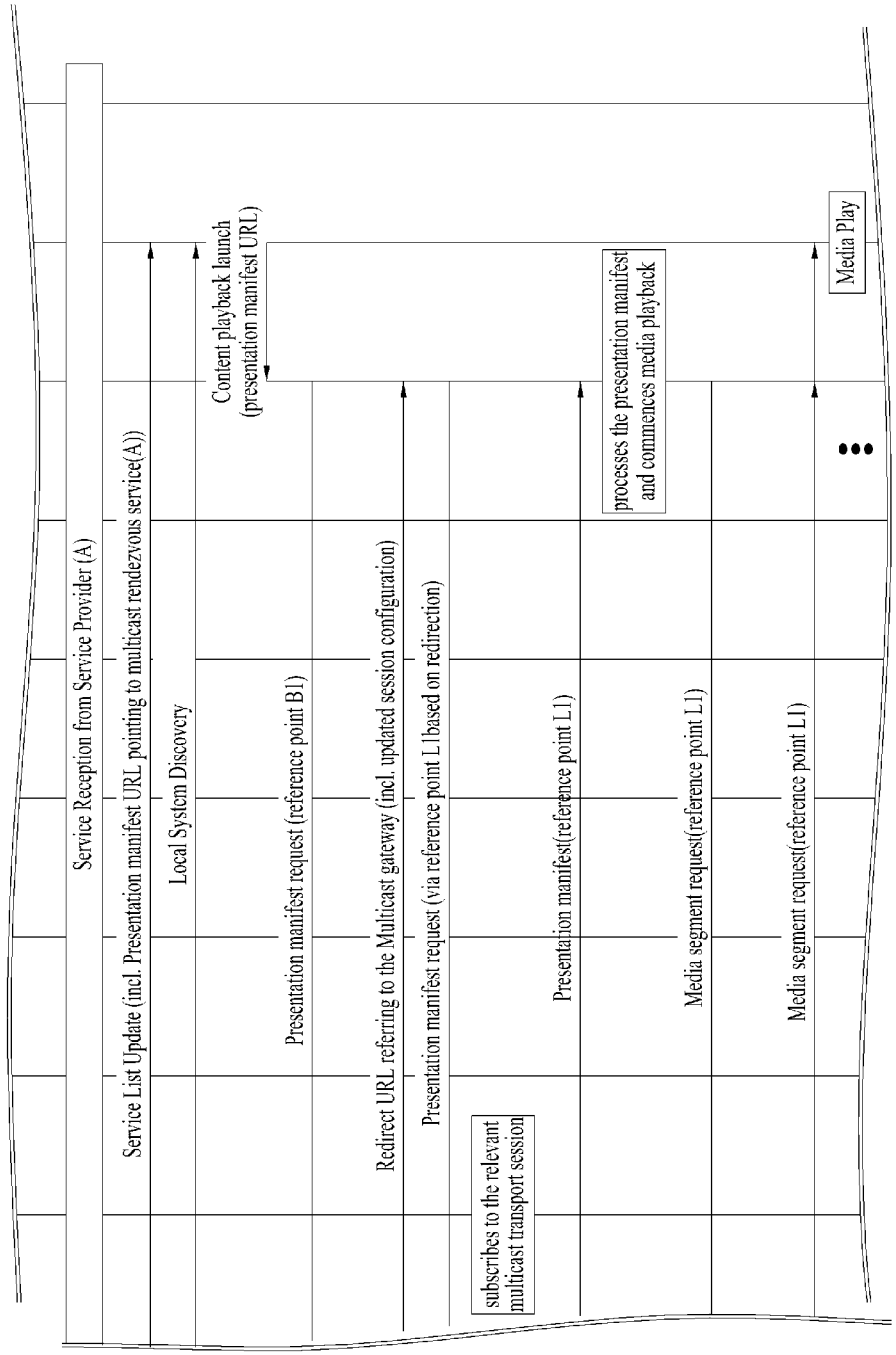
Figure 62:
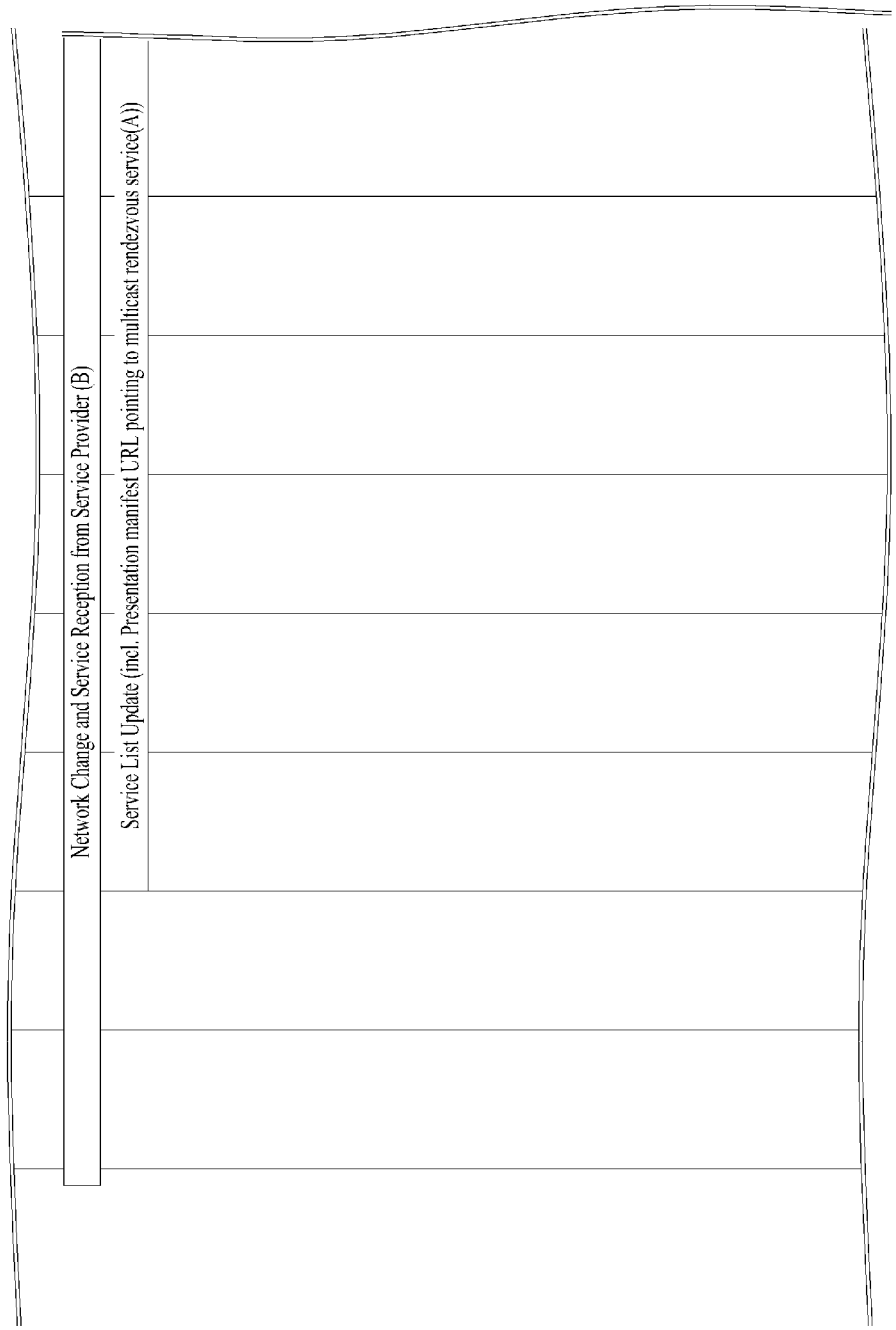
Figure 63:
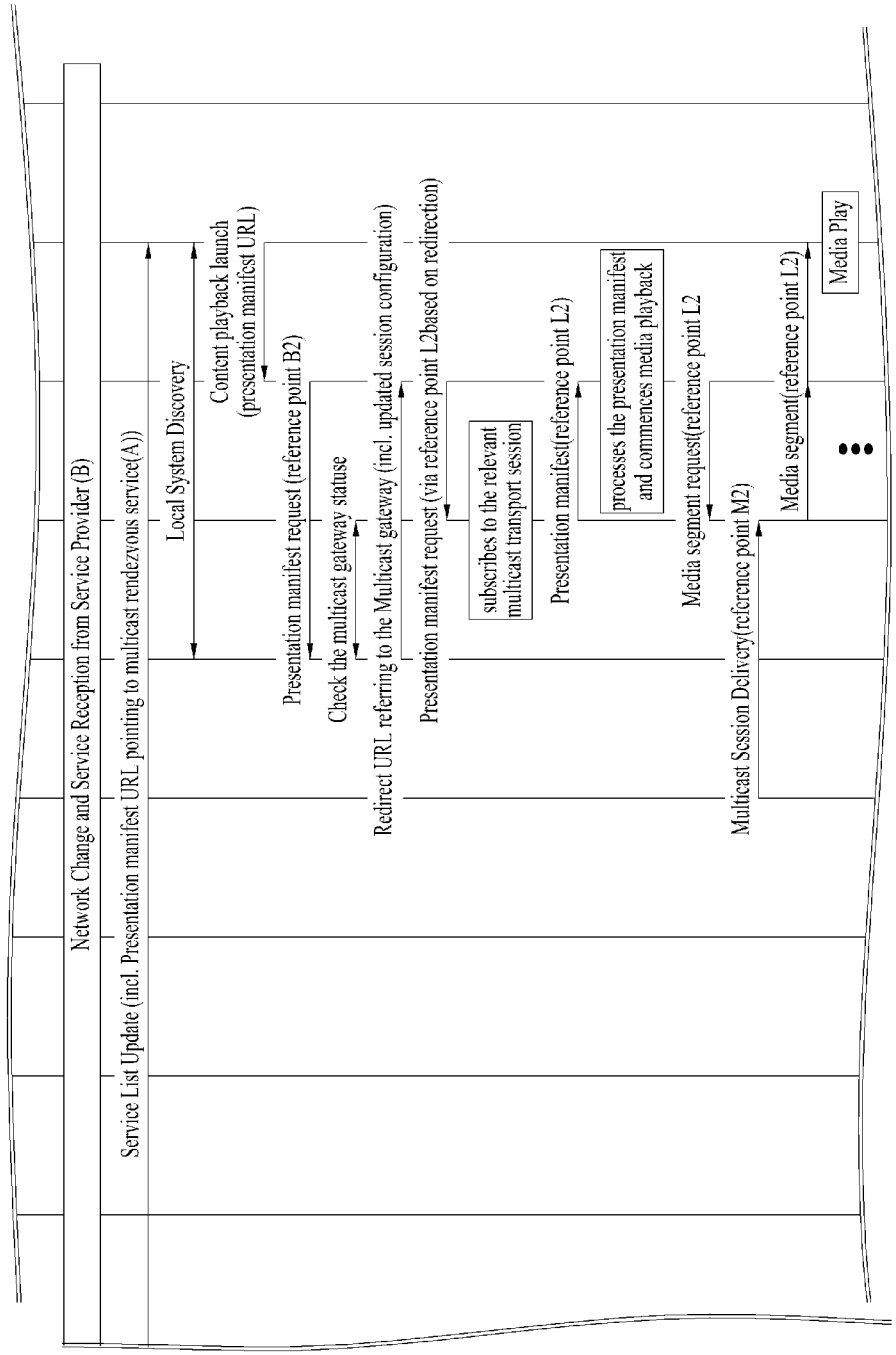
Figure 69:
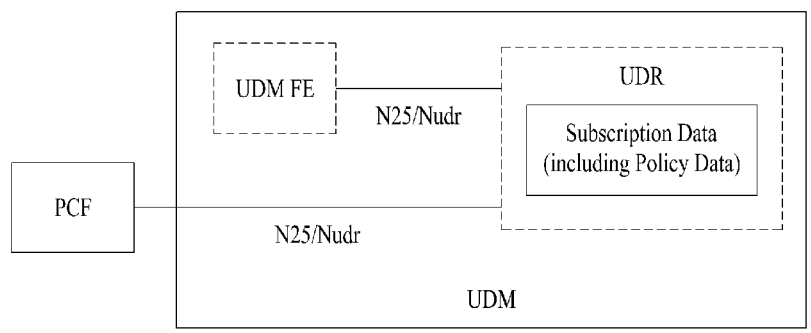
FIG. 69 illustrates unified data management (UDM) according to embodiments.

FIG. 59 (? FIG. 69) illustrates unified data management (UDM) according to embodiments.

The UDM may be divided into an application front end (FE) and a user data repository (UDR).

FIG. 59 (? FIG. 69) illustrates a reference architecture for the UDM, including FEs described below.

UDM FE: The UDM FE is in charge of processing of credentials, location management, subscription management, etc.

PCF: The PCF is in charge of policy control. The PCF is a standalone network function in the overall 5GC architecture and thus is not part of a UDM. However, the PCF may request and provide policy subscription information to a UDR, and for this reason, is shown in a UDM architecture.

The UDR stores data required for functionalities provided by the UDM FE and stores policy profiles required by the PCF. Data stored in the UDR includes:

user subscription data, including subscription identifiers, security credentials, access and mobility related subscription data, and session related subscription data; and policy data. The UDM FE accesses subscription information stored in the UDR and supports the following functionalities.

Authentication credential processing, user identification handling, access authorization, registration/mobility management, subscription management, and SMS management. An FE implements application logic and does not require an internal UDR. Several different FEs may serve the same user in different transactions.

An N25/Nudr reference point/interface are defined for FEs to read, update (including add and modify), delete, subscribe to notification of a data change, and indicate the data change from the UDR. N25 is the name of a P2P reference point, and Nudr is the name of a service-based interface. Both the FEs and the UDR are located in an HPLMN.

Authentication Server Function (AUSF)

The AUSF supports the following functionality. The AUSF supports an AUSF.

Application Function (AF)

The AF interacts with a 3GPP core network in order to provide services. For example, the AF supports the following functionalities. Application influence on traffic routing, accessing network capability exposure, interaction with a policy framework for policy control. Based on operator deployment, the AF considered to be trusted by the operator may be allowed to interact directly with relevant network functions. The AF not allowed by the operator to directly access the network functions should use an external exposure framework via an NEF to interact with relevant network functions.

Figure 70:
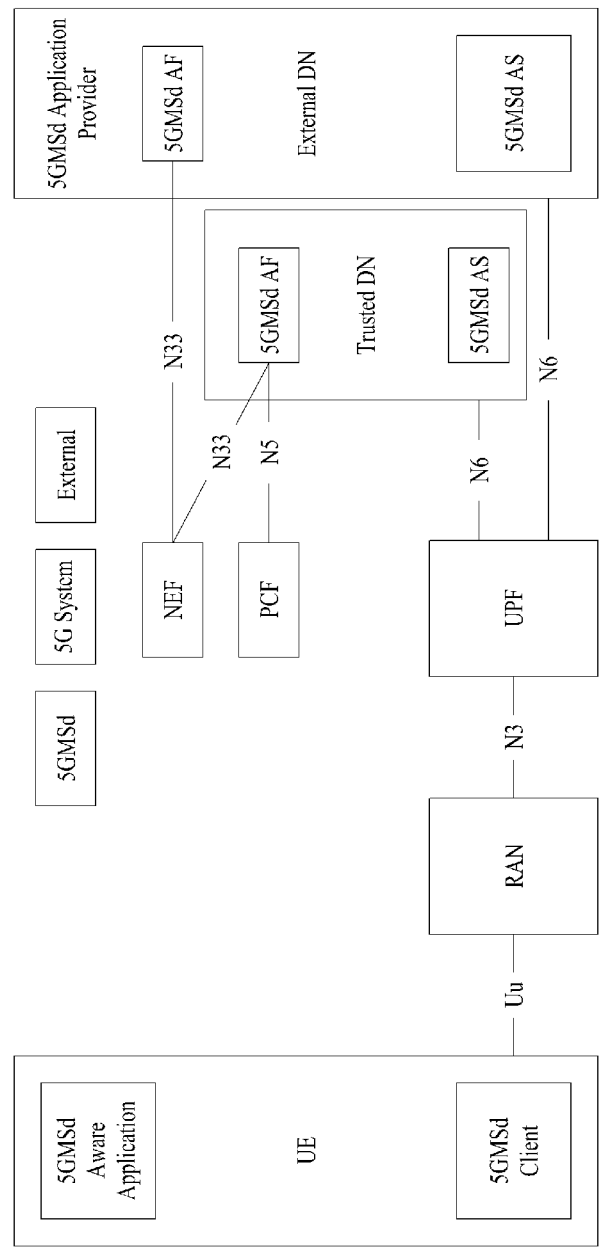
FIG. 70 illustrates an architecture for 5G media streaming according to embodiments.

FIG. 70 illustrates an architecture for 5G media streaming according to embodiments.

Downlink Media Streaming within 5G System

FIG. 70 illustrates an architecture in which a function for downlink media streaming is configured in a 5G network.

In the architecture of FIG. 70, for 5G media streaming, a 5GMSd aware application and a 5GMSd client may be configured for a UE, and a 5GMSd AF and a 5GMSd AS may be configured for a DN. If the DN is configured in a network operated by a mobile network operator, the DN may be considered to be a trusted DN. If the DN is configured outside the mobile network operator (e.g., a third party CDN), the DN may be considered to be an external DN. Other functions and interfaces are additionally described in Annex A.

Figure 71:
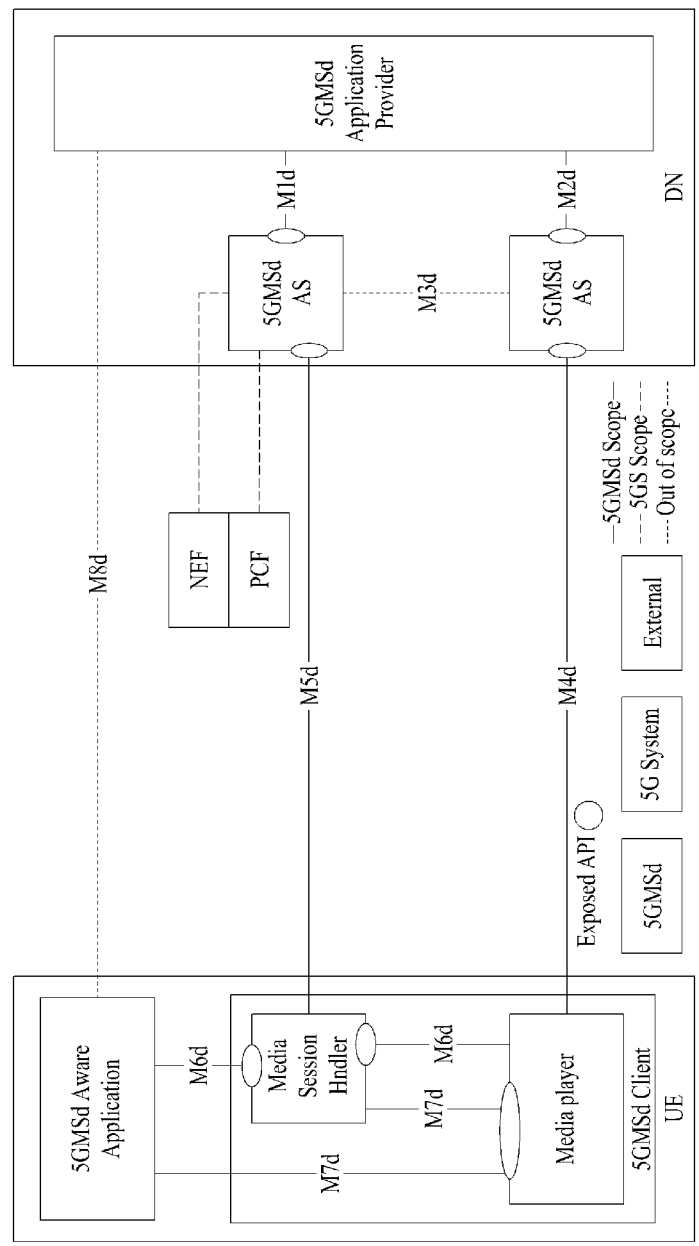
FIG. 71 illustrates a media architecture for unicast downlink media streaming according to embodiments.

FIG. 71 illustrates a media architecture for unicast downlink media streaming according to embodiments.

Regarding the aforementioned network architecture, the media architecture for unicast downlink media streaming may be defined as follows. Here, each function and interface define a logical interface in terms of media streaming.

Each function may be defined as follows.

5GMSd client (5G media streaming client for downlink) on UE: A receiver of 5GMS downlink media streaming service that may be accessed through well-defined interfaces/APIs. Alternatively, the UE may be implemented in a self-contained manner such that interfaces M6d and M7d are not exposed at all.

The 5GMSd client contains two subfunctions.

Media session handler: A function on the UE that communicates with a 5GMSd AF in order to establish, control, and support delivery of a media session. The media session handler may expose APIs that may be used by a 5GMSd aware application.

Media player: A function on the UE that communicates with a 5GMSd AS in order to stream media content and provides APIs to the 5GMSd aware application for media playback and to the media session handler for media session control.

5GMSd aware application: The 5GMSd client is typically controlled by an external media application and is an application which implements external application or content service provider specific logic and enables a media session to be established. The 5GMSd aware application is not defined within 5G media streaming specifications but the function makes use of a 5GMSd client and network functions using 5GMSd interfaces and APIs.

5GMSd AS: An application server which hosts 5G media functions. The 5GMSd AS may be differently implemented (e.g., a content delivery network (CDN)).

5GMSd application provider: External application or content-specific media functionality (e.g., media creation, encoding, and formatting that uses 5GMSd to stream media to the 5GMSd aware application).

5GMSd AF: An application function that provides various control functions to a media session handler on the UE and/or to the 5GMSd application provider. The 5GMSd Af may relay or initiate a request for different policy or charging function (PCF) treatment or interact with other network functions via an NEF.

Each interface for 5G downlink media streaming may be defined as follows.

M1d (5GMSd provisioning API): An external API, exposed by the 5GMSd AF to provision the usage of the 5G media streaming system and to obtain feedback.

M2d (5GMSd ingest API): an optional external API exposed by the 5GMSd AS used when the 5GMSd AS in a trusted DN is selected to host content for a streaming service.

M3d: (internal): An internal API used to exchange information about content hosting on the 5GMSd AS within the trusted DN.

M4d (media streaming API): An API exposed by the 5GMSd AS to a media player to stream media content.

M5d (media session handling API): An API exposed by the 5GMSd AF to the media session handler for media session handling, control and assistance that also includes appropriate security mechanisms, e.g., authorization and authentication.

M6d (UE media session handling API): An API exposed by the media session handler to the media player for client-internal communication and exposed to the 5GMSd aware application to make use of 5GMS functions.

M7d (UE media player API): An API exposed by the media player to the 5GMSd-aware application and the media session handler to make use of the media player.

M8d: (application API): An application interface used for information exchange between the 5GMSd aware application and the 5GMSd application provider (e.g., to provide service access information to the 5GMSd aware application). This API is external to the 5G system and is not specified by 5GMS.

Multicast Adaptive Bitrate System Architecture

The method/apparatus according to embodiments may be associated with the multicast adaptive bitrate system architecture as follows.

Figure 72:
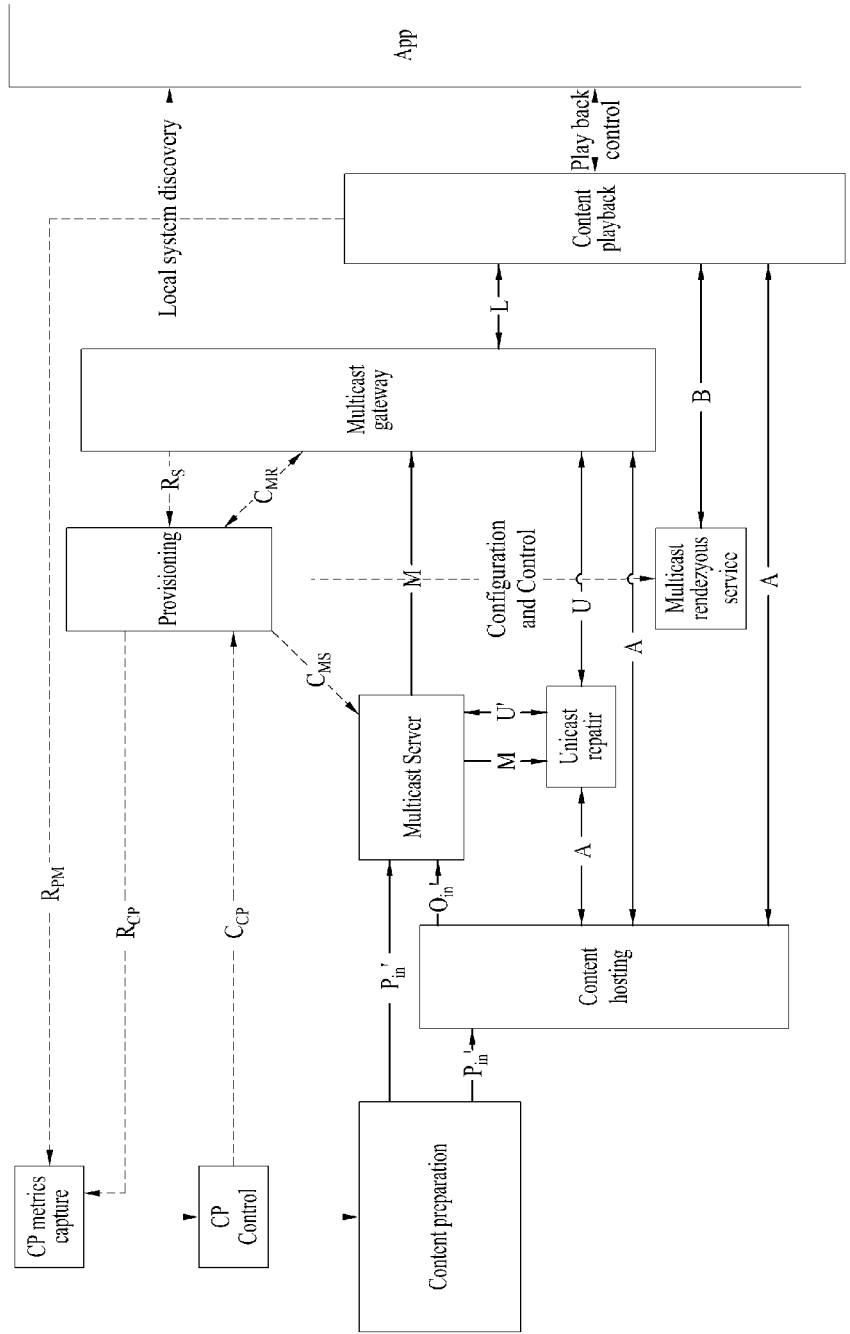
FIG. 72 illustrates a reference architecture according to embodiments.

FIG. 72 illustrates a reference architecture according to embodiments.

Reference Points:

In the reference architecture of FIG. 72, the relationship between logical functions may be defined as a reference point. When this architecture is actually used, the reference point may be implemented as a specific interface and may exchange information needed between relevant functions using each specific protocol.

Data Plane Reference Points

In the above architecture, reference points for transmitting content are as follows.

L: Unicast HTTP (including HTTPS) interaction between the content playback function and the multicast gateway. This interface may include the fetching of all specified types of content.

When the multicast gateway and the content playback function are co-located on a single end device, such as a set-top box (see clause 3.3), the interface L may be realized as a local API.

B: Bootstrap unicast HTTP(S) interaction directly between the content playback function and the multicast rendezvous service function. This interface may be used to request a presentation manifest at the start of a linear playback session.

A: HTTP(S) acquisition from the content hosting function of content not provided over a reference point M.

This interface may be used by the content playback function to retrieve content out of scope for the reference point L.

This interface may be used in some deployments by the unicast repair service function to retrieve content from the content hosting function for content repair.

Also, this interface may be used by the multicast gateway for retrieving content directly from the content hosting function via unicast when a reference point U is unable to perform content repair.

M: Multicast IP content transmission by the multicast server function and reception by the multicast gateway function and, in some deployments, reception by the unicast repair service function.

U: Unicast interaction between the unicast repair service function and a unicast repair client in the multicast gateway and a unicast repair service. This interface may be used to carry payloads used for content repair functions in addition to requests for such payloads.

U': Unicast interaction between the unicast repair service function and the multicast server as an alternative to fetching repair content over the reference point A. This interface may be used to carry payloads used for content repair functions in addition to requests for such payloads.

Pin: Publication of content to the content hosting function by a content packaging subfunction. This interface may be implemented as a push interface or content may be pulled on demand from a content packaging function.

Oin: Ingest of content by the multicast server from the content hosting function. This interface may be typically implemented as a pull interface.

Pin': Ingest of content by the multicast server directly from the content packaging function. This interface may be typically implemented as a push interface.

Control Plane Reference Points

Reference points for transmitting control signaling and operational reporting information in the architecture of FIG. 11 are as follows.

CMS: Control interface for configuration of the multicast server function.

CMR: Control interface for configuration of the multicast gateway function.

CCP: Control interface for configuration of the provisioning function.

RS: Service reporting by the multicast gateway function to a service reporting capture function.

RCP: Service reporting by a service reporting capture subfunction to a content provider metrics reporting capture function.

RPM: Reporting of playback metrics by a content playback function to the content provider metrics reporting capture function.

Figure 73:
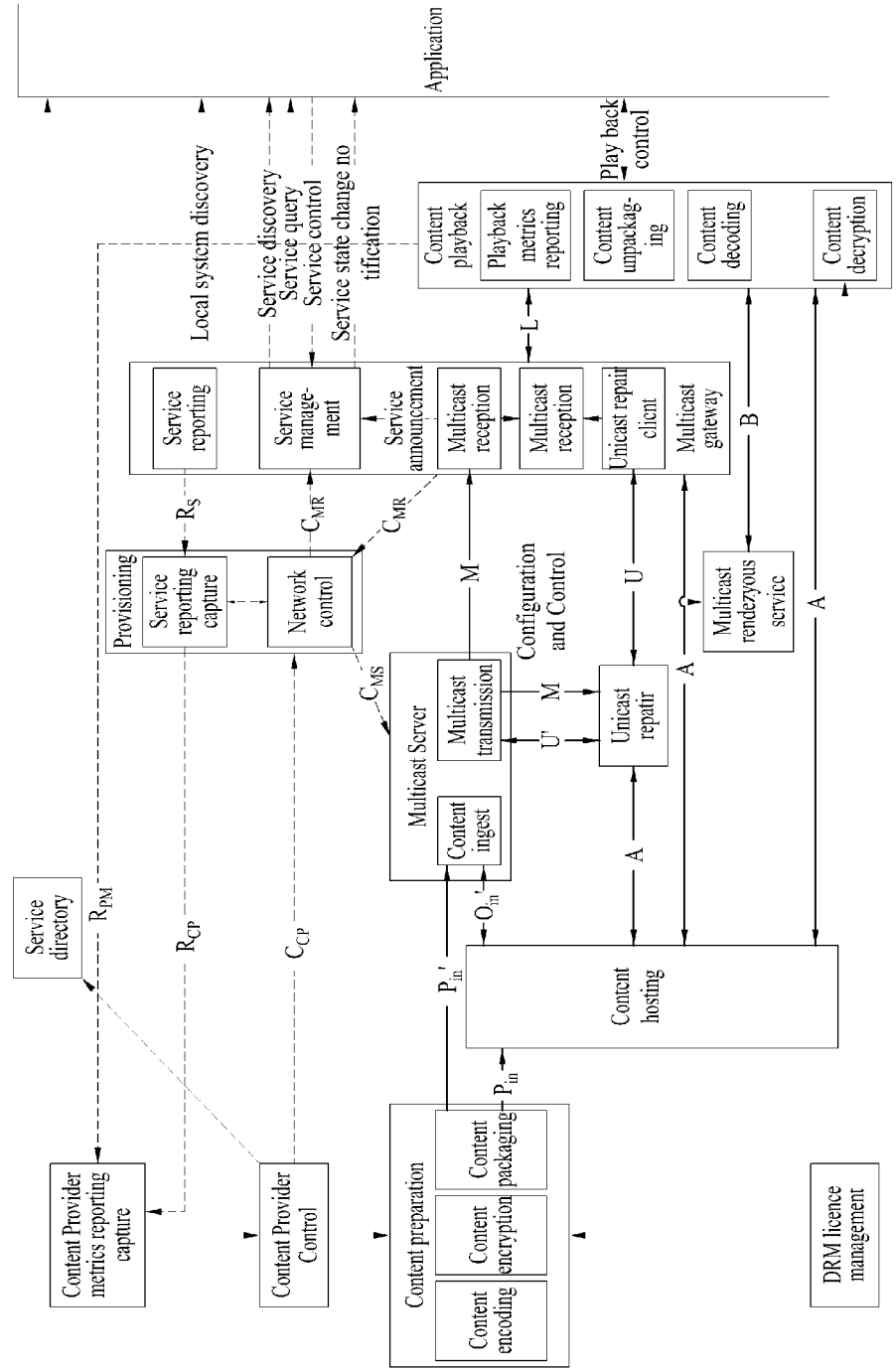
FIG. 73 illustrates a reference architecture according to embodiments.

FIG. 73 illustrates a reference architecture according to embodiments.

Reference Architecture Diagram

FIG. 73 illustrates details of the reference architecture.

Functionalities of the architecture are as follows.

Content Preparation

Content Encoding

A content encoding function (or a content encoder) converts a source media stream to encoded media to reduce bitrate. A single source media stream may be converted into a plurality of different encoded representations so as to meet delivery conditions. In order for a content playback function to operate adaptively according to delivery conditions, a virtual segment boundary marker may be included in an encoded representation.

Output of the encoder may be a cleartext stream formatted to be appropriate to be transmitted to an encryption function or a packaging function. For example, the output of the encoder may be an MPEG elementary stream, an MPEG-2 TS, or an intermediate format having a purpose similar thereto.

Content Encryption

The content encryption function receives the cleartext stream and encrypts the cleartext stream into a cyphertext stream. An encryption key may be obtained from a DRM license management function.

Content Packaging

The content packaging function collects one or more encoded representations and configures data according to a desired packaging format. In dynamic adaptive streaming, the output of a packager is a sequence of a packaged media segment including a representation switching point aligned across multiple representations of the same source media stream. A packaging format may be an ISO base media file format (MP4) and a fragmented MPEG-2 TS.

Content Hosting

A content hosting function may be ready to use prepared content for the following cases.

In the case of content ingest through an interface Oin, for unicast delivery to a multicast server In the case of cache miss through an interface A, for a unicast repair service through the interface A to a multicast gateway In the case of transmission through an interface B, for a content playback function that is not connected via a multicast receiver The content hosting function may be implemented by part of a simple web server or an origin cluster or operate by a distributed CDN. Therefore, the content hosting function may receive content from an appropriate content server using load balancing and request distribution techniques (DNS round-robin or HTTP 302 redirect).

Multicast Server

The multicast server collects content from a content source. That is, a media stream is input via the interface Oin, and in general, a protocol installed in a media player may be used. The payload of the media stream collected by the multicast server is encapsulated in a delivery unit of a multicast delivery protocol and transmitted through the network. In addition, the payload of the media stream is transmitted to a subscribed multicast gateway client using IP multicast via an interface M. The payload of the media stream may be configured by receiving configuration information from a network control function via an interface CMS.

Content Ingest

The multicast server may perform push and pull ingest methods.

HTTP(S) Pull Ingest via Interface Oin:

Similar to an adaptive streaming media player, the multicast server downloads a packaged media segment from the content hosting function based on details described in a presentation manifest. In this case, the interface Oin may have different detailed operation characteristics from an interface L but may be functionally the same as the interface L. The segment may be packaged in MPEG-DASH or HLS and the segment may be simultaneously downloaded from one or more representations described in the presentation manifest. A manifest format such as DVB-DASH, MPEG-DASH, or HLS may be supported.

HTTP(S) Push Ingest Via Interface Pin':

An HTTP(S) push interface such as Web distributed authoring and versioning (WebDAV) may be provided. The content packaging subfunction uploads a media segment to the content ingest function as soon as the media segment is created. The segment may be packaged in a format such as MPEG-DAH or HLS.

RTP Push Ingest Via Interface Pin'

An RTP-based push ingest mechanism is provided to the content packaging subfunction. The packager sends an MPEG-2 TS packet through an RTP. The boundary of a segment may be indicated using a virtual segment boundary marker.

Multicast Transmission

A stream received by the content ingest subfunction is transmitted over the payload of an IP multicast packet via an interface M.

Unicast Repair Service

The unicast repair service provides a payload repair function to a unicast repair client within the multicast gateway via a reference point U. The following repair modes may be considered.

The unicast repair service function receives multicast content transmitted through a reference point M and locally caches a copy of a packet stream in order to satisfy a repair request by the unicast repair client.

If the requested packet is not satisfied in the cache of the unicast repair service function, the packet repair request may be transferred to the multicast server via an interface U'.

The unicast repair service function may convert the packet repair request into an HTTP request for the content hosting function using the same interface as the reference point A.

When the same repair request is received from multiple multicast gateways, it may be efficient to transmit the repair packet through the reference point M.

Multicast Gateway

A main purpose of the multicast gateway is to deliver a packaged content segment to a content playback function. The multicast gateway may be implemented as local origin including a forward proxy or a reverse proxy. The multicast gateway may be implemented as user premises equipment such as a home gateway device or as an IP-connected set-top box (STB). The multicast gateway may also be deployed in an upstream network node instead of the user premises equipment.

A content request may be received from one or more instances of the content playback function via an interface L. For requested content, cached in an asset storage subfunction is directly provided or content obtained via the interface A is indirectly provided. In this case, content obtained via the interface A may optionally be cached in the asset storage subfunction.

Service Management

A service management subfunction may collect service configuration information for a multicast content stream receivable via the interface M and location information of a service reporting capture function. Such information may be received as follows.

Direct reception via an interface CMR from the network control function

Indirect reception from a multicast reception subfunction (when the information is transmitted via the interface M)

Reception through a unicast response delivered via the interface A from the content hosting function Multicast Reception A multicast reception subfunction receives a content stream requested by an end device via the interface M or configured for the end device. Content received normally without error may be cached in the asset storage so that corresponding content may be used later. Content damaged during transmission may be repaired using a specific technique (e.g., forward error correction, unicast repair by the unicast repair client via the interface U, or unicast retrieval via the interface A) before the multicast gateway caches content. Unrepaired content is not delivered via the interface L.

Unicast Repair Client

When loss of a multicast packet is detected, the multicast packet is repaired using forward error correction information received via the interface M or using the unicast repair service (e.g., unicast packet retransmission or multicast segment loss signaling) via the interface U. A packet not repaired in this way may use unicast transport via the interface A.

Asset Storage

The asset storage subfunction provides a function to temporarily store information to be provided via an interface L. The storage function is performed only by the multicast gateway.

Managed pre-positioned media content assets. For example, all or part of content or advertisement-related information, that is popular with multiple users, may be stored before actual use.

Temporary cache for a linear media content segment

Service Reporting

Service-related metrics (e.g., telemetry and analytics data) are reported to the service reporting capture subfunction via an interface RS by a service reporting subfunction.

Provisioning

The purpose of a provisioning function is as follows.

A deployed multicast gateway instance centrally collects service reporting information. A network configures resources. A multicast server is configured to use the configured network resources. A multicast gateway is configured to use the configured network resources.

The provisioning function may be linked with a content provider control function based on information transmitted via an interface CCP.

Service Reporting Capture

Service reporting information collected from the multicast gateway may be provided to the service reporting capture function via the interface RS. A report may include major indicators (e.g., cache hit-ratio or viewership) that indicates the performance of metrics and services. The metrics may vary depending on which channel has been requested, when a channel has been established, or how many segments have been cached. The service reporting information may be used to improve service performance or configure a multicast channel.

The service reporting capture function may send service reporting information to a content provider metrics reporting capture function via an interface RCP. Information such as multicast content and bitrate may be included in the corresponding reporting information.

Network Control

The network control function may perform functions such as control, configuration, and allocation of network resources. Here, the network resources may include resources for multicast transport via the interface M and unicast operation via the interfaces U and A.

In a centralized system, the network control function may distribute configuration information for a transmittable multicast stream to network resources. Additionally, the network control function may transmit this configuration information to the multicast server via the interface CMS or to the multicast gateway via the interface CMR. The configuration information for the transmittable multicast stream may be updated according to the control policy of the content provider or the number of requests by a client.

Content Provider Control

The content provider control function enables the network control function to provide information about available services through the multicast delivery path M via the interface CCP. A single content provider control function may interact with multiple network control functions operated by different network providers.

Content Playback

The content playback function is a function that manages the request, reception, decryption, and presentation of content. Only unicast transport is supported via the interface L. The playback operates regardless of a transmission path through which content is delivered.

The content playback function may be deployed separately from the multicast gateway in an end device such as a smartphone. Alternatively, the content playback function may be combined with the multicast gateway in an STB or a connected TV.

Additional functions of the content playback function are as follows.

Search for a presentation manifest for a linear service via an interface B

Search for all content not searched through the multicast gateway via the interface B Content Unpackaging A content unpackaging subfunction may extract elementary stream data from an obtained transport object and provide the elementary stream to a content decryption subfunction and a content decoding subfunction. For example, in the case of an ISO base media file format segment, the content unpackaging subfunction extracts an appropriate media data box, and in the case of an MPEG-2 TS, the content unpackaging subfunction filters a desired packet identifier (PID) and extracts the payload of a recombined PES packet.

Content Decryption

If a digital rights management (DRM) system is running, the content decryption subfunction obtains a decryption key from an appropriate DRM license management function and decrypts an encrypted elementary stream.

Content Decoding

The content decoding subfunction reads and interprets the contents of an elementary media stream to enable rendering for playback on a screen or through a loudspeaker.

Playback Metrics Reporting

A playback metrics reporting subfunction may report information related to the operation and quality of content playback to the content provider metrics reporting capture function through an interface RPM. Metrics may include an HTTP request/response, an initial playback delay, a buffer level, a presentation switching event, and network throughput. The reported playback metrics are directly related to the QoE of an end user and may be used to optimize the quality in the content provider or the network.

Multicast Rendezvous Service

A multicast rendezvous service manages data records on multiple multicast gateway instances (current status of the multicast gateway status, status of a multicast session, and related data). The network control function may provide such related information to the multicast rendezvous service.

The multicast rendezvous service handles an initial request for a presentation manifest received through a reference point B from the content playback function. The multicast rendezvous service determines whether there is an active multicast session for a linear service corresponding to the requested presentation manifest. In addition, the multicast rendezvous service determines whether there is a proper active multicast gateway to be used by the content playback function for the corresponding request.

If the second condition is satisfied, the multicast rendezvous service may redirect the request to the multicast gateway. Otherwise, the multicast rendezvous service redirects the request to the content hosting function, and in this case, a corresponding session operates through unicast.

DRM License Management

The DRM license management function provides an appropriate encryption key used by the content encryption function to protect core content and supplies licenses to the content decryption subfunction so that the content playback function may decrypt protected content.

Application

An application controls the content playback function. For example, the application may be a built-in control application (EPG application) of a TV or an STB or may be a third-party application provided by a content provider. An interface that the application uses to control the content playback function generally involves delivery of a reference point of a presentation manifest (e.g., URL of MPEG-DASH MPD) for initiating playback of an individual linear service. The application may interact with the service management subfunction of the multicast gateway in order to discover existing linear services and to control reception by the multicast gateway. The application may discover the existence of the linear services through individual interaction with an application-specific service directory function.

Service Directory

The application may use a private service directory to find an available linear service. The service directory function may be configured by the content provider control function.

Figure 74:
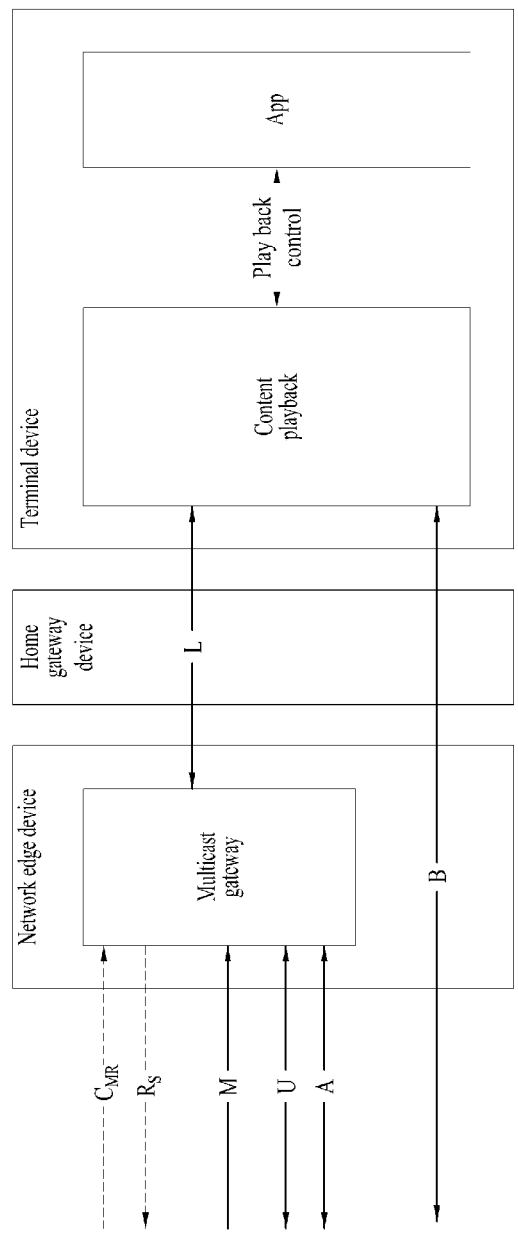
FIG. 74 illustrates a deployment model of a multicast gateway according to embodiments.

FIG. 74 illustrates a deployment model of a multicast gateway according to embodiments.

In the above-described multicast ABR architecture, the multicast gateway function may be deployed in various nodes in the network. FIG. 74 illustrates a multicast gateway deployed in a network edge device.

If the multicast gateway is implemented in the network edge device, a terminal device does not support IP multicast reception from a home network. The terminal device includes a content playback function, and an application that controls linear playback is installed in the terminal device.

The multicast gateway provides a multicast-to-unicast conversion function to multiple home gateway devices. Therefore, traffic in an access network between the network edge device and the home gateway devices becomes unicast.

Figure 75:
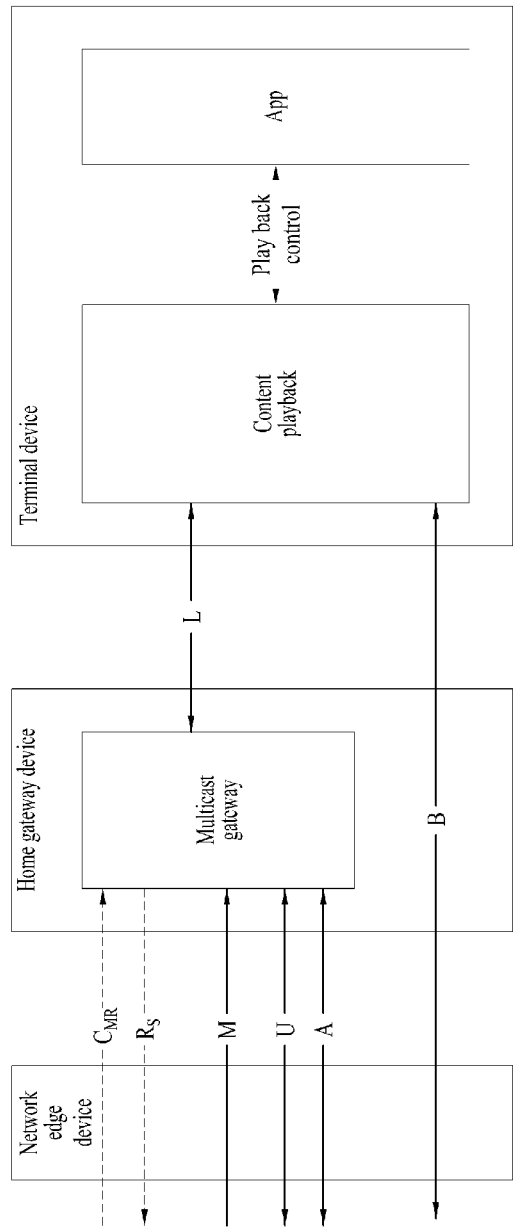
FIG. 75 illustrates a multicast gateway architecture deployed in a home gateway device according to embodiments.

FIG. 75 illustrates a multicast gateway architecture deployed in a home gateway device according to embodiments.

The multicast gateway is deployed in the home gateway device such as a router that is mainly supplied by an Internet service provider (ISP). In addition, the multicast gateway provides a multicast-to-unicast conversion function to a plurality of terminal devices in the same home network. Each of these terminal devices has an instance of a content playback function, and an application related thereto is installed in the terminal device.

Figure 76:
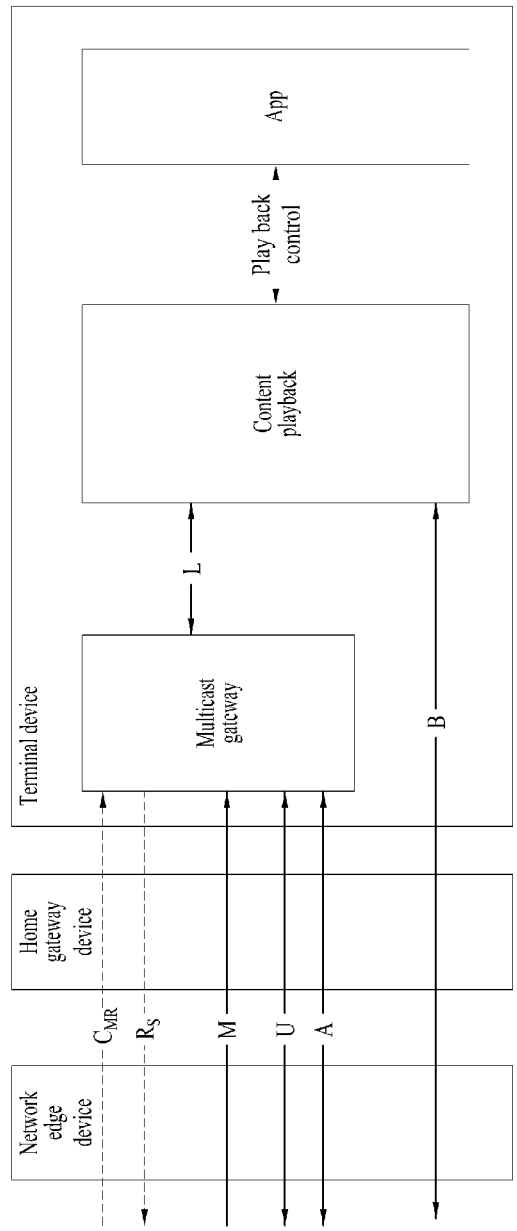
FIG. 76 illustrates a multicast gateway architecture deployed in a terminal device according to embodiments.

FIG. 76 illustrates a multicast gateway architecture deployed in a terminal device according to embodiments.

If the multicast gateway is deployed in the terminal device, the terminal device supports IP multicast reception in a home network. Each terminal device includes both a multicast gateway and a content playback function, and an application for controlling linear playback is installed in the terminal device. For this implementation model, the multicast gateway function should provide a content service only to a corresponding host terminal device.

A home gateway device may perform only an operation related to multicast group subscription. This operation may lead to unpredictable quality change when a home network does not support full multicast delivery.

Figure 77:
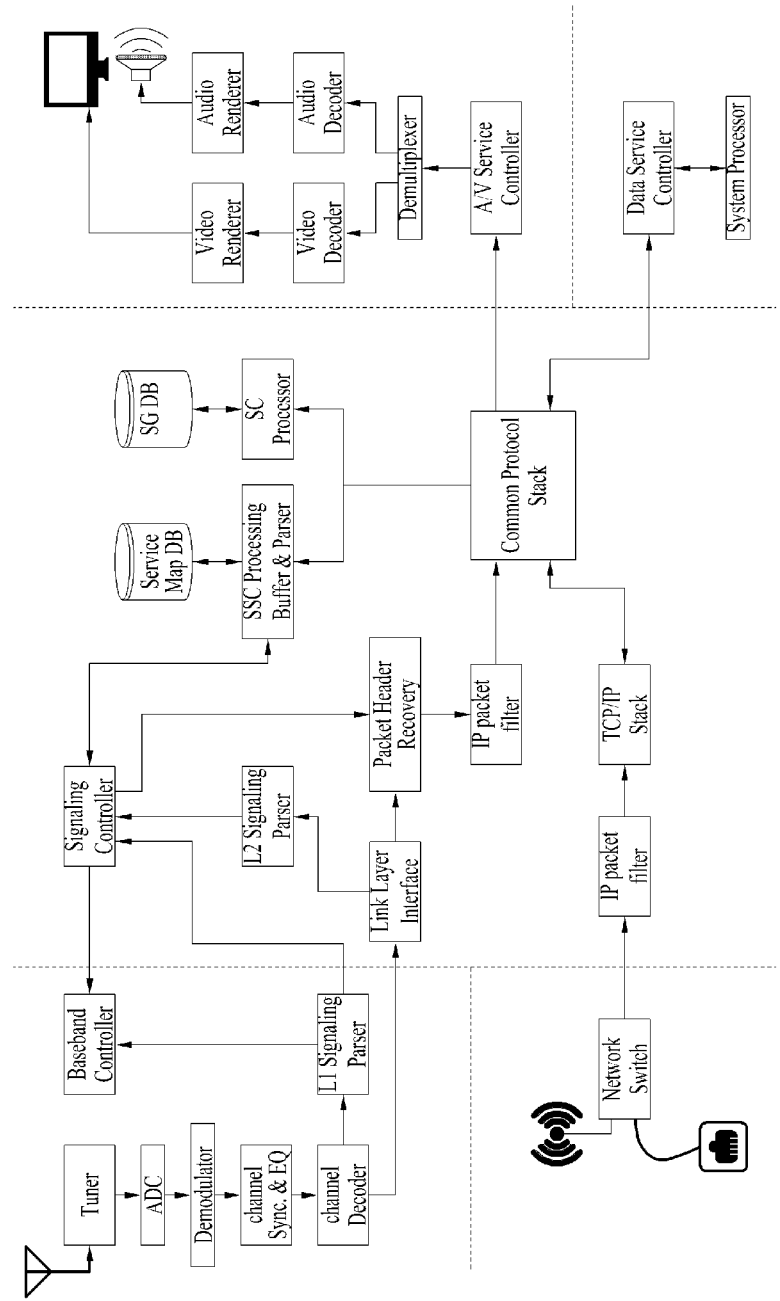
FIG. 77 illustrates a hybrid broadcast reception device according to embodiments.

FIG. 77 illustrates a hybrid broadcast reception device according to embodiments.

The reception device according to embodiments may be expressed as illustrated in FIG. 77. Each component of the reception device according to embodiments may correspond to hardware, software, a processor, and/or a combination thereof.

The definition of each abbreviation is as follows: 5GC: 5G Core Network, 5GMS: 5G Media Streaming, 5GMSd:

5G Media Streaming downlink, 5GMSu: 5G Media Streaming uplink, 5GS: 5G Systems, AF: Application Function, ABR: Adaptive Bit Rate, AMF: Access and Mobility Function, API: Application Programming Interface, App: Application, AS: Application Server, CAPIF: Common API Framework, CDN: Content Delivery Network, DASH: Dynamic and Adaptive Streaming over HTTP, DN: Data Network, DNAI: Data Network Application Identifier, DNN: Data Network Name, DRM: Digital Rights Management, EPC: Evolved Packet Core, EPS: Evolved Packet System, EUTRAN: Evolved Universal Terrestrial Radio Access Network, FLUS: Framework for Live Uplink Streaming, FQDN: Fully-Qualified Domain Name, GPU: Graphics Processing Unit, GSM: Global System for Mobile communication, HPLMN: Home Public Land Mobile Network, HTTP: HyperText Transfer Protocol, HTTPS: HyperText Transfer Protocol Secure, LTE: Long-Term Evolution, MBMS: Multimedia Broadcast Multicast System, MNO: Mobile Network Operator, MPD: Media Presentation Description, MSISDN: Mobile Station International Subscriber Directory Number, NA: Network Assistance, NEF: Network Exposure Function, NR: New Radio, NSMF: Network Slice Management Function, NSSAI: Network Slice Selection Assistance Information, NSSP: Network Slice Selection Policy, OAM: Operations, Administration and Maintenance, OTT: Over-The-Top, PCC: Policy and Charging Control, PCF: Policy and Charging Function, PDU: Packet Data Unit, PSS: Packet-switched Streaming Service, RAN: Radio Access Network, SBA: Service based Architecture, SLA: Service Level Agreement, TCP: Transmission Control Protocol, URL: Unique Resource Identifier, URSP: UE Route Selection Policy, AAC: Advanced Audio Coding, ABR: Adaptive Bit Rate, API: Application Programmer's Interface, BMFF: Base Media File Format, CDN: Content Delivery (Distribution) Networ, CMAF: Common Media Application Format, CP: Content Provider, DASH: Dynamic Adaptive Streaming over HTTP, DNS: Domain Name System, DRM: Digital Rights Management, EPG: Electronic Program Guide, IGMP: Internet Group Management Protocol. IP: Internet Protocol, ISO: International Organization for Standardization, HLS: HTTP Live Streaming, HTTP: HyperText Transfer Protocol, HTTPS: Secure HyperText Transfer Protocol, MBMS: Multimedia Broadcast Multicast Services (pertaining to 3GPP), MPD Media Presentation Description (pertaining to MPEG-DASH), MPEG: Moving Pictures Experts Group, OTT: Over The Top, PID: Packet Identifier (pertaining to MPEG-2 Transport Stream), RTCP: RTP Control Protocol, RTP: Real-time Transport Protocol, STB: Set-Top Box, TCP: Transmission Control Protocol, UDP: User Datagram Protocol, URL: Uniform Resource Locator (pertaining to HTTP).

Figure 78:
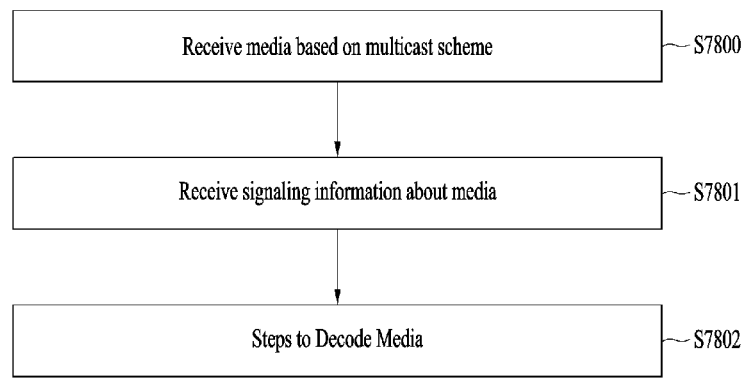
FIG. 78 illustrates a multicast signal processing method according to embodiments.

FIG. 78 illustrates a multicast signal processing method according to embodiments.

A multicast signal processing apparatus (a content playback function, an application function, a terminal device, etc.) according to embodiments may receive a multicast signal and decode multicast media data as follows.

S7800: A multicast signal processing method according to embodiments may include receiving media based on a multicast scheme.

The operation of receiving the media according to embodiments may include the operations of FIGS. 1 to 6, 9 to 16, 40 to 43, 44 to 49, 54 to 57, and 64 to 67.

S7801: The multicast signal processing method according to embodiments may further include receiving signaling information about the media.

The operation of receiving the signaling information according to embodiments may include the operations of FIGS. 6 to 8, 17 to 19, 50 to 53, and 58 to 63.

S7802: The multicast signal processing method according to embodiments may further include decoding the media.

The operation of decoding the media according to embodiments may include operations of FIGS. 1 to 6, 9 to 16, 40 to 43, 44 to 49, 54 to 57, and 64 to 67.

Figure 79:
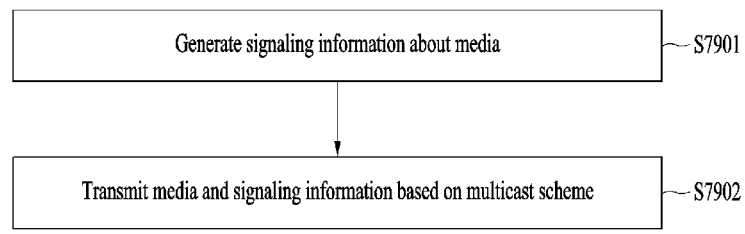
FIG. 79 illustrates a multicast signal processing method according to embodiments.

FIG. 79 illustrates a multicast signal processing method according to embodiments.

A multicast signal processing apparatus (a content provider, a multicast server, a multicast gateway, a network controller, a multicast rendezvous service controller, etc.) according to embodiments may generate and transmit a multicast signal as follows.

S7900 (? S7901): The multicast signal processing method according to embodiments may include generating signaling information about media.

The operation of generating the signaling information according to embodiments may include the operations of FIGS. 5 to 7, 6 to 8, 14 to 36, 17 to 19, 45 to 48, 50 to 53, 51 to 53, and 58 to 63.

S7901 (? S7902): The multicast signal processing method according to embodiments may further include transmitting the media and the signaling information based on a multicast scheme.

The operation of transmitting the media and the signaling information according to embodiments may include the operations of FIGS. 1 to 6, 9 to 16, 40 to 43, 44 to 49, 54 to 57, and 64 to 67.

Referring to FIG. 1, a multicast signal processing apparatus according to embodiments may include a memory; and a processor connected to the memory; The processor may receive multicast media data based on at least one of a first network or a second network and decode the multicast media data.

Referring to FIG. 10, embodiments may provide multicast over multiple networks. The first network and the second network may be different from each other, and at least one of the first network or the second network may include a communication network, a broadcast network, a bidirectional network, or a unidirectional network.

Referring to FIGS. 17 to 19, embodiments include a network change, rendezvous, redirection, and media reception flowchart. The multicast media data may be received through the first network and, based on a change of a network from the first network to the second network, the processor may receive service list information through the second network, acquire multicast rendezvous service information based on the service list information, receive presentation manifest information based on the rendezvous service information, receive redirection information based on the presentation manifest information, and receive the presentation manifest information based on the redirection information to receive the multicast media data.

Referring to FIGS. 17 to 19, embodiments include a flowchart of a plurality of networks. Referring to FIG. 45, embodiments include a service list. The processor may receive service list information based on at least one of the first network or the second network. The service list information for the first network may include address information about manifest information for the multicast media data. The service list information for the second network may include the address information about the manifest information for the multicast media data. The service list information for the first network and the service list information for the second network may include an identifier for the multicast media data and address information for a multicast rendezvous.

Referring to FIG. 49, embodiments include a service list and presentation manifest (e.g., MPD) for a plurality of networks. The processor may manage presentation manifest information for each of the first network and the second network for the multicast media data.

Referring to FIG. 50, embodiments include a service list. The processor may receive service list information for the multicast media data. The service list information may include presentation manifest request information. The presentation manifest request information may include network type information for a multicast rendezvous service, host address information for the multicast rendezvous service, and type information of the multicast rendezvous service.

Referring to FIG. 51, embodiments support a multicast session. The processor may receive multicast session information for the multicast media data. The multicast session information may include identification information about a network over which a multicast session is transmitted.

A multicast signal processing method according to embodiments may include receiving multicast media data based on at least one of a first network or a second network by a processor; and decoding the multicast media data.

The multicast signal reception method may include a reverse process of transmitting a multicast signal.

The multicast signal processing apparatus according to embodiments may perform the signal processing method.

The multicast signal processing method according to embodiments may include generating multicast media data; generating signaling information for the multicast media data; transmitting the multicast media data using a multicast scheme based on at least one of a first network or a second network; and transmitting signaling information for the multicast media data.

The multicast signal processing apparatus according to embodiments may include a memory; and a processor connected to the memory. The processor may generate multicast media data, generate signaling information for the multicast media data, transmit the multicast media data using a multicast scheme based on at least one of a first network or a second network, and transmit signaling information about the multicast media data.

The above-described apparatus according to embodiments has an effect of efficiently utilizing various networks in broadcasting and multicast transmission based on the operation/configuration and/or signaling information according to embodiments.

Furthermore, the method/apparatus according to the above-described embodiments may reduce network load, reduce implementation cost, and efficiently provide a multicast ABR service in various streaming sessions, in association with various networks and/or devices. In order to provide this effect, the architectures and flows according to embodiments are required.

While embodiments have been described in terms of the method and/or the apparatus, the description of the method and the description of the apparatus may be complementally applied to each other.

Although embodiments have been explained with reference to each of the accompanying drawings for convenience of description, it is possible to design new embodiments by merging the embodiments illustrated in the accompanying drawings. As needed by those skilled in the art, if a computer-readable recording medium in which programs for executing the embodiments mentioned in the foregoing description are recorded is designed, this may also be within the scope of embodiments. The apparatus and method according to embodiments are not limited by the configurations and methods of the embodiments described above. The embodiments described above may be configured by being selectively combined with one another entirely or in part to enable various modifications. Although the exemplary embodiments have been disclosed for illustrative purposes, those skilled in the art will appreciate that various modifications are possible, without departing from the gist of embodiments as claimed in the accompanying claims. Such modifications should not be understood individually from the technical spirit or prospect of the embodiments.

Various elements of the apparatus of embodiments may be implemented by hardware, software, firmware, or a combination thereof. Various elements of embodiments may be implemented by a single chip, for example, a single hardware circuit. According to embodiments, elements according to embodiments may be implemented as separate chips, respectively. According to embodiments, at least one or more of elements of the apparatus according to embodiments may include one or more processors capable of executing one or more programs. The one or more programs may perform any one or more of the operations/methods according to embodiments or include instructions for performing the same. Executable instructions for performing the methods/operations of the apparatus according to embodiments may be stored in a non-transitory CRM or other computer program products configured to be executed by one or more processors or may be stored in a transitory CRM or other computer program products configured to be executed by one or more processors. In addition, a memory according to embodiments may be used as a concept covering not only volatile memories (e.g., RAM) but also non-volatile memories, flash memories, and PROMs. In addition, the memory may also be implemented in the form of a carrier wave, such as transmission over the Internet. A processor-readable recording medium may be distributed to computer systems connected over a network such that processor-readable code may be stored and executed in a distributed fashion.

In this document, the terms "/" and "," are interpreted as indicating "and/or." For instance, the expression "A/B" may mean "A and/or B.", and "A, B" may mean "A and/or B." Further, "A/B/C" may mean "at least one of A, B, and/or C." "A, B, C" may also mean "at least one of A, B, and/or C." Further, in the document, the term "or" is interpreted as "and/or." For instance, the expression "A or B" may mean 1) only A, 2) only B, or 3) both A and B. In other words, the term "or" in this document may mean "additionally or alternatively."

Terms such as first and second may be used to describe various elements of embodiments. However, various elements according to embodiments should not be limited by the above terms. These terms are only used to distinguish one element from another. For example, a first user input signal may be referred to as a second user input signal. Similarly, a second user input signal may be referred to as a first user input signal. Use of these terms should be construed as not departing from the scope of various embodiments. The first user input signal and the second user input signal are both user input signals but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms include plural referents unless the context clearly dictates otherwise. The expression "and/or" is used to include all possible combinations of terms. The terms such as "includes" or "has" are intended to indicate existence of features, numbers, steps, elements, and/or components and should be understood as not precluding possibility of existence of additional existence of features, numbers, steps, elements, and/or components. Conditional expressions, such as "if" and "when", used to explain embodiments are not limited to an optional case and are intended to be interpreted, when a specific condition is satisfied, to perform a related operation or interpret related definition according to the specific condition.

Operations according to embodiments described in this document may be performed by a transmission/reception device including a memory and/or a processor according to embodiments. The memory may store programs for processing/controlling operations according to embodiments, and the processor may control various operations described in this document. The processor may be referred to as a controller or the like. In embodiments, operations may be performed by firmware, software, and/or a combination thereof. The firmware, software, and/or combination thereof may be stored in the processor or the memory.

The operations according to the above-described embodiments may be performed by the transmission device and/or the reception device according to embodiments. The transmission/reception device may include a transmitter/receiver configured to transmit and receive media data, a memory configured to store instructions (program code, algorithms, flowcharts, and/or data) for processes according to embodiments, and a processor configured to control the operations of the transmission/reception device.

The processor may be referred to as a controller or the like and may correspond to, for example, hardware, software, and/or a combination thereof. The operations according to the above-described embodiments may be performed by the processor. In addition, the processor may be implemented as an encoder/decoder for the operations of the above-described embodiments.

Mode for carrying out the disclosure has been described in the best mode for carrying out the disclosure.

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

The invention claimed is:
1. A multicast signal processing apparatus, comprising:
a memory; and
a processor connected to the memory, wherein the processor is configured to receive multicast media data based on at least one of a first network or a second network and decode the multicast media data,
wherein the multicast media data is received through the first network, and
based on a change of a network from the first network to the second network, the processor is configured to
receive service list information through the second network,
acquire multicast rendezvous service information based on the service list information,
receive presentation manifest information based on the rendezvous service information,
receive redirection information based on the presentation manifest information, and
receive the presentation manifest information based on the redirection information to receive the multicast media data.

2. The multicast signal processing apparatus of claim 1, wherein the first network and the second network are different from each other, and
at least one of the first network or the second network includes a communication network, a broadcast network, a bidirectional network, or a unidirectional network.

3. The multicast signal processing apparatus of claim 1, wherein the processor is configured to receive service list information based on at least one of the first network or the second network,
the service list information for the first network includes address information about manifest information for the multicast media data,
the service list information for the second network includes address information about manifest information for the multicast media data, and
the service list information for the first network and the service list information for the second network include an identifier for the multicast media data and address information for a multicast rendezvous.

4. The multicast signal processing apparatus of claim 1, wherein the processor is configured to manage presentation manifest information for each of the first network and the second network for the multicast media data.

5. The multicast signal processing apparatus of claim 1, wherein the processor is configured to receive service list information for the multicast media data,
the service list information includes presentation manifest request information, and
the presentation manifest request information includes network type information for a multicast rendezvous service, host address information for the multicast rendezvous service, and type information of the multicast rendezvous service.

6. The multicast signal processing apparatus of claim 1, wherein the processor receives multicast session information for the multicast media data, and
the multicast session information includes identification information about a network over which a multicast session is transmitted.

7. A multicast signal processing method by a processor, comprising:
receiving multicast media data based on at least one of a first network or a second network; and
decoding the multicast media data,
wherein the multicast media data is received through the first network, and
based on a change of a network from the first network to the second network, the method includes
receiving service list information through the second network,
acquiring multicast rendezvous service information based on the service list information,
receiving presentation manifest information based on the rendezvous service information,
receiving redirection information based on the presentation manifest information, and receiving the presentation manifest information based on the redirection information to receive the multicast media data.

8. The multicast signal processing method of claim 7,
wherein the first network and the second network are different from each other, and
at least one of the first network or the second network includes a communication network, a broadcast network, a bidirectional network, or a unidirectional network.

9. The multicast signal processing method of claim 7, further comprising
receiving service list information based on at least one of the first network or the second network,
wherein the service list information for the first network includes address information about manifest information for the multicast media data,
the service list information for the second network includes the address information about the manifest information for the multicast media data, and
the service list information for the first network and the service list information for the second network include an identifier for the multicast media data and address information for a multicast rendezvous.

10. The multicast signal processing method of claim 7, further comprises managing presentation manifest information for each of the first network and the second network for the multicast media data.

11. The multicast signal processing method of claim 7, further comprises
receiving service list information for the multicast media data,
the service list information includes presentation manifest request information, and
the presentation manifest request information includes network type information for a multicast rendezvous service, host address information for the multicast rendezvous service, and type information of the multicast rendezvous service.

12. The multicast signal processing method of claim 7, further comprises
receiving multicast session information for the multicast media data, and
the multicast session information includes identification information about a network over which a multicast session is transmitted.

13. The multicast signal processing apparatus of claim 5,
wherein the multicast rendezvous service includes URL information for accessing presentation manifest information to receive the multicast media data.

14. The multicast signal processing method of claim 11,
wherein the multicast rendezvous service includes URL information for accessing presentation manifest information to receive the multicast media data.

* * * * *